United States Patent
Farhat et al.

(10) Patent No.: US 12,358,157 B2
(45) Date of Patent: Jul. 15, 2025

(54) SERVICE ROBOT

(71) Applicant: ROBOTISE AG, Munich (DE)

(72) Inventors: Mehdi Farhat, Munich (DE); Christopher Durand, Munich (DE); Tobias Riphaus, Munich (DE); Clemens Beckmann, Ottobrunn (DE); Naval Kishore, Munich (DE); Layton Hern, Munich (DE); Maik Siee, Munich (DE); Gerd Wilsdorf, Fürstenfeldbruck (DE); Roland Ruhwandl, Fürstenfeldbruck (DE); Ömer Can Sari, Munich (DE); Igor Likhomanov, Munich (DE)

( * ) Notice: Subject to any disclaimer, the term of this patent is extended or adjusted under 35 U.S.C. 154(b) by 93 days.

(21) Appl. No.: 18/269,293

(22) PCT Filed: Dec. 22, 2021

(86) PCT No.: PCT/EP2021/087346
§ 371 (c)(1),
(2) Date: Jun. 23, 2023

(87) PCT Pub. No.: WO2022/136571
PCT Pub. Date: Jun. 30, 2022

(65) Prior Publication Data
US 2024/0058968 A1   Feb. 22, 2024

(30) Foreign Application Priority Data

Dec. 24, 2020  (DE) .................... 10 2020 134 934.3
Dec. 24, 2020  (DE) .................... 10 2020 134 935.1

(51) Int. Cl.
*B25J 11/00*  (2006.01)
*B25J 5/00*  (2006.01)
(Continued)

(52) U.S. Cl.
CPC ............. *B25J 11/008* (2013.01); *B25J 5/007* (2013.01); *B25J 9/1676* (2013.01); *G05D 1/024* (2013.01)

(58) Field of Classification Search
CPC ........ B25J 11/008; B25J 5/007; B25J 9/1676; B25J 13/086; B25J 19/0054; B25J 19/06;
(Continued)

(56) References Cited

U.S. PATENT DOCUMENTS

| | | | |
|---|---|---|---|
| 10,303,171 B1 * | 5/2019 | Brady | ................... G05D 1/0088 |
| 10,414,344 B1 * | 9/2019 | Northcott | ................ B60R 16/00 |
| 2021/0170610 A1 * | 6/2021 | Kang | ....................... B25J 9/161 |

FOREIGN PATENT DOCUMENTS

| | | | | |
|---|---|---|---|---|
| DE | 202016005333 U1 * | 11/2016 | ............... | B60K 1/04 |
| KR | 20180098953 A * | 9/2018 | | |
| WO | WO-2007010267 A2 * | 1/2007 | ............. | A47F 3/063 |

\* cited by examiner

*Primary Examiner* — Khoi H Tran
*Assistant Examiner* — Nhi Q Bui
(74) *Attorney, Agent, or Firm* — Lerner David LLP

(57) ABSTRACT

This disclosure relates to a service robot for providing services at the local vicinity of people. The service robot includes an autonomously driving base platform and a service unit mountable or mounted on the autonomously driving base platform. The autonomously driving base platform includes a drive for driving the autonomously driving base platform and a trolley having a plurality of wheels for moving the autonomously driving base platform. At least one of the plurality of wheels is a drive wheel drivable by the drive. The service robot includes a control module to control the autonomously driving base platform. The control module is connected or is connectable to the drive to transmit control commands to the drive. The drive is controllable by the control commands transmitted from the control module.

(Continued)

The service robot includes at least one power source to supply power to the drive and the control module.

5 Claims, 29 Drawing Sheets

(51) Int. Cl.
  *B25J 9/16* (2006.01)
  *G05D 1/00* (2006.01)
(58) Field of Classification Search
  CPC ...... G05D 1/024; G05D 1/027; G05D 1/0251;
         A61G 5/043; Y02T 10/70; G06Q 10/08
  See application file for complete search history.

SERVICE ROBOT

CROSS REFERENCE TO RELATED APPLICATIONS

This application is a national phase of International Application No.: PCT/EP2021/087346, filed Dec. 22, 2021, which claims priority to two German priority applications 102020134934.3 and 102020134935.1, the both of which were filed on Dec. 24, 2020, the content of all of the aforementioned being herein incorporated by reference.

BACKGROUND OF THE INVENTION

Field of the Invention

The invention relates to a service robot for providing services at the local vicinity of people. The invention further relates to a method for operating a service robot according to the invention and to a method for providing services at the local vicinity of people with a service robot according to the invention.

DESCRIPTION OF RELATED ART

Service robots for providing services at the local vicinity of people are known. Some of these service robots are autonomously driving service robots and thus enable the provision of services at the local vicinity of people. The term "autonomously driving" means that these service robots can move while driving, using sensors and software for localization, navigation and path planning to find their own paths along which they move. Some, but not all, of these autonomously driving service robots move within a predefined area.

One example are autonomous service robots that can deliver parcels to customers on their own. Such service robots are used by parcel delivery services, for example. In operation, they drive autonomously to the customers to transport parcels to be delivered by the respective service robot to the customers and deliver them to the customer. The service robots find their own way. By delivering the packages, they provide a service to the customer, which is a service at the local vicinity of people.

The known service robots have the disadvantage that they are not very safe in operation and can only provide services in the vicinity of people to a very limited extent.

BRIEF SUMMARY OF THE INVENTION

It is the task of the invention to create a service robot belonging to the technical field mentioned above for providing services at the local vicinity of people, which is safer in operation and can provide a wide range of services at the local vicinity of people. Further, it is the task of the invention to provide a method for operating a service robot according to the invention as well as a method for providing services at the local vicinity of people with a service robot according to the invention.

According to the invention, the service robot comprises an autonomously driving base platform and a service unit mountable or mounted on the autonomously driving base platform, the autonomously driving base platform comprising:

a) a trolley for driving the autonomously driving base platform and thus the service robot; and b) a trolley having a plurality of wheels for moving the autonomously driving base platform and thus the service robot on the wheels, wherein at least one of the plurality of wheels is a drive wheel drivable by the trolley.

In this context, the service robot has a control module for controlling the autonomously driving base platform, the control module being connected or connectable to the drive for transmitting control commands to the drive, and the drive being controllable by the control commands transmitted by the control module. In addition, the service robot has at least one energy source, in particular a battery, for supplying energy to the drive and the control module.

According to the invention, the service robot thus has an autonomously driving base platform. Since this base platform is autonomously driving, it can preferably move while driving and, in doing so, search for its own paths along which it moves with the aid of sensors and software for localization, navigation and path planning. In this regard, the autonomously driving base platform may have the sensors and software for localization, navigation, and path planning. Likewise, the sensors and software for localization, navigation, and path planning may be arranged elsewhere. For example, they may be arranged in the service unit of the service robot.

Since the service robot according to the invention also has a service unit, services can be provided with the service unit. In this context, the service unit can have facilities for providing the services. Since the service unit is attachable or mounted on the autonomously driving base platform, when the service unit is mounted on the autonomously driving base platform, the service unit can be driven by the autonomously driving base platform toward people to provide the services at the local vicinity of those people. Thus, the service robot is ultimately an autonomously driving service robot.

Advantageously, control commands can be issued with the control module, wherein the control module is connected to the drive, as already mentioned, for transmitting the control commands to the drive, and the drive can be controlled by the control commands transmitted by the control module.

Further, to solve the task of the invention, the service robot according to the invention is advantageously operated in a method. Preferably, this is a method for operating the service robot according to the invention. In an advantageous variant, this is a method for operating an arrangement which has the service robot according to the invention and an operating module for operating the service robot. In a further advantageous variant, in which the at least one energy source of the service robot is at least one battery, it is a method for operating a combination of the service robot according to the invention and a charging station for charging at least one battery of the service robot, wherein the charging station comprises two charging station charging contacts for being contacted by two service robot charging contacts of the service robot.

In addition, in order to solve the task of the invention, services are advantageously provided at the local vicinity of people with a service robot according to the invention. Preferably, this is a method for providing services at the local vicinity of people with a service robot according to the invention.

Another aspect of the invention relates to an autonomously driving base platform for a service robot according to the invention for providing the services at the local vicinity of people. Such an autonomously driving base platform may have any of the features described in the present text as belonging to the autonomously driving base platform of the service robot. However, it may be distributed separately from the rest of the service robot. However, it is preferably a component of the service robot according to the present invention.

The service unit is preferably designed to be exchangeably attachable to the autonomously driving base platform, in particular exchangeably couplable to the autonomously driving base platform. Moreover, the autonomously driving base platform is preferably configured to be couplable, in particular connectable, with the service unit attachable to the autonomously driving base platform when the service unit attachable to the autonomously driving base platform is attached to the autonomously driving base platform, in particular coupled to the autonomously driving base platform. Moreover, the autonomously driving base platform is preferably formed with different types of service units attachable to the autonomously driving base platform, in particular couplable, when the respective service unit attachable to the autonomously driving base platform is attached to the autonomously driving base platform, in particular coupled to the autonomously driving base platform, couplable, in particular connectable. In the context of coupling the service unit or one of the service units to the autonomously driving base platform, attachable preferably means mechanically couplable, while connectable preferably means electrically couplable.

Another aspect of the invention relates to a service unit for a service robot according to the invention for providing the services at the local vicinity of people. Such a service unit may have all the features described in the present text as belonging to the service unit of the service robot. However, it may be sold separately from the rest of the service robot. However, it is preferably a component of the service robot according to the invention.

The service robot according to the invention has the advantage that it is safer to operate and can provide a wide range of services in the vicinity of humans.

The autonomously driving base platform preferably comprises a front side and a rear side, wherein the front side of the autonomously driving base platform is oriented in the direction of travel and the rear side of the autonomously driving base platform is oriented opposite to the direction of travel when the autonomously driving base platform or service robot is moved forward while driving, and wherein the rear side of the autonomously driving base platform is oriented in the direction of travel and the front side of the autonomously driving base platform is oriented opposite to the direction of travel when the autonomously driving base platform or service robot is moved backward while driving.

Preferably, the service robot also comprises a front side and a rear side, wherein, during operation of the service robot, the front side of the service robot corresponds to the front side of the autonomously driving base platform, while the rear side of the service robot corresponds to the rear side of the autonomously driving base platform. Thus, the service unit also comprises a front side and a rear side, wherein in operation of the service robot the front side of the service unit corresponds to the front side of the service robot, while in operation of the service robot the rear side of the service unit corresponds to the rear side of the service robot.

Preferably, controlling the autonomously driving base platform comprises controlling a driving movement and stopping of the autonomously driving base platform and thus of the service robot. Advantageously, controlling the autonomously driving base platform comprises at least controlling a driving speed of the autonomously driving base platform and thus of the service robot in the driving direction by transmitting control commands from the control module to the drive in order to drive the drive wheel with the drive and to move the autonomously driving base platform at the corresponding driving speed. In this context, the direction of travel with respect to the autonomously driving base platform or the service robot can be both forward and backward. Controlling the autonomously driving base platform thus includes at least controlling the driving speed in the driving direction of the autonomously driving base platform and thus of the service robot. In order to reduce the travel speed in the direction of travel of the autonomously driving base platform and thus of the service robot, corresponding control commands can be transmitted from the control module to the drive. In addition or instead thereof, the service robot, in particular the autonomously driving base platform, may also have a braking device for braking and stopping the driving movement of the autonomously driving base platform, which is controllable by the control module by connecting the control module to the braking device for transmitting braking commands for braking and stopping the driving movement of the autonomously driving base platform to the braking device, wherein the control module is adapted to transmit braking commands to the braking device. Controlling the autonomously driving base platform may further comprise specifying a direction in which the autonomously driving base platform, and thus the service robot, is to move. This direction may be achieved, for example, by at least one wheel of the plurality of wheels of the trolley controllable by the control module. However, if the trolley has two drive wheels arranged side by side, the direction in which the autonomously driving base platform and thus the service robot is to move can also be achieved by driving the two drive wheels arranged side by side to different extents.

How the control of the autonomously driving base platform can be achieved by the control module is generally known from autonomously driving service robots.

The control module may be software running on a computer unit, or may be formed by a computer unit. If the control module is formed by a computer unit, the functionality for controlling the autonomously driving base platform can be achieved by appropriate circuitry in the computer unit or by software or firmware of the computer unit.

Preferably, the control module is used to control the service robot and also to control the autonomously driving base platform. In one variant, however, the control module is only used to control the autonomously driving base platform.

Advantageously, the autonomously driving base platform comprises the control module. Alternatively, however, it is also possible that the autonomously driving base platform does not comprise the control module, but rather the service unit, for example. Preferably, for detecting obstacles within a working area of the service robot, the service robot, particularly preferably the autonomously driving base platform, comprises at least one working area detection sensor for detecting the working area of the service robot and for outputting working area detection sensor data with information on the detected working area. This has the advantage that the service robot can be used to optimally detect the working area of the service robot.

Alternatively, however, it is also possible that the service robot does not comprise such a work area detection sensor, in which case work area detection sensors arranged separately from the service robot can be used, for example, to detect the work area of the service robot and to output work area detection sensor data containing information about the detected work area.

Preferably, the control module is connected to at least one of the at least one workspace sensing sensor for receiving workspace sensing sensor data output from the respective workspace sensing sensor, whereby the respective workspace sensing sensor is a control sensor and the service robot accordingly comprises at least one control sensor, wherein the control module is configured to control the autonomously driving base platform based on the workspace sensing sensor data received from the at least one control sensor and to transmit control commands to the drive for controlling the autonomously driving base platform. This has the advantage that reliable control of the autonomously driving base platform can be achieved.

Alternatively, however, the control module may not be connected to any of the at least one work area sensing sensor to receive work area sensing sensor data.

Preferably, the service robot comprises a safety module for preventing accidents with the service robot by collision of the service robot with obstacles, the safety module being connected to at least one of the at least one work area detection sensor for receiving work area detection sensor data outputted from the respective work area detection sensor wherein the respective work area sensing sensor is a safety sensor and the service robot correspondingly comprises at least one safety sensor, wherein the safety module is configured to determine positions of the obstacles in the work area of the service robot relative to the service robot based on the work area sensing sensor data received from the at least one safety sensor for preventing accidents with the service robot due to collisions of the service robot with the obstacles. This has the advantage that the safety module can be used to determine the positions of obstacles in the working area of the service robot independently of the control module. Accordingly, this provides increased safety when detecting obstacles in the service robot's working range. It is irrelevant whether one or more of the at least one safety sensor already directly outputs information on the positions of the obstacles in the working area of the service robot in its working area detection sensor data or not. In either case, the safety module determines the positions of the obstacles in the working area of the service robot relative to the service robot based on the work area detection sensor data received from the at least one safety sensor. If the work area detection sensor data already directly contains information about the positions of the obstacles in the work area of the service robot, the safety module determines the positions of the obstacles in the work area of the service robot relative to the service robot by receiving and processing the corresponding work area detection sensor data. Otherwise, the safety module may also be configured to perform a more complex evaluation of the work area acquisition sensor data to determine the positions of the obstacles in the work area of the service robot relative to the service robot based on the received work area acquisition sensor data.

Obstacles can be, for example, walls, objects in the way, people, animals, and steps or ramps leading up or down. Obstacles can also be unevenness of the ground, if the unevenness could cause the service robot to tip over when the autonomously driving base platform moves over this unevenness. The safety module may be software running on a computer unit, or may be formed by a computer unit. If the safety module is formed by a computer unit, the functionality for controlling the autonomously driving base platform may be achieved by appropriate circuitry in the computer unit or by software or firmware of the computer unit.

Advantageously, each safety sensor is certified according to a safety standard. In one example, the safety standard is ISO 13849-1, but the safety standard can also be another safety standard. Alternatively, however, it is also possible that only one or only some of the safety sensors are certified according to a safety standard, or that none of the safety sensors are certified according to a safety standard.

In a preferred variant, the safety module is designed separately from the control module. Particularly preferably, the safety module runs on a different computer unit or is formed by a different computer unit than the computer unit on which the control module runs or by which the control module is formed.

When the safety module is formed separately from the control module, the advantage is achieved that the safety module can function independently of the control module even if the safety module and the control module receive work area detection sensor data from a same work area detection sensor. Thus, a kind of safety check of the control module can be achieved by the safety module, since the safety module can determine the positions of obstacles in the working area of the service robot based on the working area detection sensor data independently of the control module.

Advantageously, at least one of the at least one energy sources, in particular battery, is used to supply the safety module with energy.

Advantageously, the autonomously driving base platform comprises the safety module. In an advantageous variant thereof, each of the at least one safety sensor is arranged on the autonomously driving base platform or the autonomously driving base platform comprises each of the at least one safety sensor. However, it is also possible that one, several or all of the at least one safety sensor is/are not arranged on the autonomously driving base platform, but for example on the service unit. Alternatively, however, it is also possible that the safety module is not on the autonomously driving base platform but, for example, on the service unit.

As an alternative to these variants, it is also possible for the service robot to have no such safety module.

If the service robot has the safety module described above, the safety module is advantageously connected or connectable to the drive for transmitting safety control commands to the drive, and the drive is advantageously controllable by safety control commands transmitted by the safety module. Accordingly, safety control commands are preferably issuable by the safety module. This has the advantage that the safety module can control the drive by means of safety control commands, whereby the safety module can intervene in the functionality of the control module if necessary. This can increase safety in the operation of the service robot.

Alternatively, however, it is also possible for the safety module not to be connected to the drive for the purpose of transmitting safety control commands to the drive, and for the drive to be controllable by safety control commands transmitted by the safety module.

Preferably, the control module can be overridden by the safety module, especially in that the drive can be controlled by the safety control commands transmitted by the safety module, even if control commands to the contrary are issued to the drive by the control module. I.e., preferably, the safety control commands are executed by the drive during override, but not the control commands.

To this end, for example, control commands issued by the control module to the drive can be prevented from being transmitted to the drive if safety control commands are issued to the drive by the safety module. However, it is also possible for the safety control commands to be prioritized before the control commands in the drive, for example in a controller of the drive. For this purpose, the drive advantageously comprises a controller which is designed to prioritize the safety control commands transmitted from the safety module to the drive before the control commands transmitted from the control module to the drive.

The fact that the control module can be overridden by the safety module has the advantage that the safety module can be used to prevent control commands issued by the control module, which would lead to an accident of the service robot if executed, from being executed. This means an additional safety level in the operation of the service robot.

Alternatively, however, it is also possible that the control module cannot be overridden by the safety module.

Preferably, the service robot, particularly preferably the autonomously driving base platform comprises a braking device for braking and stopping the driving movement of the autonomously driving base platform, wherein the safety module is connected or connectable to the braking device for transmitting braking commands for braking and stopping the driving movement of the autonomously driving base platform to the braking device, and the braking device is controllable by the braking commands transmitted from the safety module to brake and stop the driving movement of the autonomously driving base platform and thus the service robot based on transmitted braking commands and/or to reduce the driving speed of the autonomously driving base platform based on transmitted braking commands.

For example, the breaking device may comprise an electromagnetic brake. However, the breaking device may also comprise, for example, a mechanical brake such as a disc brake or a drum brake.

That the braking device is controllable by the braking commands transmitted by the safety module advantageously means that the braking device is adapted to brake and/or stop the driving movement of the autonomously driving base platform based on the braking commands transmitted by the safety module, wherein braking the driving movement of the autonomously driving base platform advantageously means reducing the driving speed in the driving direction of the autonomously driving base platform and thus of the service robot.

In one variant, the control module for transmitting control braking commands for braking and, if necessary, stopping the driving movement of the autonomously driving base platform to the braking device is also connected or connectable to the braking device. Thus, advantageously, the breaking device is also controllable by the control braking commands transmitted by the control module. In this variant, however, the control module can advantageously be overridden by the safety module in that the braking device can be controlled by the braking commands transmitted by the safety module, even if control braking commands to the braking device are issued by the control module that are different. For this purpose, it is possible, for example, to prevent the control braking commands issued to the braking device by the control module from being transmitted to the braking device if braking commands are issued to the braking device by the safety module. However, it is also possible that in the braking device, for example in a controller of the braking device, the braking commands are prioritized before the control braking commands. For this purpose, the braking device advantageously comprises a controller which is designed to prioritize the braking commands transmitted from the safety module to the braking device before the control braking commands transmitted from the control module to the braking device.

Alternatively to this variant, however, it is also possible that the control module is not connected to the braking device for transmitting control braking commands for braking and stopping the driving movement of the autonomously driving base platform to the braking device, and therefore the braking device is not controllable by the control braking commands transmitted by the control module.

Furthermore, it is also possible that the service robot does not have such a breaking device.

Advantageously, the safety module is designed to issue a stop command for stopping the autonomously driving base platform. This has the advantage that the safety module can stop the autonomously driving base platform and thus the service robot.

In an advantageous variant, the safety module is designed to transmit the stop command as a braking command to the braking device in order to stop the driving movement of the autonomously driving base platform. During operation of the service robot and when providing services in the vicinity of people with the service robot, the safety module thus preferably transmits the stop command as a braking command to the braking device to stop the driving movement of the autonomously driving base platform. This has the advantage that the driving movement of the autonomously driving base platform can be stopped very effectively and quickly.

In an advantageous variant, the safety module is designed to transmit the stop command as a safety control command to the drive in order to stop the driving movement of the autonomously driving base platform. During operation of the service robot and when providing services in the vicinity of people with the service robot, the safety module thus preferably transmits the stop command as a safety control command to the drive to stop the driving movement of the autonomously driving base platform. This has the advantage that the driving movement of the autonomously driving base platform can be stopped in a simple way.

In an advantageous variant, the safety module is designed to transmit the stop command both as a braking command to the breaking device and as a safety control command to the drive in order to stop the driving movement of the autonomously driving base platform. This has the advantage that the driving movement of the autonomously driving base platform can be stopped particularly effectively and quickly.

As an alternative to these variants, however, it is also possible that the safety module is not designed to issue a stop command.

Preferably, the safety module is adapted to check whether one of the positions relative to the service robot of the obstacles in the working area of the service robot is within a first safety area defined around the service robot and, if one of the positions relative to the service robot of the obstacles in the working area of the service robot is within the first safety area defined around the service robot, to issue the stop command to stop the autonomously driving base platform. This has the advantage that it can be ensured in a simple and very efficient manner that the service robot cannot collide with an obstacle detected in the first safety area. Accordingly, during operation of the service robot, accidents with the service robot caused by collisions of the service robot with obstacles can be prevented very efficiently.

During operation of the service robot and during the provision of services in the vicinity of people with the service robot, the working area of the service robot is thus preferably detected with at least one safety sensor and work area detection sensor data output by the at least one safety sensor are preferably received with the safety module, on the basis of which positions of the obstacles in the working area of the service robot relative to the service robot are determined by the safety module, wherein the safety module is used to verify whether one of the positions relative to the service robot of the obstacles in the working area of the service robot is within the first safety area defined around the service robot, and, if one of the positions relative to the service robot of the obstacles in the working area of the service robot is within the first safety area defined around the service robot, a stop command for stopping the autonomously driving base platform is output by the safety module in order to prevent accidents with the service robot caused by the service robot colliding with the obstacles.

In a first advantageous variant, the first safety area is subdivided into two or more first safety subareas and the safety module is designed to check whether one of the positions relative to the service robot of the obstacles in the working area of the service robot lies within one of the first safety subareas and, if applicable, within which of the first safety subareas this position lies, the safety module being further designed to if necessary, to output a stop command, corresponding to that of the first safety subareas within which, according to the check by the safety module, one of the positions of the obstacles in the working area of the service robot lies relative to the service robot, for stopping the autonomously driving base platform with an intensity of braking during stopping assigned to the respective first safety subarea. If, according to the check by the safety module, positions of obstacles are located in different ones of the first safety subareas, the safety module is preferably adapted to issue the stop command corresponding to those different ones of the first safety subareas which signifies the greatest strength of deceleration upon stopping. This has the advantage of further increasing safety in the operation of the service robot.

In a second advantageous variant, the first safety area is also divided into two or more first safety subareas and the safety module is configured to check whether one of the positions relative to the service robot of the obstacles in the working area of the service robot is within one of the first safety subareas. However, in this embodiment, the safety module is adapted to monitor whether one of the positions of the obstacles in the working area of the service robot is within a first one of the first safety subareas when the speed of the service robot during driving movement of the autonomously driving base platform is below a predetermined first speed limit value and, if necessary, to issue a stop command for stopping the autonomously driving base platform and, at a speed during driving movement of the autonomously driving base platform above the predetermined first speed limit value, to monitor whether one of the positions of the obstacles in the working area of the service robot is located within a second one of the first safety subareas outside the first one of the first safety subareas as seen from the service robot, and, if necessary, to issue a stop command for stopping the autonomously driving base platform. It is irrelevant whether or not the stop command in each case includes an amount of deceleration upon stopping associated with the respective first safety subareas. For example, the stop commands for the respective safety subareas can contain no information about the braking force during stopping and the autonomously driving base platform can be braked with the same force for all stop commands for the different safety subareas.

If, in this second advantageous variant, the first safety area is subdivided into more than two first safety subareas, a speed range is preferably assigned to each of the first safety subareas, the safety module being designed to check in which speed range the speed of the service robot during driving movement of the autonomously driving base platform lies and to monitor whether one of the positions of the obstacles in the working area of the service robot is within that of the first safety subareas to which this speed range is assigned and, if necessary, to issue a stop command for stopping the autonomously driving base platform. In this case, the aforementioned first speed limit value forms the boundary between two of the speed ranges. This variation with more than two first safety subareas has the advantage that only one of the first safety subareas to obstacles present therein needs to be monitored with the safety module in each case, since it is sufficient, depending on the speed of the service robot, to monitor that safety subarea which, viewed from the service robot, is sufficiently far out so that the service robot can still be stopped in the event of an obstacle detected in the respective safety area without colliding with the obstacle. Accordingly, the safety in the operation of the service robot can be ensured with a reduced required computing power.

In the aforementioned second advantageous variant and variations thereof, the safety module is preferably connected or connectable to the speed determination device described below for receiving speed data output from the speed determination device described below. In this way, safety module receives reliable data on the speed of the service robot during driving movement of the autonomously driving base platform in order to monitor, as described for the aforementioned second advantageous variant and variations thereof, the first safety subareas required for this speed for any obstacles present therein. However, it is also possible for the safety module to obtain the necessary information about the speed of the service robot while driving the autonomously driving base platform not from the speed determination device but from somewhere else. For example, the safety module can receive information about the speed of the service robot while driving the autonomously driving base platform from the control module. In an advantageous variant to this, however, it is also possible that the first safety area is not divided into two or more first safety subareas. This has the advantage that the safety module can be formed more simply and thus also more reliably.

Alternatively to these variants, it is also possible that the safety module is not configured to check whether one of the positions of the obstacles in the working area of the service robot relative to the service robot is within a first safety area defined around the service robot and, if necessary, to issue a stop command to stop the autonomously driving base platform.

Advantageously, the safety module is designed to check whether one of the positions relative to the service robot of the obstacles in the working area of the service robot lies within an innermost safety area defined around the service robot and, if one of the positions relative to the service robot of the obstacles in the working area of the service robot lies within the innermost safety area defined around the service robot, to check whether one of the positions relative to the service robot of the obstacles in the working area of the service robot lies within the innermost safety area defined around the service robot, not to permit any forward movement, in particular by overriding the control module not to permit any forward movement, but only to permit a rotational movement of the service robot, in particular of the autonomously driving base platform, about itself in order to turn away from the obstacle located in the innermost safety area. Preferably, the first safety area is arranged outside the innermost safety area as seen from the service robot or is arranged to partially overlap the innermost safety area towards the service robot. In this case, the innermost safety area can correspond, for example, to the first of the first safety subareas described above. However, the innermost safety area can also coincide with the first safety area, for example.

As an alternative, however, it is also possible that the safety module is not designed to check whether one of the positions relative to the service robot of the obstacles in the working area of the service robot lies within an innermost safety area defined around the service robot and, if one of the positions relative to the service robot of the obstacles in the working area of the service robot lies within the innermost safety area defined around the service robot, to check whether one of the positions relative to the service robot of the obstacles in the working area of the service robot lies within the innermost safety area defined around the service robot, not allowing any forward movement, in particular by overriding the control module not allowing any forward movement, but only allowing a rotational movement of the service robot, in particular of the autonomously driving base platform, about itself in order to turn away from the obstacle located in the innermost safety area.

Preferably, the service robot, particularly preferably the autonomously driving base platform, comprises a speed determination device for detecting a current driving speed of the autonomously driving base platform and for outputting speed data comprising information on the detected driving speed, wherein the safety module is connected or connectable to the speed determination device for receiving speed data output from the speed determination device.

For example, the speed determination device may be an optical speed measurement sensor. However, the speed determination device may also be a rotational speed measuring unit arranged on one of the plurality of wheels for measuring a rotational speed of the corresponding wheel of the plurality of wheels. In the same way, however, the speed determination device may be an encoder arranged on the drive, which outputs speed data on the detected driving speed based on the rotational speed of the drive.

Alternatively, however, it is also possible for the service robot to have no such speed determination device.

Preferably, the safety module is adapted to check whether one of the positions of the obstacles in the working area of the service robot relative to the service robot is within a second safety area around the service robot and, based on the received velocity data, check whether the detected travel speed is or exceeds a maximum speed assigned to the second safety area, and, if both one of the positions of the obstacles in the working area of the service robot relative to the service robot is within the second safety area around the service robot and the detected travel speed is or exceeds the maximum speed assigned to the second safety area the maximum speed associated with the second safety zone, to issue a speed reduction command for reducing the driving speed of the autonomously driving base platform.

Regardless of whether the speed reduction command for reducing the travel speed of the autonomously driving base platform thereby specifies a speed of the travel speed of the autonomously driving base platform or specifies a reduction of the previous travel speed, the advantage is achieved that the travel speed of the autonomously driving base platform and thus of the service robot can be reduced as a precaution when the service robot approaches an obstacle. In particular, if the safety module is further configured to check whether one of the positions relative to the service robot of the obstacles in the working area of the service robot is within a first safety area defined around the service robot and, if one of the positions relative to the service robot of the obstacles in the working area of the service robot is within the first safety area defined around the service robot, to issue the stop command for stopping the autonomously driving base platform, it can be achieved with the second safety area that the stopping of the autonomously driving base platform takes place less abruptly if the aforementioned maximum speed is already selected rather low.

During operation of the service robot and when providing services in the vicinity of people with the service robot, the working area of the service robot is thus preferably detected with at least one safety sensor and working area detection sensor data output by the at least one safety sensor are preferably received with the safety module, on the basis of which positions of the obstacles in the working area of the service robot relative to the service robot are determined by the safety module, wherein in addition the current driving speed of the autonomously driving base platform is detected by the speed determination device and speed data with information on the detected driving speed are transmitted to the safety module by the speed determination device, wherein the safety module is used to check whether one of the positions of the obstacles in the working area of the service robot relative to the service robot lies within the second safety area around the service robot and, based on the received speed data, it is checked whether the detected travel speed is or exceeds a maximum speed assigned to the second safety area, and, if both one of the positions of the obstacles in the working area of the service robot relative to the service robot lies within the second safety area around the service robot and the detected travel speed is or exceeds the maximum speed assigned to the second safety area, the safety module transmits a speed data with information on the detected travel speed to the safety module. a speed reduction command for reducing the traveling speed of the autonomously driving base platform is issued from the safety module to reduce the speed of the autonomously driving base platform.

Advantageously, the safety module is adapted to check whether one of the positions of the obstacles in the working area of the service robot relative to the service robot is within a third safety area around the service robot and, based on the received speed data, to check whether the detected travel speed exceeds a maximum speed assigned to the third safety area and, if both one of the positions of the obstacles in the working area of the service robot relative to the service robot is within the third safety area around the service robot and the detected traveling speed exceeds the maximum speed associated with the third safety area, outputting a speed reduction command for reducing the traveling speed of the autonomously driving base platform. It is irrelevant whether the speed reduction command for reducing the driving speed of the autonomously driving base platform specifies a speed of the driving speed of the autonomously driving base platform or specifies a reduction of the previous driving speed. Advantageously, the maximum speed assigned to the third safety area is greater than the maximum speed assigned to the second safety area.

Advantageously, the safety module is adapted to check whether one of the positions of the obstacles in the working area of the service robot relative to the service robot is within a fourth safety area around the service robot and, based on the received speed data, to check whether the detected travel speed exceeds a maximum speed assigned to the fourth safety area and, if both one of the positions of the obstacles in the working area of the service robot relative to the service robot is within the fourth safety area around the service robot and the detected traveling speed exceeds the maximum speed associated with the fourth safety area, outputting a speed reduction command for reducing the traveling speed of the autonomously driving base platform. It is irrelevant whether the speed reduction command for reducing the driving speed of the autonomously driving base platform specifies a speed of the driving speed of the autonomously driving base platform or specifies a reduction of the previous driving speed. Advantageously, the maximum speed assigned to the fourth safety area is greater than the maximum speed assigned to the third safety area.

Advantageously, the safety module is adapted to check whether one of the positions of the obstacles in the working area of the service robot relative to the service robot is within a fifth safety area around the service robot and, based on the received speed data, to check whether the detected travel speed exceeds a maximum speed assigned to the fifth safety area and, if both one of the positions of the obstacles in the working area of the service robot relative to the service robot is within the fifth safety area around the service robot and the detected traveling speed exceeds the maximum speed associated with the fifth safety area, outputting a speed reduction command for reducing the traveling speed of the autonomously driving base platform. It is irrelevant whether the speed reduction command for reducing the driving speed of the autonomously driving base platform specifies a speed of the driving speed of the autonomously driving base platform or specifies a reduction of the previous driving speed. Advantageously, the maximum speed assigned to the fifth safety area is greater than the maximum speed assigned to the fourth safety area.

In these aforementioned variants, the safety module can be designed to always check both whether one of the positions of the obstacles in the working area of the service robot relative to the service robot is within the second, third, fourth, or fifth safety area around the service robot, as well as to check, based on the received speed data, whether the detected travel speed exceeds the maximum speed assigned to the second, third, fourth, or fifth safety area. In the same way, however, the safety module can also be designed to check whether one of the positions of the obstacles in the working area of the service robot relative to the service robot is within the second, third, fourth, or fifth safety area around the service robot and, only if necessary, as a further check based on the received speed data, to check whether the detected travel speed exceeds the maximum speed assigned to the second, third, fourth, or fifth safety area. In the same way, however, the safety module can also be designed to check, based on the received speed data, whether the detected travel speed exceeds the maximum speed assigned to the second, third, fourth, or fifth safety area, and only if necessary to check, as a further check, whether one of the positions of the obstacles in the working area of the service robot relative to the service robot lies within the second, third, fourth, or fifth safety area around the service robot.

In a preferred embodiment, the safety module is configured to transmit the speed reduction command as a safety control command to the drive to reduce the travel speed of the autonomously driving base platform. Thus, during operation of the service robot and when providing services in the vicinity of humans with the service robot, the safety module preferably transmits the speed reduction command as a safety control command to the drive to reduce the driving speed of the autonomously driving base platform. This has the advantage that the driving speed of the autonomously driving base platform can be reduced very efficiently.

In a preferred embodiment, the safety module is configured to transmit the speed reduction command as a braking command to the braking device to reduce the travel speed of the autonomously driving base platform. Thus, during operation of the service robot and when providing services in the vicinity of humans with the service robot, the safety module preferably transmits the speed reduction command as a braking command to the braking device in order to reduce the travel speed of the autonomously driving base platform. Advantageously, the second safety area is located outside the first safety area as seen from the service robot. This has the advantage that if there are obstacles further away in the second safety area, the travel speed of the autonomously driving base platform or the service robot is first reduced before the autonomously driving base platform or the service robot is stopped if there are obstacles closer in the first safety area. Accordingly, during operation of the service robot, accidents with the service robot caused by the service robot colliding with obstacles can be prevented even more efficiently and reliably.

If a third safety area is present, the third safety area is advantageously located outside the second safety area as seen from the service robot. If a fourth safety area is present, the fourth safety area is advantageously located outside the third safety area as seen from the service robot. If a fifth safety area is present, the fifth safety area is advantageously located outside the fourth safety area as seen from the service robot.

In the aforementioned variants in which at least the first safety area and the second safety area are present, with the third safety area, the third safety area and the fourth safety area also being present, or the third safety area, the fourth safety area and the fifth safety area being present, depending on the variant, the maximum speed assigned to the respective second safety area, third safety area, fourth safety area and fifth safety area, respectively, is preferably selected in such a way that the moving movement of the autonomously moving base platform, and thus of the service robot, is prevented by a maximum speed issued by the safety module for stopping the autonomously moving base platform. fifth safety area is preferably selected in such a way that the driving movement of the autonomously driving base platform and thus of the service robot is stopped by a stop command issued by the safety module for stopping the autonomously driving base platform and transmitted as a safety control command to the drive and/or as a braking command to the braking device, to stop the driving movement of the autonomously driving base platform, before the service robot can reach a stationary obstacle positioned in the respective safety area at the time of issuance of the stop command, regardless of its path traveled during the stop by the driving movement. Thus, the maximum speed assigned to the second safety area, third safety area, fourth safety area, or fifth safety area is preferably selected as a function of the geometry and arrangement of the respective safety area around the service robot, the trolley of the autonomously driving base platform, and, if applicable, the drive and, if applicable, the breaking device. Of course, the geometry and arrangement of the respective safety area around the service robot, the trolley of the autonomously driving base platform and, if applicable, the drive and, if applicable, the braking device can also be adapted to the maximum speeds assigned to the safety areas.

The preferred condition for the selection of the maximum speed(s) explained above has the advantage that it can be easily ensured that the autonomously driving base platform or the service robot can always be stopped in time before the service robot can collide with an obstacle. Thus, this enables efficient prevention of accidents caused by a collision of the service robot with obstacles. By having not only the first and second safety areas, but also the third safety area, the third and fourth safety areas, and the third, fourth, and fifth safety areas, respectively, a less jerky change in the speed of the service robot can be achieved during operation of the service robot. The more of these safety areas are present, the more fluid the service robot speed changes caused by the safety module can be achieved, which makes the service robot movements appear more natural to the service robot users, which is perceived as more comfortable.

Preferably, at least one of the at least one control sensor is also one of the at least one safety sensor. This has the advantage that the service robot can be constructed with fewer sensors. Accordingly, the service robot can thereby be manufactured at a lower cost. This advantage is magnified the more control sensors are also safety sensors. As a variant to this, however, there is also the possibility that none of the at least one control sensor is also one of the at least one safety sensor. Such a variant has the advantage that the safety module is supplied with work area detection sensor data independently of the control module of work area detection sensors or the safety sensors assigned to the safety module, whereby additional safety can be achieved in the operation of the service robot.

As an alternative to these variants with the safety module, however, it is also possible for the service robot not to comprise such a safety module. Preferably, however, at least one of the sensors is not a control sensor.

Regardless of whether or not the service robot has the safety module described above, a first one of the at least one work area detection sensor is preferably a first laser scanner, particularly preferably a first lidar (i.e., a light detection and ranging sensor), for detecting obstacles within a first scanning area in the work area of the service robot, wherein the first laser scanner or first lidar is arranged on the service robot, in particular on the autonomously moving base platform, such that the first scanning area is located in front of the front of the autonomously moving base platform. lidar is arranged on the service robot, in particular on the autonomously driving base platform, in such a way that the first scanning area is located in front of the front side of the autonomously driving base platform, wherein the work area detection sensor data which can be output by the first laser scanner or first lidar contains information about the obstacles detected by the first laser scanner or first lidar. This has the advantage that obstacles within the first scanning range can be detected particularly effectively and their position relative to the service robot or the autonomously driving base platform can be detected precisely.

Preferably, the first laser scanner or first lidar is arranged and aligned on the service robot, in particular on the autonomously driving base platform, in such a way that the first scanning area lies in a horizontally aligned, first scanning area plane during operation of the service robot. This arrangement and alignment of the first laser scanner or first lidar has the advantage that obstacles in the vicinity of the service robot can be detected particularly efficiently with the first laser scanner or first lidar.

In a preferred variant, the first scanning range starting from the first laser scanner or the first lidar covers an angular range of at least 200°, particularly preferably at least 250° in the first scanning range plane. This has the advantage that the first laser scanner or first lidar can cover a particularly large area of the working range around the service robot, with which the first laser scanner or first lidar is also particularly helpful for navigation of the service robot. Alternatively, however, the first scanning range can also cover an angular range smaller than 200°, starting from the first laser scanner or the first lidar.

Alternatively, however, it is also possible for the first laser scanner or first lidar to be arranged differently on the service robot or the autonomously driving base platform, so that the first scanning plane is oriented differently during operation of the service robot.

Advantageously, the laser of the first laser scanner or first lidar is an infrared laser, i.e. has a wavelength in the range of 780 nm to 1'400 nm. Alternatively, however, it is also possible that the laser of the first laser scanner or first lidar is not an infrared laser. Thus, it is possible that the wavelength of the laser is shorter than 780 nm or longer than 1'400 nm.

Preferably, the first laser scanner or first lidar is arranged on a front side of the service robot, especially preferably on the front side of the autonomously driving base platform.

Preferably, the first laser scanner or the first lidar is arranged at a height in the range of 50 mm to 200 mm, particularly preferably 100 mm to 180 mm above the ground when the service robot is in operation. This has the advantage that the first laser scanner or first lidar is arranged sufficiently far from the ground so that it can detect the working area of the service robot over smaller obstacles and ground steps. Alternatively, however, it is also possible for the first laser scanner or the first lidar to be arranged at a height of less than 50 mm or more than 200 mm above the ground when the service robot is in operation.

Advantageously, the first scanning area is a partial area of the working area. However, it is also possible that the first scanning area covers the entire working area.

Preferably, the first laser scanner or first lidar is a safety sensor. However, it is also possible that the first laser scanner or first lidar is not a safety sensor. Preferably, the first laser scanner or first lidar is a control sensor. However, there is also the possibility that the first laser scanner or first lidar is not a control sensor.

Preferably, the service robot, especially preferably the autonomously driving base platform, comprises at least two work area sensing sensors for sensing the work area of the service robot and for outputting work area sensing sensor data with information on the sensed work area, wherein a second one of the at least two work area sensing sensors is a second laser scanner resp. second laser scanner or second lidar for detecting obstacles within a second scanning area in the working area of the service robot, wherein the second laser scanner or second lidar is arranged on the service robot or the autonomously driving base platform, respectively, such that the second scanning area is in front of the front of the autonomously driving base platform, wherein the working area detection sensor data outputtable by the second laser scanner or second lidar, respectively, contains information on the obstacles detected by the second laser scanner or second lidar, respectively. This has the advantage that obstacles within the second scanning range can be detected particularly effectively and their position relative to the service robot or the autonomously driving base platform can be detected precisely.

Advantageously, the second laser scanner or second lidar is arranged and aligned on the service robot or on the autonomously driving base platform in such a way that the second scanning range lies in a horizontally aligned, second scanning range plane during operation of the service robot. This arrangement and alignment of the second laser scanner or second lidar has the advantage that obstacles in the vicinity of the service robot can be detected particularly efficiently with the second laser scanner or second lidar.

In a preferred variant, the second scanning range starting from the second laser scanner or the second lidar covers an angular range of at least 100°, particularly preferably at least 140° in the second scanning range plane. Alternatively, however, the second scanning range can also cover a smaller angular range than 100° starting from the second laser scanner or from the second lidar. In a preferred variant, the second scanning range covers an angular range of less than 200° starting from the second laser scanner or the second lidar. Alternatively, the second scanning range can also cover a larger angular range than 200° starting from the second laser scanner or the second lidar.

Alternatively, however, it is also possible for the second laser scanner or second lidar to be arranged differently on the service robot or the autonomously driving base platform, so that the second scanning plane is oriented differently during operation of the service robot.

Advantageously, the laser of the second laser scanner or second lidar is an infrared laser, i.e. has a wavelength in the range of 780 nm to 1'400 nm. Alternatively, however, it is also possible that the laser of the second laser scanner or second lidar is not an infrared laser. Thus, it is possible that the wavelength of the laser is shorter than 780 nm or longer than 1'400 nm.

Preferably, the second laser scanner or second lidar is arranged on a front side of the service robot, especially preferably on the front side of the autonomously driving base platform.

Preferably, the second laser scanner or the second lidar is arranged at a height in the range of at least 40 mm, particularly preferably at least 45 mm, most preferably at least 50 mm above the floor during operation of the service robot. This has the advantage that the second laser scanner or the second lidar can be arranged as low as possible and thus close to the floor in order, for example, to be able to detect the hands and feet of children playing on the floor as obstacles in the working area of the service robot, and at the same time can be arranged sufficiently far away from the floor so that the service robot does not collide with the second laser scanner or second lidar against floor steps and thus damage the second laser scanner or second lidar during operation. Alternatively, however, it is also possible for the second laser scanner or the second lidar to be arranged at a height of less than 40 mm above the ground during operation of the service robot. Advantageously, the second scanning area is a partial area of the working area. However, it is also possible for the second scanning area to cover the entire working area.

Advantageously, the second laser scanner or the second lidar is arranged at a lower height above the ground than the first laser scanner or first lidar on the service robot or the autonomously driving base platform during operation of the service robot. This has the advantage that the working area around the service robot can be scanned for obstacles in two superimposed planes. This advantage is particularly strong if, as mentioned above, the first scanning area lies in the horizontally aligned, first scanning area plane during operation of the service robot and the second scanning area lies in the horizontally aligned, second scanning area plane during operation of the service robot, because this means that a number of obstacles which are located above the ground but do not extend vertically downwards towards the ground but have areas overhanging the ground can also be detected. In particular, if in addition the first scanning range starting from the first laser scanner or the first lidar covers an angular range of at least 200°, particularly preferably at least 250° in the first scanning range plane, the advantage is achieved that a particularly large area of the working area around the service robot can be detected with the first laser scanner or the first lidar, whereby the first laser scanner or the first lidar is useful for obtaining an overview of a large part of the working area and is also particularly useful for navigation of the service robot. At the same time, it is not necessary for the second laser scanner or second lidar to also cover such a large angular range, since it is sufficient to use the second laser scanner or second lidar to detect obstacles near the ground that are located directly in front of the wheels of the service robot.

However, it is also possible that the second laser scanner or the second lidar is arranged at the same height above the ground as the first laser scanner or first lidar during operation of the service robot, or that the second laser scanner or the second lidar is arranged at a greater height above the ground than the first laser scanner or first lidar during operation of the service robot. Preferably, the second laser scanner or second lidar is a safety sensor. However, it is also possible that the second laser scanner or second lidar is not a safety sensor. Preferably, the second laser scanner or second lidar is a control sensor. However, it is also possible that the second laser scanner or second lidar is not a control sensor.

As an alternative to these variants, however, it is also possible that none of the at least one work area detection sensor or none of the at least two work area detection sensors is such a first laser scanner or first lidar. Alternatively to these variants, however, there is also the possibility that none of the at least two work area detection sensors is such a second laser scanner or second lidar.

Alternatively, however, it is also possible that the service robot does not comprise such a first laser scanner. It is also possible that the service robot does not comprise such a second laser scanner.

Preferably, one of the at least one workspace detection sensor or the at least two workspace detection sensors is a contact sensor for detecting contacts of a contact element of the service robot with an obstacle, wherein the contact element extends at least substantially over an entire width of the rear side of the autonomously driving base platform, particularly preferably an entire width of the rear side of the service robot, wherein the workspace detection sensor data that can be output by the contact sensor contains information about the contacts of the contact element with an obstacle detected by the contact sensor. This has the advantage that obstacles in the immediate vicinity of the autonomously driving base platform or the service robot can be detected when the autonomously driving base platform and the service robot are reversing.

The contact element is preferably a contact strip. Advantageously, the contact strip is aligned horizontally during operation of the service robot. Advantageously, the contact strip is arranged to run along an outer circumference of the service robot. In this case, the contact strip can extend over a region of the outer circumference or over the entire outer circumference of the service robot. Preferably, the contact element extends forward from the rear side of the autonomously driving base platform or the rear side of the service robot on sides of the autonomously driving base platform or the service robot arranged between the front side and the rear side of the autonomously driving base platform, at least to a central region of the sides. This has the advantage that contacts of the contact element of the service robot with an obstacle both at the rear of the service robot and in a rear region of the service robot at the side of the service robot can be detected in a simple manner with the contact strip.

Preferably, the contact sensor is a safety sensor. However, it is also possible that the contact sensor is not a safety sensor. Preferably, the contact sensor is a control sensor. However, there is also the possibility that the contact sensor is not a control sensor.

Alternatively to these variants, however, it is also possible that none of the at least one work area detection sensor or none of the at least two work area detection sensors is such a contact sensor.

Advantageously, one of the at least one working area detection sensor or the at least two working area of the at least two work area detection sensors is a floor step detection sensor for detecting a distance of objects or ground measured in a distance measurement direction from the floor step detection sensor, wherein the floor step detection sensor is inclined downward at an angle of inclination to the horizontal during operation of the service robot, so that the distance measurement direction is inclined downward with the angle of inclination, wherein the work area detection sensor data that can be output from the floor step detection sensor is information on the distance detected by the floor step detection sensor. This has the advantage that unevenness in the ground can be reliably detected, which may represent obstacles for the service robot or may otherwise represent a risk of accident for the robot if the service robot were to move in, on or over these unevennesses or obstacles while driving.

Advantageously, the safety module is designed to check whether the distance detected by the floor step detection sensor is greater by a distance limit value than a distance which is detected by the floor step detection sensor directed at the flat, level ground during operation of the service robot when the service robot is standing on a flat, level ground, and, when the distance detected by the floor step detection sensor is greater by the distance limit value than the distance detected by the floor step detection sensor directed at the flat, level ground during operation of the service robot when the service robot is standing on the flat, level ground, outputting the stop command to stop the autonomously driving base platform. This has the advantage that downward steps in the ground can be reliably detected by the floor step detection sensor.

Advantageously, the distance limit value is at most equal to a step height limit value divided by the sine of the inclination angle of the floor step detection sensor, whereby the step height limit value is a maximum step height that can be passed safely by the service robot. That is, the step height limit value is the maximum step height that can be traversed by the service robot without the risk of the service robot tipping over when traversing the step.

Advantageously, the floor step detection sensor is aligned in such a way that, during operation of the service robot when the service robot is standing on a flat, level base, the distance measurement direction, starting from the floor step detection sensor, strikes the flat, level base at a distance from the service robot which is greater than a distance within which the driving movement of the autonomously driving base platform and thus of the service robot can be stopped at a maximum driving speed of the service robot in a driving direction at least substantially corresponding to the distance measuring direction by a stop command issued by the safety module for stopping the autonomously driving base platform and transmitted as a safety control command to the drive and/or as a braking command to the breaking device in order to stop the driving movement of the autonomously driving base platform. This has the advantage of ensuring that the driving movement of the autonomously driving base platform or the service robot can be stopped in time before the autonomously driving base platform or the service robot can reach a step in the ground detected by the floor step detection sensor. Accordingly, the risk of an accident involving the service robot can thus be significantly reduced.

If the distance measurement direction is at least essentially forward with respect to the service robot, then the maximum travel speed is preferably the maximum possible forward travel speed of the service robot. If, on the other hand, the distance measuring direction is directed at least substantially backward with respect to the service robot, then the maximum travel speed is preferably the maximum possible backward travel speed of the service robot. This has the advantage that if the service robot has a different maximum possible forward travel speed than a maximum possible reverse travel speed, the arrangement and orientations of corresponding floor step detection sensors can be adapted to these maximum travel speeds to reduce the risk of accidents to the autonomously driving base platform or service robot without unnecessarily restricting the mobility of the autonomously driving base platform or service robot.

Preferably, the floor step detection sensor is a safety sensor. However, it is also possible that the floor step detection sensor is not a safety sensor. Preferably, the floor step detection sensor is a control sensor. However, there is also the possibility that the floor step detection sensor is not a control sensor.

In one variation, the floor step detection sensor is a laser scanner. In a variation of this, the floor step detection sensor is a lidar. If the floor step detection sensor is a laser scanner or lidar, the distance measurement plane in which the distances that can be detected by the floor step detection sensor lie is preferably aligned along the distance measurement direction, whereby during operation of the service robot a straight line lying in the distance measurement plane, which is aligned perpendicular to the distance measurement direction, is aligned essentially horizontally.

In another embodiment, the floor step detection sensor is a distance sensor for detecting distance along a single distance measurement direction. In this latter case, the distance sensor is a laser distance sensor in one example. However, the floor step detection sensor can also be a different type of sensor.

Advantageously, the service robot comprises at least one floor step detection sensor directed at least substantially forward with respect to the service robot. This has the advantage that it can be easily ensured that the service robot or the autonomously driving base platform can be stopped in time during operation before the service robot or the autonomously driving base platform moving forward can reach a step in the ground that is too far down for the service robot.

Preferably, the substantially forward floor step detection sensor is arranged on the front side of the service robot, particularly preferably on the front side of the autonomously driving base platform.

Preferably, the substantially forward floor step detection sensor is a safety sensor. However, it is also possible that the substantially forward floor step detection sensor is not a safety sensor. Preferably, the substantially forward floor step detection sensor is a control sensor. However, it is also possible that the substantially forward floor step detection sensor is not a control sensor.

Advantageously, the substantially forward floor step detection sensor is a laser-based sensor whose laser is preferably an infrared laser, i.e., has a wavelength in the range of 780 nm to 1'400 nm. Alternatively, however, it is also possible that the laser of the floor step detection sensor is not an infrared laser. Thus, there is a possibility that the wavelength of the laser is shorter than 780 nm or longer than 1'400 nm. For example, the wavelength of the laser may be about 650 nm.

If the substantially forward floor step detection sensor is a distance sensor for detecting the distance along a single distance measurement direction, the service robot advantageously has two floor step detection sensors that are substantially forward with respect to the service robot and whose distance measurement directions point forward apart. This has the advantage that steps in the floor leading downwards can also be detected in time with the two floor step detection sensors, which could be reached by a cornering movement of the service robot or the autonomously driving base platform.

In a variant to this, however, it is also possible for the service robot not to have a floor step detection sensor that is substantially forward facing with respect to the service robot.

Advantageously, the service robot comprises at least one floor step detection sensor directed at least substantially backwards with respect to the service robot. This has the advantage that it can be easily ensured that the service robot or the autonomously driving base platform can be stopped in time during operation before the service robot or the autonomously driving base platform traveling backwards can reach a step in the ground that is too far down for the service robot.

Preferably, the substantially rearward floor step detection sensor is arranged in the region of the rear side of the service robot, particularly preferably in the region of the rear side of the autonomously driving base platform.

Preferably, the substantially rearward floor step detection sensor is a safety sensor. However, it is also possible that the substantially rearward floor step detection sensor is not a safety sensor. Preferably, the substantially rearward floor step detection sensor is a control sensor. However, it is also possible that the substantially rearward floor step detection sensor is not a control sensor.

Advantageously, the substantially backward-looking floor step detection sensor is a laser-based sensor whose laser has a wavelength of about 650 nm. However, it is also possible that the laser of the floor step detection sensor is an infrared laser, i.e., has a wavelength in the range of 780 nm to 1'400 nm. Alternatively, however, there is also the possibility that the laser of the floor step detection sensor is not an infrared laser. Thus, there is a possibility that the wavelength of the laser is shorter than 780 nm or longer than 1'400 nm and is also not in the range of about 650 nm.

Advantageously, if the substantially rearward floor step detection sensor is a distance sensor for detecting distance along a single distance measurement direction, the service robot has two floor step detection sensors that are substantially rearward with respect to the service robot and have distance measurement directions that diverge rearwardly as viewed from the service robot.

In a variant to this, however, it is also possible that the service robot does not have a floor step detection sensor directed substantially backwards with respect to the service robot.

Alternatively to these variants, however, it is also possible that none of the at least one working area detection sensor or none of the at least two working area detection sensors is such a floor step detection sensor.

Advantageously, one of the at least one work area detection sensor or the at least two work area detection sensors is a magnetic sensor for detecting magnetic markings on or in the ground, wherein the work area detection sensor data that can be output by the magnetic sensor contains information on a magnetic field detected by the magnetic sensor and thus magnetic fields generated by the magnetic markings. This has the advantage that magnetic markings laid on or in the ground can be used to delimit an area within which the autonomously driving base platform or the service robot is to move autonomously, or which area is not to be left by the autonomously driving base platform or the service robot. This ultimately has the advantage that the service robot's working area can be reliably delimited in a simple manner.

Advantageously, the magnetic sensor is arranged on an underside of the autonomously driving base platform in an area of the front of the autonomously driving base platform. This has the advantage that magnetic markings laid on or in the ground can be detected as early as possible by the service robot, particularly in the forward direction of travel. The magnetic sensor can be a safety sensor so that the autonomously driving base platform or the service robot can be stopped by the safety module based on magnetic markings laid on or in the ground. In the same way, however, the magnetic sensor can also be a control sensor.

Alternatively to these variants, however, it is also possible that none of the at least one work area detection sensor or none of the at least two work area detection sensors is such a magnetic sensor.

Preferably, the service robot, more preferably the autonomously driving base platform comprises at least one emergency stop button for stopping the service robot. In a preferred embodiment, the at least one emergency stop button is connected or connectable to the safety module to transmit, when the at least one emergency stop button is actuated, an emergency stop button signal to the safety module, wherein the safety module is preferably configured to receive the emergency stop button signal and, when an emergency stop button signal is received by the safety module, to issue a stop command to stop the autonomously driving base platform. In this regard, the safety module may be configured, as discussed above, to transmit the stop command as a braking command to the breaking device and/or as a safety control command to the drive to stop the driving movement of the autonomously driving base platform.

However, the at least one emergency stop button may be configured, for example, to cut off a power supply to the drive when the emergency stop button is actuated to stop the autonomously driving base platform or service robot.

For example, the service robot may have more than one emergency stop button. For example, an emergency stop button may be arranged on the side, rear, and/or front of the autonomously driving base platform, and an emergency stop button may be arranged on top of the service unit.

Alternatively to these variants, it is also possible that the service robot does not have such an emergency stop button. Advantageously, one of the at least one work area detection sensor or the at least two work area detection sensors is a stereoscopic camera for image detection of image data, wherein the work area detection sensor data that can be output by the stereoscopic camera contains image information. This has the advantage that obstacles in the working area of the service robot can also be detected pictorially, whereby a distance of the respective obstacles can be determined by the service robot from the image data.

In a preferred variant, such a stereoscopic camera is arranged on the autonomously driving base platform. Advantageously, the stereoscopic camera is arranged at the front of the autonomously driving base platform.

In a preferred variant thereof, such a stereoscopic camera is arranged on the service unit. This has the advantage that this stereoscopic camera can be arranged on the service unit in such a way that it is arranged as far up as possible during operation of the service robot in order to obtain a good overview of the working area of the service robot with the corresponding stereoscopic camera.

Preferably, the stereoscopic camera is a control sensor. However, it is also possible that the stereoscopic camera is not a control sensor. Preferably, the stereoscopic camera is a safety sensor. However, there is also the possibility that the stereoscopic camera is not a safety sensor.

Alternatively to these variants, however, it is also possible that none of the at least one work area detection sensor or none of the at least two work area detection sensors is such a stereoscopic camera.

Advantageously, one of the at least one work area detection sensor or the at least two work area detection sensors is a ceiling image sensor for image detection of image data, the work area detection sensor data which can be output by the ceiling image sensor containing image information, the ceiling image sensor preferably being arranged on the service robot, particularly preferably on the service unit, in an upwardly directed manner such that, during operation of the service robot, image data of an area above the service robot can be recorded with the ceiling image sensor. This has the advantage that in interior spaces, image data of the ceiling of the respective interior space in which the service robot is located can be recorded with the ceiling image sensor. Particularly in large halls, such as factory halls, train station halls or airport halls, this provides an additional orientation aid for the service robot or a navigation module, if present, which is used to navigate the service robot.

Preferably, the ceiling image sensor is a control sensor. However, it is also possible that the ceiling image sensor is not a control sensor. Preferably, the ceiling image sensor is a safety sensor. However, there is also the possibility that the ceiling image sensor is not a safety sensor.

As an alternative to these variants, however, it is also possible that none of the at least one work area detection sensor or none of the at least two work area detection sensors is such a ceiling image sensor.

Advantageously, all of the at least one work area detection sensor or the at least two work area detection sensors are arranged on the autonomously driving base platform. This has the advantage that the autonomously driving base platform can detect the working area of the service robot independently of the service unit and can thus be operated optimally independently of the service unit.

However, it is also possible that some or all of the at least one work area detection sensor or the at least two work area detection sensors are not arranged on the autonomously driving base platform but, for example, on the service unit. This has the advantage that, due to the further spatial expansion of the service unit compared to the autonomously driving base platform, the work area detection sensors can be arranged on the service robot in such a way that the work area of the service robot can be optimally detected.

Preferably, the at least one energy source is at least one battery. This has the advantage that the service robot can be reliably supplied with energy in a simple manner in order to be reliably operated. In addition, a battery has the advantage that it can be designed to be very compact, whereby the energy source takes up little space in the service robot.

However, it is also possible that the at least one energy source is not at least one battery. For example, the at least one energy source can be a hydrogen cell.

Preferably, one of the at least one energy source or battery is an energy source or battery for supplying energy to the drive. Preferably, this energy source or battery for supplying the drive with energy is arranged in the autonomously driving base platform. Alternatively, however, it is also possible that this energy source or battery for supplying the drive with energy is arranged in the service unit.

Preferably, one of the at least one energy source or battery is an energy source or battery for supplying the safety module with energy. In a first variant thereof, this energy source or battery for supplying the safety module with energy is also the energy source or battery for supplying the drive with energy. In this case, the energy source or battery for supplying the drive and the safety module with energy is advantageously arranged in the autonomously driving base platform. Alternatively, however, the energy source or battery for supplying the drive system safety module with energy can also be arranged in the service unit.

In a second variant, the energy source or battery for supplying the safety module with energy is a different energy source or battery than the energy source or battery for supplying the drive with energy. In this case, the energy source or battery for supplying the safety module with energy is advantageously arranged in the autonomously driving base platform. The energy source or battery for supplying the drive with energy can also be arranged in the autonomously driving base platform or in the service unit. Alternatively, however, it is also possible for the energy source or battery for supplying the safety module with energy to be arranged in the service unit. In this case, the energy source or battery for supplying the drive with energy may be arranged in the autonomously driving base platform or likewise in the service unit. If the at least one energy source of the service robot is an at least one battery as described above, then preferably the service robot, particularly preferably the autonomously driving base platform, has two service robot charging contacts for contacting two charging station charging contacts of a charging station for charging the at least one battery. This has the advantage of enabling the battery to be charged in a simple manner.

Advantageously, for charging the at least one battery, each of the two service robot charging contacts can be connected or is connected to a different one of the two poles of the at least one battery, wherein one of the two service robot charging contacts can be disconnected from or to the pole connected to it by means of an overcurrent fuse belonging to the service robot if the current flow is too great. This has the advantage that the service robot is reliably protected against overcurrent damage during operation.

Alternatively, however, it is also possible that the service robot does not have such an overcurrent fuse.

Preferably, the two service robot charging contacts are movably mounted along an adjustment track on the service robot, particularly preferably on the autonomously driving base platform, wherein the adjustment track is at least substantially horizontally oriented and extends at least substantially toward a center of the autonomously driving base platform and toward away from the center of the autonomously driving base platform. This has the advantage that it can be achieved that the service robot or autonomously driving base platform can move to the charging station while driving to charge the at least one battery, wherein the adjustment track is oriented substantially in the direction of travel of the service robot or autonomously driving base platform, such that the service robot charging contacts can compensate for movement of the service robot or autonomously driving base platform relative to the base station when contacting the charging station charging contacts to optimally contact the charging station charging contacts.

Advantageously, the two service robot charging contacts are spring-mounted by at least one resilient means and biased by the at least one resilient means along the adjustment track away from the center of the autonomously driving base platform into a rest position and mounted to move away from their rest position along the adjustment track toward the service robot against a bias of the at least one resilient means. The service robot charging contacts are thus preferably located at one end of the adjustment track when they are in their rest position. This has the advantage that, due to the bias, the service robot charging contacts can automatically compensate for a movement of the service robot or the autonomously driving base platform relative to the base station when contacting the charging station charging contacts, in order to optimally contact the charging station charging contacts. In a variant, however, the service robot charging contacts can also be mounted on the charging station so as to be movable along an adjustment track relative to the charging station and can be prestressed by a prestressed elastic element so as to be able to automatically compensate for a movement of the service robot or of the autonomously driving base platform relative to the base station when the charging station charging contacts are contacted, in order to optimally contact the service robot charging contacts of the charging station.

In an advantageous variant, the two service robot charging contacts are pivotally mounted in a plane that is horizontally aligned during operation of the autonomously driving base platform and are biased by an elastic means to a central position within their possible pivoting range. This has the advantage that the service robot charging contacts can be tilted laterally when the service robot or autonomously driving base platform is not moved perfectly frontally to the base station to contact the charging station charging contacts, in order to nevertheless contact the charging station charging contacts optimally.

In a variant to this, in particular if the service robot charging contacts are not designed to tilt in this way, the two charging station charging contacts are pivotally mounted in a plane that is horizontally aligned during operation of the charging station and are biased by a resilient means to a central position within their possible pivoting range. This has the advantage that the charging station charging contacts can be tilted laterally if the service robot or autonomously driving base platform is not moved perfectly frontally to the base station in order to contact the charging station charging contacts with its service robot charging contacts, so that the charging station charging contacts can still be optimally contacted with the service robot charging contacts. However, it is also possible that neither the service robot charging contacts nor the charging station charging contacts can be tilted in this way.

As an alternative to the above variants, however, it is also possible for neither the service robot charging contacts to be movable relative to the service robot nor for the charging station charging contacts to be mounted so as to be movable relative to the charging station.

Preferably, the service robot, especially preferably the autonomously driving base platform, has a charging control unit for controlling the charging of the at least one battery. This has the advantage that the control of the charging of the at least one battery takes place in the service robot. Thus, it can be easily determined that the charging of the at least one battery of the service robot can be optimally matched to the battery of the service robot. This makes the operation of the service robot more reliable and safer, since a commercial charger can be used in the charging station without still having to specifically set up the charging station by means of a controller for charging the at least one battery to the requirements of the battery of the service robot. In a preferred embodiment, if the service robot has the overcurrent fuse described above, the charging control unit has the overcurrent fuse described above. However, the overcurrent fuse can also be formed separately from the charging control unit.

Advantageously, the charging control unit has a short circuit testing unit with which a DC voltage can be applied via the two service robot charging contacts, whereby a drop in the DC voltage can be detected with the short circuit testing unit. Preferably, the DC voltage is less than 5 volts. However, the DC voltage can also be greater. Regardless of the level of the DC voltage, the short-circuit testing device has the advantage that if there is a short circuit between the two service robot charging contacts, for example because they are in contact with a metallic object such as a metallic table leg, it can be assumed that the service robot is not connected to the charging station or that at least the two service robot charging contacts are not correctly contacting the two charging station charging contacts of the charging station. Accordingly, this allows checking whether the service robot is correctly connected to the charging station or not.

Preferably, the charging control unit is designed to disconnect a connection between one of the service robot charging contacts and the corresponding pole of the at least one battery in the event of a drop in DC voltage detected by the short-circuit test unit. This has the advantage that, accidents and property damage with the service robot and its at least one battery can be effectively prevented in a simple manner.

In a method of operating the service robot, when charging at least one of the battery, a DC voltage is preferably applied across the two service robot charging contacts with the short-circuit testing device and monitored whether a drop in the DC voltage is detected a connection between one of the service robot charging contacts with the short-circuit testing device. When a drop in the DC voltage is detected, a connection between one of the service robot charging contacts and the corresponding terminal of the at least one battery is preferably disconnected to stop charging of the at least one battery and to prevent a short circuit of the at least one battery.

Advantageously, the charging control unit has a capacitance measuring unit with which an AC voltage can be applied via the two service robot charging contacts, it being possible to determine a capacitance via the two service robot charging contacts with the capacitance measuring unit. Preferably, a frequency of the AC voltage is in a range of 20 kHz to 50 kHz, more preferably in a range of 30 kHz to 50 kHz. However, the frequency of the AC voltage can also lie outside this range. Advantageously, the AC voltage has a peak-to-peak amplitude of at most than 2 volts. However, this amplitude can also be greater than 2 volts. Regardless of the frequency and amplitude of the AC voltage, the capacitance measuring unit has the advantage that by determining the capacitance across the two service robot charging contacts, it is possible to determine whether or not the two service robot charging contacts are correctly contacting the two charging station charging contacts of the charging station, since the charging station has a characteristic capacitance across the two charging station charging contacts. Accordingly, this allows checking whether the service robot is correctly connected to the charging station or not.

Preferably, the charging control unit is adapted to check whether the capacitance determined with the capacitance measuring unit is within a certain capacitance range and, if the capacitance determined with the capacitance measuring unit is outside the certain capacitance range, to disconnect a connection between one of the service robot charging contacts and the corresponding pole of the at least one battery. This has the advantage that, accidents and property damage with the service robot and its at least one battery can be effectively prevented in a simple manner.

In a method of operating the service robot, when charging at least one of the Batteries, an AC voltage is preferably applied across the two service robot charging contacts with the capacitance measuring unit, and it is monitored whether the capacitance determined with the capacitance measuring unit is outside the determined capacitance range corresponding to the capacitance characteristic of the charging station.

Preferably, when the determined capacity is outside the determined capacity range, a connection between one of the service robot charging contacts and the corresponding terminal of the at least one battery is disconnected to stop charging of the at least one battery and to prevent a short circuit of the at least one Battery.

Advantageously, the charging control unit has a voltage pulse measuring unit with which individual voltage pulses can be detected at one of the two service robot charging contacts. Since some charging stations emit single voltage pulses at regular intervals to wake up heavily discharged batteries that should be charged, detecting such single voltage pulses makes it easy to check whether or not the two service robot charging contacts are correctly contacting the two charging station charging contacts of the charging station. Accordingly, this allows for easy verification of whether or not the service robot is correctly connected to the charging station. Preferably, if no single voltage pulse is detected by the voltage pulse measuring unit within a certain time window, the charging control unit is adapted to disconnect a connection between one of the service robot charging contacts and the corresponding pole of the at least one battery. This has the advantage that accidents and material damage can be effectively prevented in a simple manner.

In a first advantageous variant, the charging control unit has both the short circuit testing unit and the capacitance measuring unit. In this case, the charging control unit is preferably designed both to prevent a connection between one of the service robot charging contacts and the corresponding pole of the at least one battery in the event of a drop in the DC voltage detected by the short-circuit testing unit, and to check whether the capacitance determined with the capacitance measuring unit is within a specific capacitance range and, if the capacitance determined with the capacitance measuring unit is outside the specific capacitance range, to prevent a connection between one of the service robot charging contacts and the corresponding pole of the at least one battery.

In a second advantageous variant, the charging control unit has both the short circuit testing unit and the voltage pulse measuring unit. In this case, the charging control unit is preferably designed both to prevent a connection between one of the service robot charging contacts and the corresponding pole of the at least one battery in the event of a drop in the DC voltage detected by the short-circuit testing unit, and to prevent a connection between one of the service robot charging contacts and the corresponding pole of the at least one battery if no single voltage pulse is detected by the voltage pulse measuring unit within a specific time window.

In a third advantageous variant, the charging control unit has the short circuit testing unit, the capacitance measuring unit and the voltage pulse measuring unit. In this case, the charging control unit is preferably designed both to prevent a connection between one of the service robot charging contacts and the corresponding pole of the at least one battery in the event of a drop in the DC voltage detected by the short-circuit testing unit, and to check whether the capacitance determined using the capacitance measuring unit is within a specific capacitance range and if the capacitance determined using the capacitance measuring unit is outside the specific capacitance range, preventing a connection between one of the service robot charging contacts and the corresponding terminal of the at least one battery, as well as, if no single voltage pulse is detected by the voltage pulse measuring unit within a certain time window, preventing a connection between one of the service robot charging contacts and the corresponding terminal of the at least one battery.

In variants to this, however, it is also possible for the charging control unit to have only one of the short circuit testing unit, capacitance measuring unit and voltage pulse measuring unit.

As an alternative to these variants, it is also possible for the charging control unit to have neither the short circuit testing unit, the capacitance measuring unit nor the voltage pulse measuring unit.

Advantageously, the charging control unit has an interface for communication with the control module. If the service robot or the arrangement with the service robot mentioned in the present text has the operating module, then in a preferred variant the interface of the charging control unit is an interface with the operating module. Regardless of whether the interface is for communication with the control module or for communication with the operating module, the interface has the advantage that control commands can thereby be transmitted to the charging control unit, and the status of a charging process can be transmitted from the charging control unit to the control module or the operating module.

Alternatively, however, it is also possible for the charging control unit to have no such interface.

Alternatively to these variants where the service robot or the autonomously driving base platform comprises the charging control unit, however, there is also a possibility that the service robot does not comprise such a charging control unit for controlling the charging of the at least one battery.

According to a preferred embodiment, the autonomously driving base platform has a counter coupling area comprising electrical counter coupling devices for electrically coupling the autonomously driving base platform to electrical coupling devices of the service unit and mechanical counter coupling devices for mechanically coupling the autonomously driving base platform to mechanical coupling devices of the service unit. This has the advantage of allowing easy coupling of the autonomously driving base platform to the service unit and vice versa. The counter coupling area is preferably formed on an upper side, i.e. on a side opposite the wheels, of the autonomously driving base platform. The electrical coupling device and the electrical counter coupling device are preferably plug-socket arrangements. Electrical coupling here also includes data coupling, i.e. coupling in which data is transmitted.

The counter coupling area allows the service unit to be replaced quickly. Since the base platform is designed to be autonomously driving, it is not dependent on the service unit to move around. This also means that the equipment required for autonomous driving is preferably provided in the autonomously driving base platform and not in the service unit.

In particular, the autonomously driving base platform can preferably be coupled to several different service units. For this purpose, the different types of service units advantageously have a coupling area of the same design. In this way, the service units are easily interchangeable. For example, the service unit may be the service unit with drawer unit described in more detail here. Alternatively, the service unit may be a service unit with a cabinet unit or a service unit with an armchair or the like. Furthermore, the service unit can, for example, be a service unit with a UV unit for surface disinfection. With such a UV unit, surface disinfection by means of UV light is possible. In conjunction with the autonomously driving base platform, rooms can thus be disinfected easily and thoroughly.

Preferably, the plurality of all electrical counter coupling devices are arranged grouped in a few common electrical counter coupling areas, in particular in one, two or three electrical counter coupling areas. This has the advantage that the electrical counter coupling devices can be connected quickly. For simplicity, a single electrical counter coupling area is assumed in the following. However, a plurality of a few electrical counter coupling areas would also be conceivable. Preferably, all electrical counter coupling devices are arranged grouped in the common electrical counter coupling area. The area of the electrical counter coupling area is preferably significantly smaller than that of the counter coupling area. In this context, significantly smaller means that it accounts for no more than one tenth, preferably no more than one twentieth, and particularly preferably no more than one fiftieth of the area of the counter coupling area. Since the electrical counter coupling devices are arranged in groups in this common electrical counter coupling area, which is significantly smaller in area than the counter coupling area, the electrical connections assigned to the electrical counter coupling devices can be connected and disconnected particularly quickly. Particularly preferably, at least some of the electrical counter coupling devices are arranged in a common counter coupling body in such a way that they can be connected or disconnected simultaneously.

In a preferred embodiment, the common electrical counter coupling area is arranged at a decentralized area of the counter coupling area. In the case of two electrical counter coupling areas, these are preferably arranged accordingly at two decentralized areas of the counter coupling area. For example, the electrical counter coupling areas can be arranged on two opposite sides. This has the advantage that the electrical counter coupling devices are easily accessible. In this context, decentralized is understood to mean an area remote from a center of the counter coupling area. Preferably, the decentralized area is an edge area of the counter coupling area. If the counter coupling area is arranged at the decentralized area, in particular the edge area, the electrical counter coupling devices for coupling the autonomously driving base platform to the service unit are particularly accessible.

According to a preferred embodiment, the common electrical counter coupling area has a data interface, a safety interface and a power interface. This has the advantage that a wide variety of data and signals can be transmitted. Here, the data interface is used to transmit data between the service unit and the autonomously driving base platform. The data interface may have at least some, preferably all, of the following connections: USB 3, USB-C, CAN bus, Ethernet (preferably 2), audio connector (preferably in the 3.5 mm version), HDMI. Furthermore, the safety interface is used to transmit safety-related data between user and autonomously driving base platform or service unit and autonomously driving base platform. The safety interface may include at least some, preferably all, of the following: Programming interface, Digital input/output (preferably 10), Emergency stop button (preferably 2). Furthermore, the power interface is used to transfer power from the autonomously driving base platform to the service unit. However, transmission in the reverse direction is also conceivable. In the event that the service robot has only one energy source formed in the autonomously driving base platform, the energy interface serves to supply the service unit with energy from the energy source. The energy interface is preferably an interface for 24 V DC voltage.

Preferably, the counter coupling area has a load bearing surface designed to support the load of the service unit. This has the advantage that the load bearing surface can be easily coupled to the rest of the autonomously driving base platform. The load of the service unit can be, on the one hand, the static weight or static weight force and, on the other hand, kinetic forces that can occur in particular during acceleration and deceleration during operation of the service robot. The load bearing surface can preferably be a component that is assigned or assignable to the service unit. In this way, the load bearing surface of the service unit can be easily connected to the autonomously driving base platform and thereby support the mechanical coupling between the autonomously driving base platform and the service unit.

In a preferred embodiment, the load bearing surface has a length of 60% to 90%, preferably 70% to 80%, particularly preferably about 75% of the total length of the autonomously driving base platform, with the load bearing surface having a width of 40% to 80%, preferably 50% to 70%, particularly preferably about 65% of the total width of the autonomously driving base platform. This has the advantage that the load bearing surface has a large surface area. The length of the load bearing surface is preferably oriented in the forward direction of the service robot. The width of the load bearing surface is correspondingly preferably aligned in a direction perpendicular to the forward direction of the service robot. For example, the load bearing surface may have a length of 480 mm to 670 mm, preferably 520 mm to 620 mm, more preferably about 570 mm. For example, the load bearing surface may have a width of 350 mm and 520 mm, preferably 400 mm and 480 mm, and more preferably 440 mm.

According to a preferred embodiment, the mechanical counter coupling devices are arranged or can be arranged on the load bearing surface and/or within the load bearing surface. This has the advantage that the mechanical counter coupling devices can be used to mechanically couple the autonomously driving base platform or the rest of the autonomously driving base platform to the service unit. In particular, all counter coupling devices are preferably arranged on and/or in the load bearing surface. The mechanical coupling of the autonomously driving base platform and the service unit thus preferably takes place at the load bearing surface, so that coupling and force application take place in local proximity and a short force flow is created. In particular, the counter coupling devices are preferably arranged decentrally on the load bearing surface. This makes them particularly accessible.

Preferably, the common electrical counter coupling area is arranged outside the load bearing surface. This has the advantage that no mechanical force acts on the electrical connections, so that they can perform their tasks reliably and safely. The arrangement also enables a particularly long service life of the electrical connections.

In a preferred embodiment, the load bearing surface has a plurality of recesses designed to provide sufficient rigidity to the load bearing surface and to optimize the weight of the load bearing surface. Optimization here means reduction. This has the advantage that the load bearing surface is light but stable. In addition, equipment within the service unit can be accessed through the load-bearing surface.

According to a preferred embodiment, the mechanical counter coupling devices comprise centering devices for centering the position of the autonomously driving base platform and the service unit and fastening devices for fastening the autonomously driving base platform and the service unit to each other. This has the advantage that by means of the centering device the assembly is simplified and it is ensured that a proper assembly takes place.

Preferably, the centering devices are designed as centering pins and/or centering holes. The advantage of this is that it enables cost-effective and easy centering between the autonomously driving base platform and the service unit.

In a preferred embodiment, the fastening devices are designed as clamp connectors. The advantage of this is that the clamping connectors enable advantageous tool-free attachment and detachment from the autonomously driving base platform and the service unit. Preferably, each clamping connector is assigned a centering pin in such a way that they are arranged adjacent to one another. Particularly preferably, 5 centering pins and 4 clamping connectors are arranged.

According to a preferred embodiment, at least two of the wheels are drive wheels drivable by the drive and at least two more of the plurality of wheels are support wheels for stabilizing the service robot. This has the advantage that the service robot with two drive wheels is basically designed to rotate in one place. Preferably, two of the wheels are drive wheels drivable by the drive and four other wheels of the plurality of wheels are support wheels for stabilizing the service robot, with two of the support wheels formed at the front and two of the support wheels formed at the rear of the autonomously driving base platform. This has the advantage that the total weight of the service robot can be distributed among four support wheels. The front wheels are preferably larger than the rear wheels. This has the advantage that enough space can be provided for a battery between the two rear wheels. The large front wheels also allow better bridging of elevator gaps.

In a preferred embodiment, the trolley has a plurality of spring-loaded wheel suspensions comprising support wheel suspensions and drive wheel suspensions, each support wheel being assigned precisely one of the support wheel suspensions and the drive wheels being assigned at least one common drive wheel suspension. Preferably, a drive wheel suspension is associated with each drive wheel. This has the advantage that full suspension of the trolley is achieved. This results in particularly low driving noise during operation.

According to a preferred embodiment, the support wheel suspensions are designed as independent wheel suspensions. This has the advantage that the wheels can have independent springs. Preferably, the wheel suspensions associated with the drive wheels are also designed as independent wheel suspensions.

Preferably, each support wheel suspension comprises: a shaft for connecting an associated support wheel to a chassis of the service robot; and an elastic element disposed between the chassis and the support wheel. This has the advantage of providing a simple-to-implement, space-saving suspension system.

In a preferred embodiment, each support wheel suspension has a low-friction guide arranged or arrangeable to guide the shaft to the chassis with low friction. This has the advantage of simplifying the arrangement of the shaft to the chassis. According to a preferred embodiment, the low-friction guide is formed as a sleeve-shaped ball cage guide. This has the advantage that the sleeve can be guided through a frame of the chassis, at least in certain areas.

Preferably, the elastic element is a spring, preferably a coil spring. Preferably, the spring is a steel spring. This has the advantage that the elastic element is inexpensive to manufacture. A spring is further easily adaptable to the weight of the service unit and can further be easily replaced.

In a preferred embodiment, the shaft is arranged fixedly on the support wheel in a spring travel direction of the elastic element, wherein the shaft and thus the support wheel are arranged or can be arranged movably on the chassis between a rest position when the service robot is at rest and a maximum suspension position in the spring travel direction along a support wheel spring travel. This has the advantage that a unidirectional suspension is implemented, whereby a high driving stability can be achieved. The spring direction preferably also corresponds to the axial direction of the shaft.

Preferably, the support wheel spring travel is oriented at least substantially perpendicular to a main extension plane of the autonomously driving base platform. In other words, the spring travel extends vertically downward from the autonomously driving base platform. This has the advantage that the overall suspension can be space efficient with a short spring travel. Comparable robots have swing arm systems or pendulum arms. Swivel arm systems require significantly more installation space and independent counterpoints, and often require a complex damping system to prevent the larger spring travels from swinging open.

In a preferred embodiment, the length of the support wheel spring travel is in a range between 5 mm and 15 mm, preferably in a range between 8 mm and 12 mm, and is particularly preferably about 10 mm. This has the advantage that good stability during braking is achieved with the short spring travel. Preferably, the spring travel and spring constant are the same for all support wheels. According to a preferred embodiment, the shaft has a head designed to come into contact with the chassis for fixing the rest position. This has the advantage that the unidirectional suspension can be implemented simply in terms of design.

Preferably, each support wheel suspension has an adjusting device by means of which a spring travel of the elastic element can be adjusted. This has the advantage that the elastic elements can be adapted to the weights of different service units.

In a preferred embodiment, a spring constant of the elastic element lies in a range between 20 N/mm and 60 N/mm, preferably between 30 N/mm and 50 N/mm, and is particularly preferably about 45 N/mm. This results in optimum spring behavior.

According to a preferred embodiment, each drive wheel suspension comprises a retaining frame for retaining at least one drive wheel to the chassis, wherein the retaining frame comprises an upper frame element and a lower frame element, wherein the at least one drive wheel is arrangeable or arranged between the upper frame element and the lower frame element, and wherein each drive wheel suspension comprises at least two further elastic elements arranged between the upper frame element and the lower frame element. This has the advantage that suspension of the drive wheel, preferably including at least parts of the drive, is possible. The drive may, for example, be a differential drive. For example, the upper frame element may be attached or attachable to the chassis and the lower frame part is pressed towards the ground by means of the elastic elements. The spring elements are guided by means of pins, for example. The drive wheel suspension or the suspension of the drive system primarily serves to generate contact pressure for traction, including braking, of the drive wheels.

Preferably, the at least one drive wheel is arranged between the two further elastic elements. This has the advantage that a compact structure is created and good suspension is possible both when braking and when accelerating and driving over thresholds. In a preferred embodiment, a common spring constant of the at least two further elastic elements is at most one tenth, preferably at most one twentieth, of the spring constant of the elastic element. The spring force for springing the drive wheels is therefore significantly lower than that of the support wheels. This has the advantage that the driving/tilting stability is not jeopardized. The total weight of the robot is therefore primarily borne by the spring system of the preferably four support wheels.

According to a preferred embodiment, a common spring constant of the further elastic elements is in a range between 0.5 N/mm and 4 N/mm, preferably between 1 N/mm and 3 N/mm, and is particularly preferably about 1.8 N/mm. This has the advantage that a particularly good contact pressure for the drive wheels is achieved.

Preferably, the at least one drive wheel is arranged fixedly on the lower frame element in a spring travel direction of the two further elastic elements, wherein the lower frame element and thus the at least one drive wheel is arranged movably on the upper frame element between two maximum spring positions along a drive spring travel, wherein a rest position of the drive wheel lies between the two maximum spring positions when the service robot is at rest. In other words, a downward springing and an upward springing is possible. The suspension is thus preferably not unidirectional. This has the advantage that contact pressure on the ground can be ensured in the case of troughs and springs upward is possible in the case of thresholds. In other words, ground contact of the drive wheels can always be ensured even on uneven ground or soil. Preferably, the spring travel upwards, i.e. from the rest position to an upper maximum suspension position, is about 10 mm and the spring travel downwards, i.e. from the rest position to a lower maximum suspension position, is about 25 mm.

In a preferred embodiment, the drive wheel spring travel is at least 1.5 times as long, preferably twice as long, as the support wheel spring travel. This has the advantage that the service robot has high driving stability.

According to a preferred embodiment, the length of the drive wheel spring travel is in a range between 15 mm and 50 mm, preferably in a range between 20 mm and 40 mm, and is particularly preferably about 35 mm. This has the advantage that the service robot can be reliably driven by the drive wheels.

Preferably, the spring travel is oriented at least substantially perpendicular to the main extension plane of the autonomously driving base platform. This has the advantage that the design is very compact. Due to the overall very short spring travel, a low center of gravity of the overall system can be achieved.

Preferably, the service unit has a housing with at least one rear wall and two opposing side walls, the housing containing an insulating material, in particular being made of an insulating material. This has the advantage that the housing insulates the interior space in terms of temperature. Thus, on the one hand, objects or foodstuffs can be efficiently cooled in the interior space of the refrigerator. On the other hand, for example, objects to be heated or warm dishes can be kept warm longer. The interior space is defined by the housing, with the side walls, rear wall, lid and base sections and drawers or doors delimiting the interior space. Foam insulation materials such as polyurethane foam or comparable thermal insulation systems are suitable, for example. In addition, the housing is surrounded by an outer shell which is easy to clean and takes into account aesthetic or design-specific aspects of the service unit.

In a preferred embodiment, the housing is manufactured in one piece as an integral structure. This has the advantage that production is particularly simple and efficient. In addition, the number of components is reduced, which facilitates assembly. For example, the housing can be manufactured from a foam body. Preferably, the housing is made from a foam body.

According to an advantageous further development, the service unit comprises a support structure for stabilizing the service unit This has the advantage that the housing can be stiffened overall. The increased bending stiffness during operation, in particular during braking manoeuvres or, for example, when a user is supported on the service unit. The support structure is arranged outside the housing, which means that the insulation of the housing only needs to be interrupted at a few points in the housing. In addition, the support structure can be used in a variety of ways to attach further components and part outside the housing.

Preferably, the support structure comprises at least two side structures, each of the two side structures being associated with a different one of the two side walls. This has the advantage that the service unit has high side stability, wherein the two side structures can be bonded to the side walls of the housing, for example. For example, the two side structures are made of a metal such as aluminum. Alternatively, plastics or fiber composites are also suitable for a side structure.

According to a particularly preferred embodiment, the side structures are arranged at least partially inside and/or at least partially outside the housing. Particularly preferably, the side structures are arranged at least partially inside the housing. This achieves, for example, the technical advantage that housing can be designed to be stable in itself. For example, additional internals such as drawer units or shelf elements can be attached to the side structures inside the housing, thereby improving the insulation of the housing. In other words, it is no longer necessary to make openings in the insulating material of the housing in order to attach built-in components. Overall, this improves the insulation and thus the energy balance.

According to a further preferred embodiment, the housing including the side structures, which are at least partially arranged within the housing, is designed to be completely removable from the service unit. This achieves, for example, the technical advantage that the entire housing including the internals arranged in the housing can be separated from the service unit. Thus, for example, a housing with integrated cooling space or cooled interior space can be removed and replaced by another function. This makes the service unit's field of application more versatile, and the replacement of a housing can be carried out particularly easily and quickly.

In a preferred embodiment, the support structure has a lid structure that connects the at least two side structures to one another. This has the advantage that particularly high stability can be achieved. The support structure together with the lid structure is characterized by high rigidity and good load distribution. In addition, a suitable floor structure connecting the two side structures can be used to realize a cage structure that can achieve particularly high rigidity with low weight. For example, the floor structure can also be used as a load bearing surface. The lightweight structure can be supplemented by an additional rear structure, for example.

According to an advantageous further development, the support structure has at least one drawer rail unit for guiding a drawer unit. A drawer rail unit comprises two opposing rails within the housing to accommodate a drawer unit. This has the advantage that the load of a drawer unit together with its contents is not transferred to the housing structure but directly to the support structure. This means that the drawer unit and its contents can be cooled entirely within the housing.

According to a particularly advantageous further development, the drawer rail unit is connected to the side structures, which are arranged at least partially within the housing. This achieves, for example, the technical advantage that the drawer units can be attached directly to the side structures inside the housing. This improves the insulation of the housing it is no longer necessary to make openings in the insulating material of the housing in order to attach the drawer units. Overall, this improves the insulation and thus the energy balance. For example, the housing may have further drawer rail units for guiding drawer units.

Preferably, the service unit comprises at least one inventory stowage unit, wherein the inventory stowage unit comprises a configuration change drive for transferring the inventory stowage unit from a closed configuration to an open configuration and back. In the locked configuration, access to inventory items stored in the inventory stowage unit is not possible, whereas in the opened configuration such access is possible.

In a preferred embodiment, the inventory stowage unit comprises a configuration state sensor configured to detect, as a configuration state of the inventory stowage unit, whether the inventory stowage unit is currently in the closed configuration or the open configuration, and wherein the configuration state sensor is configured to output configuration state sensor data comprising information about the configuration state detected by the configuration state sensor.

Preferably, the service unit comprises a drawer drive for transferring a drawer unit between a first position and a second position, the drawer drive being arranged on the support structure. This has the advantage that also the load, which is generated by the use of the drive, is directly introduced into the support structure. For example, the first position corresponds to the closed position and the second position corresponds to the open position.

The drawer drive may preferably be a configuration change drive, in which case the first position is the closed configuration and the second position is the open configuration.

In a preferred embodiment, the drawer drive is designed to hold a drawer unit in the first position during a driving movement of the service robot. This has the advantage that the holding force of the drawer drive can be used as an additional safety function. Thus, for example, objects in the drawer unit are secured during the movement of the service robot. This can be particularly advantageous in the event of emergency braking.

According to a further embodiment, the drawer drive is arranged within the housing. This again achieves the technical advantages which are achieved in connection with the preceding embodiments. In particular, the technical advantage is achieved that the drawer drive can be attached, for example, to the side structures within the housing. Thus, the insulation of the housing is preserved and it is no longer necessary to make openings in the insulating material of the housing. According to an advantageous further development, the support structure has further drawer rail units for guiding drawer units. This has the advantage that several drawer rail units are arranged within the housing. For example, the drawer rail units are arranged one above the other and can, for example, have different spacings in the height direction for different drawer modules.

Preferably, the support structure comprises a rear structure that is associated with the rear wall. This has the advantage that the stability of the support structure is additionally improved. Loads can be distributed even better and the cage structure becomes even stiffer. For example, the rear structure is also arranged outside the housing. It can preferably connect the lid to the bottom of the support structure. For example, the support structure can be made entirely of metal such as aluminum. Alternatively, at least individual components of the support structure can be made of a suitable plastic.

In a preferred embodiment, the service unit comprises a cooling device for cooling an interior space substantially defined by the housing. For example, the interior space may also be referred to as a cooling space. This has the advantage that objects or foodstuffs can be cooled within the housing. This is particularly advantageous in connection with a housing made of an insulating material, because the cooling can be particularly efficient. For example, the cooling device is arranged outside the housing. The cooling device comprises, for example, components such as a compressor with control, a temperature controller, at least one fan and a heat exchanger. An evaporator plate, a temperature sensor and at least a second fan for circulating cooled air are arranged inside the housing.

According to an advantageous further development, the cooling device is essentially arranged on the rear structure. This has the advantage that a particularly high stability of the service unit can be achieved. The weight of the cooling device is transferred to the support structure. In addition, easy accessibility of the cooling device from the rear of the service robot can be achieved. For example, the cooling device can be provided by means of an inspection flap, which is arranged in the outer shell of the service unit. It is particularly advantageous to arrange the cooling device as low as possible in order to lower the center of gravity of the service robot as far as possible.

Preferably, the cooling device is designed as a modular unit that can be exchanged. This has the advantage that the cooling device is designed as a complete case-like module and can therefore be replaced very easily and in a short time.

According to an additional embodiment, the cooling device comprises a water tank for collecting water from the interior space. This achieves, for example, the technical advantage that dew water from the interior space or the cooling space can be collected in the water tank. Preferably, the water tank is located outside the interior space. For example, the water tank is located below the cooling device.

According to another advantageous embodiment, a fan is associated with the water tank, the fan being arranged adjacent to a compressor to flow heat from the compressor onto the water tank. This provides, for example, the technical advantage that the evaporation process is facilitated by the warm air flowing onto the water tank. Thus, an excessive amount of water is not accumulated in the water tank and an uncontrolled overflow of the water tank can be prevented. Instead, even small amounts of accumulated water can evaporate immediately and uncontrolled leakage of water onto the floor can be prevented.

Particularly preferably, a fan control unit is associated with the fan for controlling the fan to generate an air flow, in particular evaporation airflow, onto the water tank. This allows, for example, the technical advantage that the fan can be operated by means of targeted air control commands from an air control module to the fan control unit. For example, the fan can be switched on when water enters the water tank. A particularly preferred embodiment includes the cooling device having a cooling device control unit for controlling the temperature of the interior space. This provides, for example, the technical advantage that the temperature within the interior space can be raised to start a defrost configuration for defrosting icing. Particularly preferably, a fan control command for generating an evaporation airflow to the water tank will be issued in parallel.

Preferably, the service unit has a substantially vertically oriented heat channel which is assigned to the cooling device. This has the advantage that waste heat from the heat exchanger can be dissipated upwards. This has the additional advantage of increasing the efficiency of the cooling device.

In a preferred embodiment, the service unit comprises a first fan arranged below a heat exchanger of the cooling device to flow an air flow through the heat exchanger into the heat channel. This has the advantage of allowing improved removal of heat into the heat channel. This leads to a further improvement in the efficiency of the cooling device. For example, additional ventilation slits can be arranged below or at the height of the first fan to allow cold air to flow in from the outside through the outer shell of the service unit.

According to an advantageous further development, the service unit has a second fan which is arranged above the heat exchanger in order to draw an air flow heated by the heat exchanger into the heat channel running above the heat exchanger. This has the advantage of additionally improving the removal of heat from the heat exchanger into the heat channel. This provides an additional improvement in the efficiency of the cooling device.

Preferably, the heat channel has an outlet opening for discharging the heated air flow, the outlet opening being arranged above the heat exchanger. For example, the outlet opening is arranged towards the rear of the service unit. This has the advantage that the heated air flow is not discharged towards a user in front of the service unit. For example, the heat channel is of hose-like design. Preferably, the heat channel is designed to be easily removable or replaceable. For example, the heat channel is arranged on the rear wall of the housing.

In a preferred embodiment, the service unit has at least one drawer unit, the drawer unit being designed to be transferable between a first position and a second position. This has the advantage that objects can be stored in the drawer unit and thus transported by means of the service unit. For example, a plurality of drawer units may also be integrated into the service unit. For example, these drawer units are arranged one above the other. For example, the drawer units may exhibit different sizes. Additionally or alternatively, folding elements can also be integrated into the service unit. This is particularly advantageous for larger items or heated dishes. Preferably, the first position corresponds to the closed position and the second position to an open position.

According to an advantageous further development, the drawer unit is assigned to the drawer rail unit. This has the advantage that a drawer unit can be easily inserted into the service unit and also replaced or exchanged. Load transfer would always be from each drawer rail unit to the support structure. Several drawer units are correspondingly assigned to several drawer rail units respectively but can be exchanged among each other.

Preferably, the drawer unit has an opening state sensor configured to detect an opening state of the drawer unit and output opening state data with information on the opening state detected by the opening state sensor. For example, the opening state sensor outputs opening state data whether a drawer unit is closed. For example, the opening state data is requested before the service robot is transferred to a driving movement. Thus, the opening state data serves a safety function of the service robot because the opening state data must output a closed drawer unit for the service robot to be allowed to move. The opening state sensor may preferably be a configuration state sensor. In a preferred embodiment, the drawer drive is configured to hold a drawer unit in a position. This has the advantage that the holding force of the drawer drive can be used as an additional safety function. Thus, for example, objects in the drawer unit are secured during the movement of the service robot. This can be particularly advantageous in the event of emergency braking.

According to an advantageous further development, a locking unit is assigned to the drawer unit, which is designed to lock the drawer unit in the first position. This has the advantage that the locking unit has an additional safety function, whereby the drawer module remains secured during the driving movement of the service robot. For example, such a locking unit may comprise a magnetic switch. In addition, the embodiment is energy-saving because the drive does not have to permanently maintain the closed state.

Preferably, the drawer unit is designed to accommodate a plug-in unit. This has the advantage that different plug-in units can be arranged in the drawer unit. For example, plug-in units can be used for storing bottles or for storing objects. However, the function is not limited to these examples.

In a preferred embodiment, the drawer unit has a connector for connecting a data transmission connector of the plug-in unit to receive inventory sensor data output by an inventory sensor of the plug-in unit and transmit it to an inventory transmission module. This has the advantage of enabling monitoring of inventory that is inserted into the drawer unit. This monitoring is possible regardless of the specific plug-in unit. The inventory transmission module described in this embodiment corresponds to the inventory transmission module described elsewhere in this description.

According to an advantageous further development, the drawer unit has a cable chain. This has the advantage that any form of cables, lines or other connecting means between the service unit and drawer unit can be routed protected within the cable chain. This also makes it very easy to replace the drawer module. In particular, a simple connection to the control unit of the service robot is possible. The cable chain moves with the drawer module when it is opened and closed.

Preferably, the cable chain is designed to accommodate at least one data transmission cable. This has the advantage that the data connection cable can be arranged well protected in the cable chain. For example, a power supply cable can also be arranged in the cable chain in addition to the data connection cable. In addition, both the data connection cable and the power supply cable can be connected to the service unit by means of a simple connector plug. These connectors can be implemented separately or by means of a common connector. This makes it very easy to remove or change a drawer unit without any major assembly work.

In a preferred embodiment, the at least one data transmission cable is designed to transmit inventory sensor data to an inventory transmission module. This has the advantage that it is possible to monitor inventory that is inserted into the drawer unit. This monitoring is possible regardless of the specific plug-in unit. The data transmission cable can be used independently of the concrete plug-in unit or of the concrete inventory. All conceivable data can be transmitted. The inventory transmission module described in this embodiment corresponds to the inventory transmission module which is also described elsewhere in this description.

According to an advantageous further development, the service unit has a drawer unit with a drawer front with a circumferential sealing element. This has the advantage that the drawer unit is insulated in the best possible way in terms of temperature. An additional advantage is that the edges of the drawer are circumferentially protected. This safety aspect prevents, for example, the risk that a child or another user of the service robot may injure himself on the drawer unit. For example, the sealing element is designed as a movable rubber seal. In addition, several drawer units are also conceivable, each of which has circumferential sealing elements. In this way, the seal between two drawer units arranged directly next to each other is realized by two sealing elements resting against each other.

Preferably, the circumferential sealing element comprises magnetic elements arranged at least in sections. This has the advantage that a magnetic element can interact, for example, with a frame element of the housing or with a corresponding additional magnetic element. As a result, an existing air gap is completely closed and temperature insulation is particularly efficient. For example, the magnetic elements can be accommodated directly in the sealing element. For this purpose, the sealing elements can be formed with a corresponding cavity. In addition, the sealing of an air gap between a first sealing element and a corresponding frame of the service unit or a corresponding further sealing element can be additionally increased if the sealing elements are designed to be movable.

In a preferred embodiment, the service unit has a second drawer unit with a second drawer front with a circumferential sealing element, the first and second drawer fronts being arranged directly adjacent to one another in a closed position of the first drawer unit and the second drawer unit. This has the advantage that the sealing element can close both the air gap between two adjacent drawer fronts and the air gap between a drawer front and a frame element of the service unit. This means that the sealing element can be used for different locations.

According to an advantageous further development, a magnetic element of the first drawer front and a magnetic element of the second drawer front are designed to interact with one another in a closed state of the first drawer unit and the second drawer unit in order to close an air gap between the first drawer front and the second drawer front. This has the advantage that the closing of an air gap is particularly reliable and largely automatic. Furthermore, no holding force is required in the closed state, since the magnets act independently and hold on to the closure of the air gap. Thus, a reliable connection between two drawer units can be made without an additional fixed frame, which is arranged between the drawer units. This has an advantageous effect on the weight of the service unit.

Preferably, the service unit comprises a first drawer unit having a first depth and a second drawer unit having a second depth, the first depth being different from the second depth. This has the advantage that the drawer units can be used for different purposes depending on their depth. In this context, the depth of a drawer unit is understood as the distance from the respective drawer front to the rear end of the respective drawers. The rear end is understood as that side of the drawer unit which faces the drawer front and is associated with the rear wall of the housing in a state installed in the service unit. Additionally, the service unit may include a first drawer unit having a first height and a second drawer unit having a second height, the first height being different from the second height. The height is understood to be substantially the height of the respective drawer front when the service robot is in operation.

Preferably, the service unit has a display unit for displaying display information, a payment unit for paying for services provided by means of the service robot, and an input unit for entering input data. This has the advantage that the service unit can perform a purchase operation independently. The display unit is, for example, a screen, preferably a touchscreen. The payment unit is preferably a unit operating with near field communication. The input unit is preferably a control panel, for example a touchscreen, The touchscreen of the input unit can be the touchscreen of the display unit.

In a preferred embodiment, the service unit has a coupling area comprising electrical coupling devices for electrically coupling the service unit to electrical counter coupling devices of the autonomously driving base platform and mechanical coupling devices for mechanically coupling the service unit to mechanical counter coupling devices of the autonomously driving base platform. This has the advantage of allowing easy coupling from the autonomously driving base platform to the service unit and vice versa. The coupling area is preferably formed on an underside of the service unit. The electrical coupling devices as well as the electrical counter coupling devices are preferably plug-socket arrangements. Electrical coupling here also includes data coupling, i.e. coupling in which data is transmitted.

According to a preferred embodiment, the plurality of all electrical coupling devices is arranged grouped in a few common electrical coupling areas, in particular in one, two or three electrical coupling areas. This has the advantage that the electrical coupling devices can be connected quickly. For simplicity, a single electrical coupling area is assumed in the following. However, several electrical coupling areas would also be conceivable. Preferably, all electrical coupling devices are arranged in a grouped manner in the common electrical coupling area. The area of the common electrical coupling area is preferably significantly smaller than that of the coupling area. Significantly smaller in this case means that it accounts for at most one tenth, preferably at most one twentieth, particularly preferably at most one fiftieth of the area of the coupling area. Since the electrical coupling devices are arranged in groups in this common electrical coupling area, which is significantly smaller in area than the coupling area, the electrical connections assigned to the electrical coupling devices can be connected and disconnected particularly quickly. Particularly preferably, at least some of the electrical coupling devices are arranged in a common coupling body in such a way that they can be connected or disconnected simultaneously.

Preferably, the common electrical coupling area is arranged at a decentralized area of the coupling area. In the case of two electrical coupling areas, these are accordingly advantageously arranged at two decentralized areas of the coupling area. For example, the electrical coupling areas can be arranged on two opposite sides. This has the advantage that the electrical coupling devices are easily accessible. In this context, decentralized is understood to mean an area remote from a center of the coupling area. Preferably, the decentralized area is an edge area of the coupling area. If the coupling area is arranged at the decentralized area, in particular the edge area, the electrical coupling devices for coupling the autonomously driving base platform to the service unit are particularly easily accessible.

In a preferred embodiment, the common electrical coupling area has a data interface, a safety interface and a power interface. Here, the data interface is used to transfer data between the service unit and the autonomously driving base platform. The data interface may have at least some, preferably all, of the following connections: USB 3, USB-C, CAN bus, Ethernet (preferably 2), audio connector (preferably in the 3.5 mm version), HDMI. Furthermore, the safety interface is used to transmit safety-related data between a user and the autonomously driving base platform or between the service unit and the autonomously driving base platform. The safety interface may include at least some, preferably all, of the following: Programming interface, Digital input/output (preferably 10), Emergency stop button (preferably 2). Furthermore, the power interface is used to transmit power from the autonomously driving base platform to the service unit. However, transmission in the reverse direction is also conceivable. In the event that the service robot has only one energy source formed in the autonomously driving base platform, the energy interface serves to supply the service unit with energy from the energy source. The energy interface is preferably an interface for 24 V DC voltage.

Preferably, the coupling area has a load bearing surface or coupling plate. This has the advantage that the load bearing surface can be easily coupled to the autonomously driving base platform. Thus, the load bearing surface of the service unit can be easily coupled to the autonomously driving base platform and hereby support the mechanical coupling between the autonomously driving base platform and the service unit.

In a preferred embodiment, the load bearing surface has a length of 60% to 90%, preferably 70% to 80%, particularly preferably about 75% of the total length of the autonomously driving base platform, with the load bearing surface having a width of 40% to 80%, preferably 50% to 70%, particularly preferably about 65% of the total width of the autonomously driving base platform. This has the advantage that the load bearing surface has a large surface area. For example, the load bearing surface can have a length of 480 mm to 670 mm, preferably 520 mm to 620 mm, particularly preferably about 570 mm. For example, the load bearing surface can have a width of 350 mm and 520 mm, preferably 400 mm and 480 mm, and particularly preferably 440 mm.

Preferably, the mechanical coupling devices are arranged or can be arranged on the load bearing surface and/or inside the load bearing surface. This has the advantage that the mechanical coupling devices can be used to mechanically couple the autonomously driving base platform to the service unit. In particular, all coupling devices are preferably arranged on and/or in the load bearing surface. The mechanical coupling of the autonomously driving base platform and the service unit thus preferably takes place at the load bearing surface, so that coupling and force application take place in local proximity and a short force flow is created. In particular, the coupling devices are preferably arranged decentrally on the load bearing surface. This makes them particularly accessible.

Preferably, the common electrical coupling area is arranged outside the load bearing surface. This has the advantage that no mechanical force acts on the electrical connections, so that they can perform their tasks reliably and safely. The arrangement also enables a particularly long service life of the electrical connections.

According to a preferred embodiment, the mechanical coupling devices have centering devices for centering the position of the service unit and the autonomously driving base platform and fastening devices for fastening the service unit and the base platform to each other. This has the advantage that by means of the centering device the assembly is simplified and it is ensured that a proper assembly takes place.

Preferably, the centering devices are designed as centering pins and/or centering holes. The advantage of this is that it enables cost-effective and easy centering between the autonomously driving base platform and the service unit.

In a preferred embodiment, the fastening devices are designed as clamp connectors. The advantage of this is that the clamping connectors enable advantageous tool-free attachment and detachment from the autonomously driving base platform and the service unit. Preferably, each clamping connector is assigned a centering pin in such a way that they are arranged adjacent to one another. Particularly preferably, 5 centering pins and 4 clamping connectors are arranged.

According to a preferred embodiment, the service unit has at least one inventory sensor for detecting an inventory measurand and for outputting inventory sensor data with information on the detected inventory measurand. This has the advantage that the inventory can be detected by means of an inventory measurand and inventory sensor data can be output.

Preferably, the service unit has at least one inventory sensor for detecting an inventory sensor data and for outputting inventory sensor data with information on the detected inventory sensor data. This has the advantage that the inventory of the service unit can be determined with the at least one inventory sensor.

Advantageously, the service unit comprises an inventory item support surface and at least one weight detection sensor for detecting a weight of at least one inventory item supported on the inventory item support surface and for outputting weight detection sensor data including information on the weight detected by the at least one weight detection sensor, wherein each of the at least one weight detection sensor is one of the at least one inventory sensor, whereby the weight detectable by the at least one weight detection sensor is the inventory measurand detectable by the at least one weight detection sensor and the weight detection sensor data is the inventory sensor data outputtable by the at least one weight detection sensor.

The at least one weight detection sensor has the advantage that, for determining the inventory of the service unit, the weight of individual inventory items and thus objects of the inventory of the service unit, such as bottles and cans, or of several such inventory items can be determined together. This enables a simple and reliable determination of the inventory or at least part of the inventory of the service unit. In both cases, it is irrelevant whether the inventory item contact surface belongs to the at least one weight detection sensor or not. Also, in both cases, it is immaterial whether the weight of the one inventory item or multiple inventory items rests on a single weight detection sensor or on two, three, four or more different weight detection sensors. If the service unit has two, three, four or more weight detection sensors, it is possible, for example, for the service unit to have a weight detection pad as an inventory item support surface which, during operation of the service unit, in particular during operation of the service robot, rests on the force application positions of at least some, in particular three or four, of these weight detection sensors, the inventory item or items whose weight is or are to be determined resting on the weight detection pad.

Preferably, each of the at least one weight sensor is designed to detect a weight in a range of 0 kg to 2 kg more accurately than to within 3 g, more preferably more accurately than to within 2 g, most preferably more preferably more accurately than to within 1 g. This has the advantage that the weight of the at least one inventory item can be determined with a precision that enables reliable identification of the at least one inventory item resting on the inventory item support surface.

In a variant to this, however, there is also the possibility that only one or only some of the at least one weight sensor is designed to detect a weight in a range from 0 kg to 2 kg more accurately than to 3 g, particularly preferably more accurately than to 2 g, very particularly preferably more accurately than to 1 g, while at least one of the at least one weight sensor is designed to detect a weight in a range from 0 kg to 2 kg accurately to 3 g or less.

Alternatively to these variants, however, it is also possible that all of the at least one weight sensor are configured to detect a weight in a range of 0 kg to 2 kg to within 3 g or less. Preferably, the service unit comprises at least one weight detection pad as an inventory item support surface, wherein each of the at least one weight detection pad is coupled to at least one of the at least one weight detection sensor to detect the weight of the at least one inventory item during operation of the service robot when the at least one inventory item is supported on the respective weight detection pad. This has the advantage that the weight of the at least one inventory item resting on the respective weight detection pad can be precisely detected. Preferably, each of the at least one weight detection sensor has a force application position for detecting a force acting on the respective weight detection sensor at the force application position in order to detect the weight of the at least one inventory item. In this context, it advantageously applies for each of the at least one weight detection pad that the respective weight detection pad is advantageously coupled to the at least one of the at least one weight detection sensor, in that the weight detection pad is in each case coupled at least to the force application position of the respective weight detection sensor and/or of the force application positions of the respective weight detection sensors, so that, during operation of the service robot, when the at least one inventory item is positioned on the respective weight detection pad, a force corresponding to the weight of the respective at least one inventory item is applied to the force application position of the weight detection sensor coupled to the respective weight detection pad or to the force application positions of the at least one of the at least one weight detection sensors. acts on the force application positions of the weight detection sensors coupled to the respective weight detection pad, in order to determine the weight of the at least one inventory item during operation of the service robot. This has the advantage that the weight of the at least one inventory item resting on the respective weight detection pad can be detected very precisely and reliably.

Advantageously, each of the at least one weight detection sensor is thus a sensor for detecting a force acting on the weight measurement position of the at least one weight detection sensor. In a particularly preferred variant thereof, the at least one weight detection sensor is arranged aligned in the service unit in such a way that during operation of the service unit, in particular during operation of the service robot, the force that can be determined by the at least one weight detection sensor is aligned essentially vertically downwards. This ensures that, during operation of the service unit or the service robot, an inventory item resting directly or indirectly on the force application position of the respective weight detection sensor presses with its weight against the force application position with a force directed essentially vertically downwards due to gravity, whereby the weight acting against its force application position can be determined by the respective weight detection sensor. It is irrelevant whether the weight of the inventory item to be detected acts on a single weight detection sensor or that the weight of the inventory item to be detected acts on two or more weight detection sensors. In the latter case, the weights detected by the two or more affected weight detection sensors shall simply be added up to determine the weight of the inventory item. This summation may be performed, for example, by an inventory transmission module. In variants thereof, however, the at least one weight detection sensor can also be arranged in a different orientation in the service unit. In this case, for example, deflection devices can be provided which, during operation of the service unit or the service robot, deflect the force directed vertically downwards by the weight of the inventory item due to gravity so that it presses against the force application position of the respective at least one weight detection sensor.

In a variant thereto, however, it is also possible that not each of the at least one weight detection sensor has a force application position for detecting a force acting on the respective weight detection sensor at the force application position in order to detect the weight of the at least one inventory item. Thus, the at least one weight detection sensor may also be configured in a different manner. For example, the at least one weight detection sensor may be configured to detect a positional deflection of a force indicating element biased by an elastic element such as a spring, wherein the force indicating element is not part of the respective weight detection sensor.

Advantageously, the service unit has at least three, at least four or at least five weight detection sensors for detecting a weight of at least one inventory item and for outputting weight detection sensor data with information on the weight detected by the respective one of the at least three, at least four or at least five weight detection sensors, each of the at least three, at least four or at least five weight detection sensors being one of the at least one inventory sensor and the service unit thus having at least three, at least four or at least five inventory sensors, respectively, with the weight detectable by each of the at least three, at least four or at least five weight detection sensors being the weight detectable by the respective inventory sensor and the weight detectable by each of the at least three, at least four or at least five weight detection sensors being the weight detectable by the respective inventory sensor. at least five inventory sensors, whereby the weight detectable by each of the at least three, at least four or at least five weight detection sensors is the inventory measurement detectable by the respective weight detection sensor and the weight detection sensor data is the inventory sensor data output by the respective weight detection sensor. This has the advantage that a more differentiated detection of the weights of the inventory items is made possible, with which the inventory of the service unit can be determined more precisely.

Alternatively, however, it is also possible for the service unit to have only one or only two such weight detection sensors.

Preferably, the service unit comprises at least two weight detection pads as inventory item support surfaces, wherein one of the at least two weight detection pads is coupled to exactly one of the weight detection sensors to detect the weight of the at least one inventory item during operation of the service robot when the at least one inventory item is positioned on the weight detection pad coupled to exactly one of the weight detection sensors.

This has the advantage of allowing the weights of inventory items resting on two different weight detection pads to be recorded, allowing the inventory of the service unit to be determined in more detail.

Preferably, the service unit has at least two weight detection pads as inventory item support surfaces, wherein two of the at least two weight detection pads are each coupled to exactly one different one of the weight detection sensors in order to detect the weight of the at least one inventory item during operation of the service robot when the at least one inventory item is positioned on one of the two weight detection pads each coupled to exactly one different one of the weight detection sensors. This has the advantage of allowing very precise detection of the weights of inventory items resting on two different weight detection pads, which allows the inventory of the service unit to be determined much more accurately.

Preferably, one of the at least one weight detection pad is coupled to at least two, more preferably at least three, of the weight detection sensors to detect the weight of the at least one inventory item during operation of the service robot when the at least one inventory item is positioned on the weight detection pad coupled to at least two or at least three, respectively, of the weight detection sensors. The weight detection pad coupled with at least two or at least three, respectively, of the weight detection sensors has the advantage that it can be formed comparatively large and still allows a precise detection of the weight resting on this weight detection pad. A comparatively large weight detection pad allows several of the at least one inventory item to be placed on it or a particularly large inventory item to be placed on it.

As an alternative to these variants, however, it is also possible for the service unit to have only one or no such weight detection pad as an inventory item support surface.

In a preferred variant thereof, each of the at least one weight detection sensor is arranged on a respective printed circuit board. Each of the at least one weight detection sensor can be arranged on the same printed circuit board or on different printed circuit boards. Alternatively, however, it is also possible that the at least one weight detection sensor is not arranged on a printed circuit board. If the service unit has more than one weight detection sensor, the weight detection sensors are preferably arranged on the same printed circuit board. This allows the weight detection sensors to be compact and easily interchangeable. Regardless of the number of printed circuit boards with the at least one weight detection sensor, the service unit preferably comprises the printed circuit board or the different printed circuit boards. Advantageously, the aforementioned plug-in unit, which can be accommodated in the drawer unit, has the at least one weight detection sensor or the at least three, at least four or at least five weight detection sensors and, if appropriate, the at least one weight detection pad or at least two weight detection pads.

This has the advantage that, depending on requirements, the plug-in unit with the at least one weight detection sensor or the at least three, at least four or at least five weight detection sensors and, if necessary, the at least one weight detection pad or at least two weight detection pads can be easily installed in a drawer unit or removed again. Thus, a simple adaptation of the service unit to the services to be provided with the service robot is made possible. This advantage is further enhanced if each of the at least one weight detection sensor is arranged on the same printed circuit board.

Advantageously, the plug-in unit has a connection between the at least one weight detection sensor or the at least three, at least four or at least five weight detection sensors of the plug-in unit and the data transmission connector of the plug-in unit for connection to the connection of the drawer unit in order to receive the inventory sensor data output by the at least one weight detection sensor or the at least three, at least four or at least five weight detection sensors of the plug-in unit and to transmit it to the inventory transmission module. This has the advantage of providing a simple way to determine the inventory in one of the drawer units.

In a first variant, the service unit has such a plug-in unit with the at least one weight detection sensor or the at least three, at least four or at least five weight detection sensors and, if appropriate, the at least one weight detection pad or at least two weight detection pads. In a second variant, the service unit has two or more such plug-in units, each having the at least one weight detection sensor or the at least three, at least four or at least five weight detection sensors and, if appropriate, the at least one weight detection pad or at least two weight detection pads. As an alternative to these variants, however, it is also possible for the plug-in unit to have none of the at least one weight detection sensor or the at least three, at least four or at least five weight detection sensors and, if appropriate, none of the at least one weight detection pad or at least two weight detection pads.

Preferably, the service unit comprises a product feed unit for receiving at least one inventory item, the product feed unit having a front stop and a rear stop, the rear stop being slidably mounted to the product feed unit and slidable away from the front stop, for allowing one or more inventory items to be arranged between the front stop and the rear stop in the product feed unit, and wherein the rear stop is slidable toward the front stop to move one or more inventory items arranged between the front stop and the rear stop toward the front stop. Such a product feed unit has the advantage that one or more inventory items can be received between the front stop and the rear stop of the product feed unit, wherein the rear stop can be displaced relative to the front stop until the inventory item or items are arranged flush with each other and flush with the front stop and flush with the rear stop. This makes it easy to prevent the inventory item(s) from slipping during driving movement of the service robot.

Preferably, the product feed unit has a stop drive for moving the rear stop toward the front stop and away from the front stop. This has the advantage that the stop drive can be used to move the rear stop in the direction of the front stop until the inventory item(s) is/are arranged flush with each other and flush with the front stop as well as flush with the rear stop. This makes it easy to prevent the inventory item(s) from slipping during driving movement of the service robot. In addition, the stop drive with the rear stop in the product feed unit can be used to move the inventory item(s) towards the front stop when the inventory item previously located there has been removed.

Alternatively, however, it is also possible for the product feed unit not to have a stop drive but a stop pretensioning device, in particular a spring device, with which stop pretensioning device or spring device the rear stop can be pretensioned or biased towards the front stop.

Preferably, the service unit comprises a stop position sensor for detecting a position of the rear stop and for outputting stop position sensor data, wherein the stop position sensor is one of the at least one inventory sensor, whereby the position of the rear stop determined by the stop position sensor is the inventory sensor data that can be detected by the stop position sensor and the stop position sensor data is the inventory sensor data that can be output by the stop position sensor.

The stop position sensor has the advantage that the position of the rear stop can be used to determine the inventory of the service unit.

Advantageously, the product feed unit has the stop position sensor. This has the advantage that the product feed unit can be designed as a modular unit that can be easily installed and removed from the service unit.

In a first preferred variant, the stop position sensor is an encoder for detecting the position of the rear stop in the product feed unit. This has the advantage that the position of the rear stop in the product feed unit can be detected very reliably.

In a second preferred variant, the stop position sensor is a distance meter, i.e. a distance measuring sensor, particularly preferably an optical distance meter, for detecting a distance between the rear stop and a reference point, the reference point being fixedly arranged relative to the front stop. This has the advantage that the stop position sensor can be designed to be very compact, which means that the product feed unit can be designed to be very compact and can thus accommodate more inventory items compared to its size.

If the stop position sensor is a distance sensor, the stop position sensor is preferably arranged on an element of the service unit that is fixed relative to the front stop, particularly preferably on the product feed unit, in order to detect a distance between the element that is fixed relative to the front stop and the rear stop. This has the advantage that the product feed unit can be designed to be very robust and to function reliably.

When the stop position sensor is a distance measuring sensor, the stop position sensor is preferably an optical distance measuring sensor, i.e., an optical distance measuring sensor which is arranged at the rear stop to detect a distance between the service unit element fixed relative to the front stop and the rear stop. This has the advantage that, in the event of damage, the rear stop can be formed replaceable in a simple manner to repair or replace the stop position sensor. This simplifies maintenance of the service unit and the service robot.

In both cases just mentioned above, the element fixed relative to the front stop forms the reference point mentioned above. In both cases, the element of the service unit that is fixed relative to the front stop is advantageously arranged on a side of the rear stop opposite the front stop. This has the advantage that the distance of the rear stop from the front stop can be reliably detected even in the case of inventory items accommodated between the rear stop and the front stop in the product feed unit.

As an alternative to these variants, it is also possible for the product feed unit not to have such a stop position sensor.

Advantageously, the product feed unit is the aforementioned plug-in unit that can be accommodated in the drawer unit. This has the advantage that the product feed unit or plug-in unit can be easily installed in a drawer unit or removed again as required. This makes it easy to adapt the service unit to the services to be provided by the service robot.

Advantageously, the product feed unit or plug-in unit has a connection of the stop position sensor of the product feed unit or plug-in unit to the data transmission connector of the product feed unit or plug-in unit for connection to the connector of the drawer unit in order to receive the inventory sensor data output by the at least one inventory sensor of the product feed unit or plug-in unit and to transmit it to the inventory transmission module. This has the advantage of providing a simple way to determine the inventory in one of the drawer units.

In a first variant, the service unit has one such plug-in unit in the form of the product feed unit described above. In a second variant, the service unit has two or more such plug-in units, each in the form of the product feed unit described above.

As an alternative to these variants, however, it is also possible for the service unit not to have such a plug-in unit in the form of the product feed unit described above. Thus, the service unit can also have the product feed unit described above without the product feed unit being the plug-in unit described above. Equally, however, the service unit may also be entirely without the product feed unit.

Advantageously, the service unit comprises an inventory monitoring unit for receiving at least one inventory item, the inventory monitoring unit comprising at least one inventory image sensor for capturing an image of the at least one inventory item received in the inventory monitoring unit and for outputting inventory image sensor data comprising information on the image captured by the at least one inventory image sensor wherein each of the at least one inventory image sensor is one of the at least one inventory sensor, whereby the image detectable by the at least one inventory image sensor is the inventory quantity detectable by the at least one inventory image sensor and the inventory image sensor data is the inventory sensor data outputtable by the at least one inventory image sensor.

This has the advantage that the presence of a particular inventory item in the inventory monitoring unit can be monitored in a simple manner, while at the same time the condition of the particular inventory item can also be monitored. This is particularly advantageous for fragile as well as for particularly valuable inventory items.

Advantageously, the at least one inventory image sensor for capturing an image is a video camera for capturing a film and thus for capturing a plurality of successive images. This has the advantage of enabling uninterrupted monitoring of the particular inventory item in the inventory monitoring unit.

Alternatively, however, the inventory image sensor may not be a video camera for capturing a film.

Advantageously, the inventory monitoring unit has a light source for illuminating the at least one inventory item recorded in the inventory monitoring unit. This has the advantage that, due to the illumination of the at least one inventory item, the at least one inventory item is optimally recognizable in the image or images or movies captured by the at least one inventory image sensor. Thus, this enables safe and reliable monitoring of a condition of the at least one inventory item recorded in the inventory monitoring unit.

Preferably, the inventory monitoring unit is the aforementioned plug-in unit that can be accommodated in the drawer unit.

This has the advantage that, depending on requirements, the inventory monitoring unit or plug-in unit can be easily installed in a drawer unit or removed again. This makes it easy to adapt the service unit to the services to be provided with the service robot. Advantageously, the inventory monitoring unit or plug-in unit has a connection of the at least one inventory image sensor of the inventory monitoring unit or plug-in unit to the data transmission connector of the inventory monitoring unit or plug-in unit for connection to the connector of the drawer unit in order to receive the inventory sensor data output by the at least one inventory sensor of the inventory monitoring unit or plug-in unit and to transmit it to the inventory transmission module.

In a first variant, the service unit has one such plug-in unit in the form of the inventory monitoring unit described above. In a second variant, the service unit has two or more such plug-in units, each in the form of the inventory monitoring unit described above.

As an alternative to these variants, however, it is also possible for the service unit not to have such a plug-in unit in the form of the inventory monitoring unit described above. Thus, the service unit can also have the inventory monitoring unit described above without the inventory monitoring unit being the plug-in unit described above. Equally, however, the service unit may also be entirely without the inventory monitoring unit.

As an alternative to these variants, it is also possible for the service unit to have none of the inventory sensors described above.

Preferably, the service robot has one of the service units described here as a service unit. In this case, the advantages of the service unit described can also be transferred to the service robot.

The service unit can be exchangeably attached to the base platform.

An advantageous embodiment of the invention relates to an arrangement for providing services at the local vicinity of people by means of one of the service robots described herein, the arrangement comprising the service robot described herein, a service unit described herein, and an operating module for operating the service robot. In this regard, the advantages of the service robots are transferable to the arrangement. In a preferred variant, the service robot includes the operating module. In this variant, the arrangement is formed by the service robot. This has the advantage that the service robot can be operated autonomously. In another preferred variant, on the other hand, the operating module is formed separately from the service robot, either in whole or in part. For example, first components of the operating module may be formed as software running on a personal computer or on a cloud, while the service robot comprises other components of the operating module that are different from the first components, the service robot and the personal computer or the cloud each comprising communication means for communicating the personal computer or the cloud with the service robot or the service robot with the personal computer or the cloud, respectively. This has the advantage that the arrangement can also include, for example, more than one service robot according to the invention, and that in this case the service robots can be operated together at least in parts.

According to an advantageous further development, the operating module comprises a cooling device control module for controlling the cooling device control unit, wherein the cooling device control module is adapted to output cooling device control commands comprising information on a desired temperature to be present in the cooling space to within an allowable deviation therefor and/or information for driving the desired temperature wherein the cooling device control unit is connected or connectable to the cooling device control module for receiving the cooling device control commands, and wherein the cooling device control unit is adapted to control the cooling device in accordance with the cooling device control commands received from the cooling device control module.

This makes it possible to control or regulate the temperature in the cold room. The permissible deviation can be, for example, +/−1° C., in particular +/−0.5° C.

In an advantageous further development, the operating module comprises a fan control module for controlling the fan control unit, wherein the fan control module is adapted to output fan control commands comprising information on a desired air flow to be generated by the fan and/or information for driving the desired air flow, the fan control module is adapted to output fan control commands with information on a desired air flow to be generated by the fan and/or information for controlling the desired air flow to be generated by the fan, wherein the fan control unit is connected or connectable to the fan control module for receiving fan control commands, and wherein the fan control unit is adapted to control the fan according to the fan control commands received from the fan control module.

This makes it possible to control the fan or the air flow to be generated by the fan.

According to an advantageous further embodiment, the operating module is adapted to start and stop a defrost configuration, wherein the cooling device control module is adapted to output a cooling device control command in the defrost configuration for reaching a defrost temperature for defrosting icing within the refrigeration chamber, and wherein the fan control module is adapted to output a fan control command in the defrost configuration for reaching an evaporation airflow for evaporating water from the water tank.

This allows the cooling device's cooling chamber to be defrosted to remove icing within the cooling chamber. Such icing can in particular cause problems when transferring the inventory stowage unit to the open configuration. The defrost configuration may, for example, be terminated again automatically after the expiration of a predeterminable period of time, for example one hour, from the start. Preferably, the defrost configuration can be started automatically at a predeterminable time and/or at a predeterminable rhythm. For example, the defrost configuration can be started 1 time per day. Particularly advantageously, the defrost configuration can be started at night at a predeterminable time.

The defrosting water flows into the water tank. Since the fan in the defrost configuration generates an evaporation airflow suitable for evaporating water from the water tank, water can be removed from the water tank. Therefore, it is not necessary to manually empty the water tank. According to a preferred embodiment, the operating module comprises an order module for receiving user orders and for outputting order data comprising information on the received user orders, the order data comprising at least destination data comprising information on at least one destination where the corresponding user orders are to be fulfilled by the service robot. This has the advantage that orders can be assigned to the service robot or the arrangement. Since the order data includes destination data, such as a destination in the work area, the service robot can travel to the user, such as the customer or the service employee. In other words, user orders are received by means of the order module, and order data including information on the received user orders is output by means of the order module.

The order data can preferably also contain further information. For example, this further information can contain information about a user identification, information about an authorization or about display information to be displayed.

According to a preferred embodiment, the user order can be triggered by a call from a room telephone, the room telephone being assigned to a room number of a hotel room in a hotel. For example, it is possible that the user order is triggered by dialing a definable key or key combination.

Preferably, the destination is a predetermined point in front of a hotel room door of a hotel room, in particular with a room number of the respective hotel room assigned to the respective hotel room, in a hotel. Preferably, the service robot is adapted to orient itself towards the hotel room door upon arrival at the predetermined point.

In a preferred embodiment, the order data contains a user identification for the user who commissioned the user order. This makes it possible to execute the orders in a more user-specific manner. According to a preferred embodiment, the user identification comprises a room number that is assigned to a hotel room in a hotel. In this way, the user identification can already include the destination.

Preferably, the order module is designed for checking user orders, whereby the order module determines, when checking a user order, whether special information is available for the user identification contained in the order data of the respective user order, which has an influence on the respective user order. The special information may be contained in the user identification or may be obtained by the order module from another source of information, such as a hotel guest directory. For example, the special information may be information about the age of the user that precludes the user from purchasing certain inventory items, such as food containing alcohol. Another example would be a special status, such as membership in a membership rewards program, assigned to the user. For example, the status may be associated with free or lower cost use of the service robot. Furthermore, by checking the user orders, it is possible to deny the use of the service robot to individual users in the case of definable characteristics.

Preferably, the operating module has a position determination module for determining a current position of the service robot and for outputting position data with information about the current position of the service robot. In this regard, the current position may include only the current local position or both the current local position and the current orientation of the service robot. Regardless of whether the current position includes only the current local position or both the current local position and the current orientation of the service robot, at this has the advantage that the operating module can access the current position of the service robot. In other words, a current position of the service robot is determined and information about the current position of the service robot is output. In this regard, the current position may include the orientation of the service robot. In particular, the position data may preferably include X-axis position data, Y-axis position data, and angle position data.

In a preferred embodiment, the operating module comprises a navigation module for determining a travel path from the current position of the service robot to the at least one destination and for outputting navigation data based on the determined travel path, wherein the navigation module is connected or connectable to the order module for receiving destination data output from the order module, and wherein the navigation module is connected or connectable to the position determination module for receiving position data output from the position determination module. This has the advantage that the operating module can determine a travel path for the service robot. In other words, the travel path from the current position of the service robot to the at least one destination is determined, and navigation data is output based on the determined travel path.

According to a preferred embodiment, the navigation data includes information about the determined travel path and/or control commands based on the determined travel path, wherein the navigation module is connected or connectable to the control module for outputting the navigation data to the control module. This has the advantage that the control module can be supplied with information for steering the service robot to the destination.

Preferably, autonomous driving of the service robot within an action area is provided, wherein the navigation module contains information on the action area, in particular in the form of a map of the action area, or is designed to receive the information on the action area, in particular in the form of a map of the action area, from a memory arranged separately from the navigation module for storing the information on the action area. This has the advantage that the navigation of the service robot in the action area is simplified on the basis of the information about the action area.

In this context, autonomous driving preferably means that the service robot can move while driving and, in doing so, use sensors and software for localization, navigation and path planning to find its own paths along which it moves. Preferably, the service robot can drive autonomously based on the autonomously driving base platform. Accordingly, the autonomously driving base platform may have the sensors and the software for localization, navigation, and path planning. Likewise, however, the sensors and the software for localization, navigation, and path planning may be arranged elsewhere. For example, they may be arranged in the service unit of the service robot.

Advantageously, the navigation module is designed to determine the travel path from the current position of the service robot to the at least one destination based on the information about the action area. This has the advantage that the travel path of the service robot can be determined in a simple and reliable manner, which simplifies autonomous movement of the service robot within the action area.

Preferably, the navigation module is designed to determine the shortest route from the current position of the service robot to the at least one destination, taking into account boundary conditions such as safety distances to be maintained from predefined locations in the action area and/or partial routes to be preferably selected, in particular partial routes to be preferably selected at predefined times of day, and/or partial routes to be preferably avoided, in particular partial routes to be preferably avoided at predefined times of day.

Preferably, the action area has at least two action subareas spatially separated from each other, wherein at least one transition place is located in each of the action subareas, at which the service robot can move from the respective transition place in the respective action subarea to a transition place in another action subarea and thus to another of the action subareas, wherein the information about the action area includes information about the transition places of the action subareas, in particular about a position of each of the at least one transition place in the respective action subarea and/or about a type of the respective transition place. This has the advantage that autonomous movement of the service robot from one action subarea to another action subarea can be enabled. For example, the spatially separated action subareas may be located on different floors in the same building. In this case, the spatially separated action subareas are separated from each other at least in the vertical direction. However, they can also be separated from each other horizontally, for example. The spatial separation between the action subareas can be accomplished, for example, by a door or airlock. However, the action subareas can also be spatially separated from one another, for example.

Preferably, all of the at least two spatially separated action subareas are accessible to the service robot due to the transition places. It is irrelevant whether the service robot can reach the second action subarea directly from a first action subarea or via a third action subarea or even several further action subareas.

Preferably, the position determination module is designed to determine a current position of the service robot in the action area and to output position data with information about the current position of the service robot in the action area. If the action area has at least two action subareas spatially separated from one another, the position determination module is designed accordingly for determining in which action subarea the service robot is currently located and for determining the current position of the service robot in the respective action subarea and for outputting position data with information about the action subarea in which the service robot is currently located and about the current position of the service robot in the respective action subarea.

Preferably, during driving movement of the service robot, in particular of the autonomously driving base platform, through the action area or during driving movement of the service robot, in particular of the autonomously driving base platform, through one or more action subareas, the operating module is configured to check, on the basis of the work area detection sensor data which are output by the at least one work area detection sensor for detecting the work area of the service robot, whether a subarea of the action area or of the respective action area, which partial area is covered by the working area of the service robot detected at the respective time, fulfills at least one predefined order criterion and, if the partial area does not fulfill the predefined order criterion, to output a corresponding warning message with the information which predefined order criterion is not fulfilled where and when. The at least one predefined order criterion may be, for example, that all windows within the work area detected by the at least one work area detection sensor must be closed at certain times of the day, such as between 18:00 and 08:00. The at least one predefined order criterion can also be, for example, that all room lighting lamps within the work area detected by the at least one work area detection sensor must be turned off at certain times of the day, such as between 19:00 and 07:00. However, the at least one predefined order criterion can also be, for example, that no obstacle may be arranged in an escape route or that, for example, doors of escape routes may not be obstructed. In the latter case, the information on the action area or action subareas also includes information on the escape routes or doors of escape routes. However, the at least one predefined order criterion can also be, for example, that no persons are allowed to be in the work area, that only certain persons are allowed to be in the work area, or that certain persons are not allowed to be in the work area. The at least one predefined order criterion can also be, for example, that no smoke or traces of explosives may be present in the air, on the floor or on objects, that the room temperature must be above or below a limit value, that the air humidity must be above or below a limit value, that a signal strength of a WLAN must be above or below a limit value or that a $CO_2$ content in the air must be below a limit value. In these cases, the workspace detection sensors preferably comprise a sensor to detect the corresponding monitoring variable such as smoke, traces of explosives, room temperature, humidity, W-LAN strength or $CO_2$ content in the air. Further, the predefined order criterion may be, for example, that no one is allowed to tamper with anything on the service robot. For example, if the service robot has the accelerometer arrangement described below, accelerometer data can be used to check whether unauthorized movements or vibrations are detected and, if necessary, an alarm signal can be output because there is a possibility that someone is tampering with the service robot without authorization. However, it is also possible that the operating module is designed differently and does not enable such a check of the action area or action subarea traversed by the service robot or the autonomously driving base platform according to predefined order criteria.

Preferably, a path from a transition place in one of the at least two action subareas to a transition place in another of the at least two action subareas is interrupted or interruptible by a barrier, the barrier being openable to allow the service robot to travel from the respective transition place in the one of the at least two action subareas to the transition place in the other of the at least two action subareas. The barrier may be, for example, a door, a lock, or a barrier. However, the barrier may also be the elevator door of an elevator.

Preferably, the operating module, in particular the service robot, has a barrier communication module for communicating with a control device of the barrier to open the barrier and enable the service robot to move from the respective transition place in one of the at least two action subareas to the transition place in the other of the at least two action subareas. This has the advantage that the service robot can autonomously move from one of these two action subareas to the other of these two action subareas even if a barrier is present between two action subareas.

If the operating module is not, or at least not completely, included in the service robot, it is also possible, in one variant, for the barrier communication module not to be included in the service robot but nevertheless to be part of the operating module.

Preferably, the barrier communication module is adapted to transmit a barrier opening signal to the control device of the barrier to open the barrier and allow the service robot to pass from the respective transition place in one of the at least two action subareas to the transition place in the other of the at least two action subareas. This has the advantage that the Barrier can be opened in a simple manner for the service robot if the service robot should pass the Barrier.

For example, the Barrier Communication Module may be connected or connectable to the Barrier Control Device via an API (application programming interface), or programming interface, via the Internet or a cloud, to transmit the Barrier Opening Signal to the Barrier Control Device. However, instead of an API, the barrier communication module may also be connected or connectable to the barrier control device via other wireless communication, such as Bluetooth, a radio signal other than Bluetooth, an optical signal, or an acoustic signal, to transmit the barrier opening signal to the barrier control device.

Advantageously, the Barrier communication module is adapted to receive a Barrier Open signal from the Barrier or the control device of the Barrier indicating that the Barrier is open to allow the service robot to move from the respective transition place in one of the at least two action subareas to the transition place in the other of the at least two action subareas.

For example, the barrier communication module may be connected or connectable to the barrier control device via an API (application programming interface), or programming interface, via the Internet or a cloud to receive the barrier open signal. However, instead of an API, the barrier communication module may also be connected or connectable to the barrier control device via other wireless communication, such as Bluetooth, a radio signal other than Bluetooth, an optical signal, or an acoustic signal, to receive the barrier open signal.

Preferably, the service robot according to the invention has this barrier communication module regardless of whether it is part of the arrangement or not. In an alternative to these variants, however, it is also possible that the operating module does not have such a barrier communication module.

Preferably, the navigation module is adapted to determine whether the Barrier is open and the service robot can thus drive through the Barrier and pass through the Barrier, and, when it has been determined by the navigation module that the Barrier is open, to output navigation data to the control module to allow the service robot to drive through the Barrier. In this regard, the navigation module can determine whether or not the Barrier is open and thus the service robot can drive through the Barrier based on, for example, work area detection sensor data output from one of the at least one work area detection sensor with information about the detected work area. This has the advantage that the service robot can autonomously determine whether the Barrier is open or not.

Advantageously, the navigation module is designed to output this navigation data to the control module in order to allow the service robot to drive through the Barrier if the Barrier communication module has also received a Barrier open signal. This has the advantage of increasing safety in the operation of the service robot.

Preferably, a transition place in one of the at least two action subareas and a transition place in another of the at least two action subareas are interconnected by a service robot transporting device for transporting the service robot from the respective transition place in one of the at least two action subareas to the transition place in the other of the at least two action subareas. The service robot transporting device has the advantage that, thanks to the service robot transporting device for transporting the service robot, the service robot can reach places that the service robot could not otherwise reach itself by autonomous driving. For example, there may be one or more steps or even one or more floors between the transition place in one of the at least two action subareas and the transition place in the other of the at least two action subareas, which cannot be overcome by the service robot alone, but which the service robot can overcome thanks to the service robot transport device. These advantages are also achieved if the path between the two transition places is at the same time interrupted or interruptible by the barrier described above.

Preferably, the service robot transport device for transporting the service robot from the respective transition place in one of the at least two action subareas to the transition place in the other of the at least two action subareas is an elevator. This has the advantage that the service robot can move in a simple and reliable manner in a building in different floors and can move from one floor to another floor.

The service robot transport device can also be a conveyor belt, an escalator or a stair lift, in particular a stair lift for transporting a wheelchair over one or more steps. Just like the elevator, these variants have the advantage that the service robot can also use common transport devices for transporting people.

Advantageously, the operating module, in particular the service robot, comprises a service robot transport device communication module for communicating with a control device of the service robot transport device, the service robot transport device communication module being adapted to, service robot transport device control commands to the control device of the service robot transport device to control the service robot transport device to transport the service robot from the respective transition place in one of the at least two action subareas to the transition place in the other of the at least two action subareas. This has the advantage that the service robot can autonomously move from one action subarea to another action subarea thanks to the service robot transporting device, even if the service robot itself could not move to the other action subarea by autonomous driving.

The service robot transporting device control instructions may include, for example, an instruction to move the service robot transporting device to the transition place in one of the at least two action subareas where the service robot is to be received by the service robot itransporting device for transporting the service robot to the transition place in the other of the at least two action subareas. In this regard, the service robot transport device control commands may also include a command indicating to which transition place the service robot is to be transported by the service robot itransport device. Further, the service robot transport device control commands may include a command stating that no persons may be transported together with the service robot by the service robot transport device. In addition, the service robot transport device control commands may include a command stating the priority with which the service robot is to be transported with the service robot transport device. The priority may include that the service robot is to be transported with priority compared to persons or that persons are to be transported with priority over the service robot.

For example, the service robot transport device communication module may be connected or connectable to the service robot transport device control device via an API (application programming interface), or programming interface, via the Internet or a cloud to communicate the service robot transport device control commands to the service robot transport device control device. However, the service robot transport device communication module may also be connected or connectable to the service robot transport device control device via other wireless communication such as Bluetooth, a radio signal other than Bluetooth, an optical signal, or an acoustic signal, instead of an API, to communicate the service robot transport device control commands to the service robot transport device control device.

If the operating module also includes the Barrier communication module described above, the service robot transport device communication module may be formed in the same module with the Barrier communication module and thus be formed as a transition communication module that includes the functionality of the service robot transport device communication module and the Barrier communication module. In the same way, the service robot transport device communication module can also be designed separately from the barrier communication module.

Preferably, the service robot has an accelerometer arrangement with at least one accelerometer for detecting an acceleration along at least one accelerometer axis with fixed orientation relative to the service robot in both directions of the respective accelerometer axis, in order to detect which acceleration the service robot is subjected to, and for outputting accelerometer data with information on the detected acceleration. This has the advantage that the detected acceleration can be used to determine whether the service robot has been moved and, if so, by how much.

Preferably, the service robot according to the invention has this acceleration sensor arrangement regardless of whether it is part of the arrangement or not.

Preferably, the accelerometer arrangement is configured to detect an acceleration of the service robot in the forward direction and the backward direction of the service robot during operation of the service robot and to output accelerometer data with information on this detected acceleration. That is, in this case, one of the at least one acceleration measurement axis relative to the service robot extends along the forward direction and the reverse direction of the service robot. Preferably, the accelerometer arrangement is adapted to detect an acceleration of the service robot in the lateral direction of the service robot during operation of the service robot and to output accelerometer data including information on this detected acceleration. That is, in this case, one of the at least one acceleration measurement axis is oriented relative to the service robot in the sideways direction of the service robot and thus crosswise to the forward direction and backward direction of the service robot. Particularly preferably, the accelerometer arrangement is configured to detect an acceleration of the service robot at least two-dimensionally in a horizontally aligned plane during operation of the service robot and to output accelerometer data with information on this detected acceleration. In this case, the accelerometer arrangement is designed to detect an acceleration of the service robot along at least two acceleration measurement axes, which are arranged crossing each other relative to the service robot in the horizontally aligned plane, during operation of the service robot, and to output accelerometer data with information on this detected acceleration. Preferably, the accelerometer arrangement is adapted to detect an acceleration of the service robot upward and downward during operation of the service robot and to output accelerometer data with information on this detected acceleration. That is, in this case, one of the at least one acceleration measurement axis is oriented vertically relative to the service robot. Particularly preferably, the accelerometer arrangement is arranged to detect an acceleration of the service robot in all three spatial dimensions during operation of the service robot and to output accelerometer data with information on this detected acceleration. In this case, the accelerometer arrangement is designed to detect an acceleration of the service robot along three acceleration measurement axes during operation of the service robot, which three acceleration measurement axes are each oriented differently relative to the service robot, and to output accelerometer data with information on this detected acceleration.

It is further possible that the accelerometer arrangement comprises one or more gyroscopes for detecting a rotational movement of the service robot and is configured to output gyroscope data with information on the detected rotational movement.

Advantageously, the operating module, in particular the service robot, has a transport route determination module for determining a transport route over which the service robot has been transported, in particular over which the service robot has been transported by the service robot transport device, the transport route determination module being connected or connectable to the acceleration sensor arrangement for receiving the acceleration sensor data and being designed for determining the transport route based on the acceleration sensor data. This has the advantage that the transport distance over which the service robot has been transported can be reliably determined. The transport route determination module can also be arranged integrated in the accelerometer arrangement.

The transport distance can correspond to a transport path in one-dimensional, two-dimensional or three-dimensional space, along which transport path the service robot has been transported, in particular transported by the service robot transport device. Equally, however, the transport path can also be a distance over which the service robot has been transported along one of the at least one acceleration measurement axis. If the accelerometer arrangement is designed to detect an acceleration along two or three different acceleration measurement axes, each with a different fixed orientation relative to the service robot in both directions of the respective acceleration measurement axis to which the service robot is subjected, the transport distance can be the distances over which the service robot has been transported along the two or three acceleration measurement axes.

Preferably, the transport route determination module is part of the position determination module or the position determination module is connected or connectable to the transport route determination module for receiving transport route information, wherein the position determination module is adapted to, determine, on the basis of the determined transport route or on the basis of the transport route information received from the transport route determination module, whether the service robot has been transported by the service robot transport device from the transition place in one of the at least two action subareas to the transition place in the other of the at least two action subareas. This has the advantage of determining whether the service robot has been transported by the service robot transporting device from the transition place in one of the at least two action subareas to the transition place in the other of the at least two action subareas without any additional information received from the service transporting device. If the accelerometer arrangement further comprises one or more gyroscopes for detecting a rotational movement of the service robot and is adapted to output gyroscope data including information on the detected rotational movement, the transport distance determination module is preferably connected or connectable to the accelerometer arrangement for receiving the gyroscope data and is adapted to determine the transport distance based on the gyroscope data.

Advantageously, the service robot, particularly preferably the autonomously driving base platform, has at least one working area detection sensor for detecting obstacles within the working area of the service robot and for outputting working area detection sensor data with information on the detected working area, the navigation module being designed for this purpose, when the service robot is transported by the service robot transporting device, determine whether the Barrier is open and the service robot can thus drive through the Barrier and pass through the Barrier on the basis of the information on the detected working area, and, when it has been determined by the navigation module that the Barrier is open, output navigation data to the control module in order to allow the service robot to drive through the Barrier. This enables safer operation of the service robot.

Advantageously, the navigation module is designed to output this navigation data to the control module in order to allow the service robot to drive through the Barrier if the Barrier communication module has also received a Barrier open signal. Regardless of whether or not the navigation module is designed to output this navigation data to the control module in order to allow the service robot to travel through the Barrier if the Barrier communication module has also received a Barrier open signal, the navigation module is preferably designed to output the navigation data to the control module in order to allow the service robot to travel through the Barrier, if at the same time the position determination module has determined, on the basis of the determined transport route or on the basis of the information on the transport route received from the transport route determination module, whether the service robot has been transported by the service robot transport device from the transition place in one of the at least two action subareas to the transition place in the other of the at least two action subareas. This enables even greater safety in the operation of the service robot. Preferably, the navigation module is configured to determine the travel path from the current position of the service robot to the at least one destination location based on the action area information and, if the current position of the service robot is in a different one of the at least two action subareas than the destination location, taking into account the information about the transition places of the action subareas included in the action area information. This has the advantage that the service robot can autonomously and reliably search for the way also over several action areas.

Advantageously, the navigation module is designed, when the service robot is at one of the transition places or for being transported with one of the service robot transporting devices on or in the corresponding service robot transporting device, to control the service robot by outputting navigation data to the control module in such a way that it moves as close as the safety module allows to persons in the vicinity of the service robot when persons are on or near the travel path. This has the advantage that the service robot can be transported more complication-free together with persons service robot transport device. Furthermore, the navigation module is preferably designed to cause the service robot to emit acoustic and/or optical warning signals, in particular by transferring information to the operating module, if persons are located on or in the vicinity of the travel path.

In a preferred embodiment, the navigation module is configured to determine that the destination has been reached if the current position matches the destination to within a required accuracy for this purpose.

Preferably, the required accuracy is achieved when the current position deviates from the target location by no more than 1 m, preferably by no more than 0.5 m, and particularly preferably by no more than 0.2 m. Since the position data can preferably also include angular position data, the target location can preferably also include a pre-definable orientation of the service robot. Then, with respect to the orientation, for example, the required accuracy is achieved if the current position deviates from the target location by no more than 10°, preferably no more than 5°, and particularly preferably no more than 2°. In particular, the target location can preferably be specified using X-axis position data, Y-axis position data and alignment position data.

According to a preferred embodiment, the navigation module is configured to output a destination arrival notification when it has been determined by the navigation module that the destination has been reached.

Preferably, the operating module comprises a user notification module for notifying a user, the user notification module being connected or connectable to the navigation module for receiving the destination arrival notification output by the navigation module.

In a preferred embodiment, the user notification module is adapted to issue an arrival notification to the user when the user notification module receives the destination arrival notification from the navigation module. Thus, it is altogether easy to notify the user of the arrival of the service robot.

According to a preferred embodiment, the arrival notification is a call on a room telephone, which room telephone is assigned to the hotel room, to which hotel room the room number contained in the user identification is assigned. Such a call represents a particularly simple and secure notification of the user.

Alternatively or cumulatively, the arrival notification can also be displayed as display information on the display unit. Furthermore, a visual and/or acoustic signal would also be conceivable as an arrival notification. Furthermore, the arrival notification can also take place by means of another service or device. Merely by way of example, a hotel system, a user app, an e-mail, an SMS or another notification to any user terminal would be conceivable in particular. Independently of this, the user notification module can, for example, be connected or connectable to the navigation module via an API, or programming interface, via the Internet or via a cloud in particular. Furthermore, local radio communication via a transmitter and receiver, for example by means of Bluetooth, would also be conceivable.

Preferably, the user notification module reissues the arrival notification if there has not been a response from the user within a predetermined waiting time. Thus, the user can be notified again if the user did not notice the previous notification. The waiting time may be, for example, a few minutes. A reaction can be detected, for example, by any interaction with the service robot, for example by means of an input at an input unit, by means of an input in a user app or in another system that can be connected to the user notification module, in particular via the cloud, by means of local radio communication, or by means of detecting an acoustic and/or visual interaction.

In a preferred embodiment, the user notification module is configured to detect an absence of a user pertaining to the current user job and to output an absence notification when the absence of the user pertaining to the current user job has been detected.

According to a preferred embodiment, the user notification module is configured to detect the absence of the user concerning the current user job based on exceeding a predetermined time period since the arrival notification, in particular exceeding the predetermined waiting time, or based on exceeding a predetermined number of issued arrival notifications.

Preferably, the current user job is canceled when the user notification module has detected the absence of the user. This prevents the service robot from being blocked for too long if the user does not respond.

In a preferred embodiment, the operating module comprises an alarm module for alerting an administrator, wherein the alarm module is connected or connectable to the user notification module for receiving the absence indication, and wherein the alarm module is adapted to output an alarm indication for alerting the administrator when the absence indication has been received by the alarm module from the user notification module. This informs the administrator of the absence of the user and allows the administrator to take appropriate action. For example, the administrator may check to see if something has happened to the user that is causing the user to be unresponsive or unable to respond. The administrator can be a hotel employee, for example.

According to a preferred embodiment, the operating module comprises a release module for releasing a blocked service robot, wherein the release module is designed to enable manual and/or remote-controlled displacement of the service robot by a limited maximum distance and/or by a limited displacement angle for releasing the blocked service robot. This makes it possible to free a blocked service robot again so that the service robot can be used again.

Preferably, the limited maximum distance is a few centimeters, preferably 1 to 20 centimeters, particularly preferably 1 to 10 centimeters. Further preferably, the limited dislocation angle is a maximum of 180°, preferably a maximum of 90°, particularly preferably a maximum of 45°. By limiting the maximum distance and/or the displacement angle, the safety of the service robot is increased. The service robot can thus not be completely controlled remotely.

In a preferred embodiment, the control module is connected or connectable to the release module.

According to a preferred embodiment, the control module is adapted to output a blocking indication, wherein the release module is adapted to receive the blocking indication output by the control module and is preferably connected or connectable to the control module for receiving the blocking indication output by the control module, and wherein the release module, when having received the blocking indication, determines that the service robot is blocked.

Preferably, the control module is adapted to output the blocking indication when a control command cannot be executed by the service robot. In a preferred embodiment, the release module is adapted to issue a release command for moving the service robot, wherein the control module is adapted to receive the release command issued by the release module and is preferably connected or connectable to the release module for receiving the release command issued by the release module.

According to a preferred embodiment, the release command is a control command that includes at least information about a direction in which the service robot is to move and information about the maximum distance that the service robot is to move in the direction in which the service robot is to move.

Preferably, the operating module has a motion blocking module for blocking movement of the service robot and for outputting a motion blocking command for blocking movement of the service robot. This has the advantage that the operating module can block movement of the service robot. In other words, moving of the service robot can be blocked by outputting the movement blocking command.

In a preferred embodiment, the motion blocking module is connected or connectable to the opening state sensor for receiving the opening state data output by the opening state sensor with information on the opening state detected by the opening state sensor, wherein the motion blocking module is designed to determine an opening state of the service unit based on the opening state data received from the opening state sensor and to output the motion blocking command if the opening state determined by the motion blocking module indicates that a drawer unit is open. This has the advantage of preventing the service robot from moving or moving off even though the drawer unit is open. Instead of the open state of the drawer unit, the open state of another device, for example a door, etc., can also be determined. In other words, the opening state data is received from the opening state sensor. Based on this opening state data, the opening state of the service unit is determined and the movement blocking command is issued when the drawer unit, door, or more generally the device is open. According to a preferred embodiment, the control module of the service robot is connected or connectable to the motion blocking module for receiving the motion blocking command outputted from the motion blocking module, wherein the control module is adapted to output control commands for blocking movement of the service robot in response to receiving the motion blocking command. This has the advantage that movement of the service robot can be blocked. In other words, the control module outputs a control command for blocking the movement of the service robot when the control module receives the movement blocking command.

Preferably, the operating module comprises an inventory transmission module for receiving inventory sensor data output by the at least one inventory sensor and for determining an inventory of the service unit based on the inventory sensor data received from the at least one inventory sensor and for outputting inventory data with information on the inventory of the service unit determined by the inventory transmission module, wherein the inventory transmission module is connected or connectable to the at least one inventory sensor for receiving the inventory sensor data output by the at least one inventory sensor. This has the advantage that the inventory of the service unit or service robot can be determined. In other words, the operating module receives inventory sensor data output from the at least one inventory sensor and determines an inventory of the service unit based on the inventory sensor data received from the at least one inventory sensor. Further, the operating module outputs inventory data including information about the inventory of the service unit determined by the inventory transmission module.

Advantageously, the inventory transmission module is designed to determine the weight resting on the respective weight detection pad for each of the at least one weight detection pads based on the inventory sensor data received from the at least one weight detection sensor, in order to detect the weight of the at least one inventory item resting on the respective weight detection pad during operation of the service robot. This has the advantage that a determination of the inventory is made possible in an efficient manner. During operation of the service robot according to the invention, as well as during the provision of services in the local vicinity of people with the service robot according to the invention, the inventory sensor data are thus preferably received by the inventory detection module from the at least one weight detection sensor, and preferably the weight resting on the respective weight detection pad is thereby determined by the inventory detection module based on the inventory sensor data for each of the at least one weight detection pad, in order to detect the weight of the at least one inventory item lying on the respective weight detection pad during operation of the service robot. This has the advantage that a determination of the inventory is made possible in an efficient manner.

Preferably, the inventory transmission module is configured to repeatedly receive inventory sensor data from the at least one weight detection sensor and, based on the inventory sensor data received from the at least one weight detection sensor, to determine for each of the at least one weight detection pad the weight resting on the respective weight detection pad, as well as to determine a change in the weight resting on the respective weight detection pad, determined weight on the respective weight detection pad based on the previously received inventory sensor data, in order to determine a change in the at least one inventory item on the respective weight detection pad during operation of the service robot on the basis of the determined change in the weight on the respective weight detection pad. This has the advantage that changes to the inventory of the service unit can be reliably detected.

During operation of the service robot according to the invention and also during the provision of services at the local vicinity of people with the service robot according to the invention, inventory sensor data are thus preferably repeatedly received by the inventory detection module from the at least one weight detection sensor and the weight resting on the respective weight detection pad is determined in each case based on the inventory sensor data received from the at least one weight detection sensor for each of the at least one weight detection pad, and in each case a change in the determined weight resting on the respective weight detection pad is determined in comparison with the weight resting on the respective weight detection pad determined on the basis of the previously received inventory sensor data. Thus, during operation of the service robot, a change in the at least one inventory item resting on the respective weight detection pad can be determined based on the determined change in the weight resting on the respective weight detection pad. This has the advantage that changes to the inventory of the service unit can be reliably detected.

Advantageously, when the inventory transmission module determines a reduction in the weight on the respective weight detection pad for one of the at least one weight detection pads, the inventory transmission module is configured to compare the determined reduction in the weight on the respective weight detection pad with stored weight data of possible inventory items and, if the determined reduction in the weight on the respective weight detection pad corresponds to the stored weight data of one of the possible inventory items, to remove the corresponding inventory item from the respective weight detection pad, if the determined reduction of the weight resting on the respective weight detection pad corresponds to the stored weight data of one of the possible inventory items, to determine a removal of the corresponding inventory item from the respective weight detection pad and to remove the corresponding inventory item from the detected inventory. This has the advantage that a removal of an inventory item from the service unit can be reliably determined.

Preferably, the inventory transmission module is designed to check, when comparing the determined reduction of the weight on the respective weight detection pad with stored weight data of possible inventory items, whether the determined reduction of the weight on the respective weight detection pad to at least 5 g, particularly preferably at least 3 g, most preferably at least 2 g corresponds exactly to the stored weight data of one of the possible inventory items and if the determined reduction of the weight resting on the respective weight detection pad to at least 5 g, particularly preferably at least 3 g, very particularly preferably at least 2 g corresponds exactly to the stored weight data of one of the possible inventory items, to detect a removal of the corresponding inventory item from the respective weight detection pad and to remove the corresponding inventory item from the detected inventory. This has the advantage that the removed inventory item can be reliably determined based on the detected weight change.

During operation of the service robot according to the invention and also during the provision of services at the local vicinity of people with the service robot according to the invention, therefore, if a reduction of the weight resting on the respective weight detection pad is determined with the inventory transmission module for one of the at least one weight detection pads, preferably the determined reduction of the weight resting on the respective weight detection pad is compared with stored weight data of possible inventory items and, if the determined reduction of the weight resting on the respective weight detection pad corresponds to the stored weight data of one of the possible inventory items, a removal of the corresponding inventory item from the respective weight detection pad is determined and the corresponding inventory item is removed from the detected inventory. This has the advantage that a removal of an inventory item from the service unit can be reliably determined.

Preferably, when comparing the determined reduction of the weight resting on the respective weight detection pad with stored weight data of possible inventory items, it is thereby checked whether the determined reduction of the weight resting on the respective weight detection pad to at least 5 g, particularly preferably at least 3 g, most preferably at least 2 g corresponds exactly to the stored weight data of one of the possible inventory items and if the determined reduction of the weight lying on the respective weight detection pad to at least 5 g, particularly preferably at least 3 g, very particularly preferably at least 2 g corresponds exactly to the stored weight data of one of the possible inventory items, a removal of the corresponding inventory item from the respective weight detection pad is determined and the corresponding inventory item is removed from the detected inventory. This has the advantage that, based on the detected weight change, the removed inventory item can be reliably determined. Preferably, when an increase in the weight on the respective weight detection pad is determined by the inventory transmission module for one of the at least one weight detection pads, the inventory transmission module is configured to compare the determined increase in the weight on the respective weight detection pad with stored weight data of possible inventory items, and, if the determined increase in the weight on the respective weight detection pad corresponds to the stored weight data of one of the possible inventory items, determining an addition of the corresponding inventory item on the respective weight detection pad and adding the corresponding inventory item to the detected inventory. This has the advantage that an addition of an inventory item to the service unit can be reliably determined.

Preferably, the inventory transmission module is designed to check, when comparing the determined increase in the weight resting on the respective weight detection pad with stored weight data of possible inventory items, whether the determined increase in the weight resting on the respective weight detection pad to at least 5 g, particularly preferably at least 3 g, most preferably at least 2 g corresponds exactly to the stored weight data of one of the possible inventory items and if the determined increase in the weight on the respective weight detection pad to at least 5 g, particularly preferably at least 3 g, most preferably at least 2 g, corresponds exactly to the stored weight data of one of the possible inventory items, determining an addition of the corresponding inventory item on the respective weight detection pad and adding the corresponding inventory item to the detected inventory. This has the advantage that the added inventory item can be reliably determined based on the detected weight change.

During operation of the service robot according to the invention and also during the provision of services at the local vicinity of people with the service robot according to the invention, therefore, preferably with the inventory transmission module, if an increase in the weight lying on the respective weight detection pad is determined by the inventory transmission module for one of the at least one weight detection pad the determined increase in the weight on the respective weight detection pad is compared with stored weight data of possible inventory items and, if the determined increase in the weight on the respective weight detection pad corresponds to the stored weight data of one of the possible inventory items, an addition of the corresponding inventory item on the respective weight detection pad is determined and the corresponding inventory item is added to the detected inventory. This has the advantage that an addition of an inventory item to the service unit can be reliably determined.

In this case, when comparing the determined increase in the weight resting on the respective weight detection pad with stored weight data of possible inventory items, it is preferably checked whether the determined increase in the weight resting on the respective weight detection pad to at least 5 g, particularly preferably at least 3 g, most preferably at least 2 g corresponds exactly to the stored weight data of one of the possible inventory items and if the determined increase of the weight on the respective weight detection pad to at least 5 g, particularly preferably at least 3 g, very particularly preferably at least 2 g corresponds exactly to the stored weight data of one of the possible inventory items, an addition of the corresponding inventory item on the respective weight detection pad is determined and the corresponding inventory item is added to the detected inventory. This has the advantage that the added inventory item can be reliably determined based on the detected weight change.

Preferably, the inventory transmission module is designed to first detect a removal of a specific inventory item from the respective weight detection pad by the inventory detection module for one of the at least one weight detection pads, and to detect the addition of the specific inventory item on the respective weight detection pad within a predetermined assessment period after the time of the removal of the specific inventory item from the respective weight detection pad, outputting an appraisal signal indicating that the particular inventory item has only been temporarily removed for appraisal. This assessment signal can be transmitted to the operating module or the order module, for example. Preferably, the predetermined appraisal time period is at most 30 seconds. Particularly preferably, the predetermined assessment time span is at most 20 seconds. Alternatively, however, it is also possible for the predetermined assessment time span to be longer than 30 seconds.

During operation of the service robot according to the invention as well as during the provision of services at the local vicinity of people with the service robot according to the invention, the inventory transmission module is thus preferably used to determine the weight of an item of inventory, if the inventory transmission module first detects a removal of a specific inventory item from the respective weight detection pad for one of the at least one weight detection pads, and if the addition of the specific inventory item to the respective weight detection pad is detected within the predetermined inspection time period after the time of the removal of the specific inventory item from the respective weight detection pad, an inspection signal is output which indicates that the specific inventory item was only temporarily removed for inspection. This assessment signal can be transmitted to the operating module or the order module, for example.

Preferably, the specified assessment time span is, as already mentioned, at most 30 seconds. Particularly preferably, the specified assessment time span is, as already mentioned, at most 20 seconds. Alternatively, however, it is also possible for the specified assessment time span to be longer than 30 seconds.

Preferably, the inventory transmission module is configured to determine a distance of the rear stop of the product feed unit from the front stop of the product feed unit based on the inventory sensor data received from the stop position sensor. This has the advantage that based on the determined rear stop of the product feed unit from the front stop of the product feed unit, a determination of the number of inventory items received in the product feed unit is made possible.

During operation of the service robot and also when providing services at the local vicinity of people with the service robot according to the invention, the distance of the rear stop of the product feed unit from the front stop of the product feed unit is thus preferably determined with the inventory transmission module based on the inventory sensor data received from the stop position sensor.

Advantageously, the inventory transmission module is designed to determine a number of inventory items received in the product feed unit by the inventory transmission module being designed to divide the distance of the rear stop of the product feed unit from the front stop of the product feed unit determined based on the inventory sensor data received from the stop position sensor by a stored inventory item thickness corresponding to a thickness of the inventory item intended for the product feed unit. Preferably, the inventory transmission module is thereby designed to round the result to a whole number. This has the advantage that the number of inventory items accommodated in the product feed unit can be determined in a simple manner.

During operation of the service robot and also during the provision of services at the local vicinity of people with the service robot according to the invention, the inventory transmission module is thus preferably used to determine the number of inventory items picked up in the product feed unit, by dividing the distance of the rear stop of the product feed unit from the front stop of the product feed unit, which distance is determined on the basis of the inventory sensor data received from the stop position sensor, by a stored inventory item thickness which corresponds to a thickness of the inventory item intended for the product feed unit. Preferably, the result is rounded to a whole number. This has the advantage that the number of inventory items stored in the product feed unit can be easily determined.

Advantageously, the inventory transmission module is designed to repeatedly receive inventory sensor data from the stop position sensor and to determine the distance of the rear stop of the product feed unit from the front stop of the product feed unit based in each case on the inventory sensor data received from the stop position sensor, and in each case to determine a change in the distance of the rear stop of the product feed unit from the front stop of the product feed unit in comparison with the distance of the rear stop of the product feed unit from the front stop of the product feed unit determined on the basis of the previously received inventory sensor data, in order, during operation of the service robot, to determine a change in the at least one inventory item accommodated in the product feed unit on the basis of the determined change in the distance of the rear stop of the product feed unit from the front stop of the product feed unit. This has the advantage of enabling reliable determination of changes in the number of inventory items received in the product feed unit.

During operation of the service robot and also during the provision of services at the local vicinity of people with the service robot according to the invention, inventory sensor data is thus preferably repeatedly received from the stop position sensor by means of the inventory transmission module, and the distance of the rear stop of the product feed unit from the front stop of the product feed unit is determined in each case based on the inventory sensor data received from the stop position sensor, and in each case a change in the distance of the rear stop of the product feed unit from the front stop of the product feed unit is determined in comparison with the distance of the rear stop of the product feed unit from the front stop of the product feed unit determined on the basis of the previously received inventory sensor data, in order, during operation of the service robot, to determine a change in the at least one inventory item accommodated in the product feed unit on the basis of the determined change in the distance of the rear stop of the product feed unit from the front stop of the product feed unit. This has the advantage of enabling reliable determination of changes in the number of inventory items received in the product feed unit.

Preferably, the inventory transmission module is configured to repeatedly receive inventory sensor data from the stop position sensor and to determine the distance of the rear stop of the product feed unit from the front stop of the product feed unit based in each case on the inventory sensor data received from the stop position sensor, and in each case to determine a reduction in the distance of the rear stop of the product feed unit from the front stop of the product feed unit in comparison with the distance of the rear stop of the product feed unit from the front stop of the product feed unit determined on the basis of the previously received inventory sensor data, in order to determine, during operation of the service robot, a removal of one or more inventory items from the product feed unit on the basis of the determined reduction in the distance of the rear stop of the product feed unit from the front stop of the product feed unit and to remove the corresponding inventory item or items from the detected inventory. This has the advantage of enabling reliable determination of the decrease in the number of inventory items received in the product feed unit.

During operation of the service robot and also during the provision of services at the local vicinity of people with the service robot according to the invention, inventory sensor data is thus preferably repeatedly received from the stop position sensor by means of the inventory transmission module, and the distance of the rear stop of the product feed unit from the front stop of the product feed unit is determined in each case based on the inventory sensor data received from the stop position sensor, and in each case a reduction in the distance of the rear stop of the product feed unit from the front stop of the product feed unit is determined in comparison with the distance of the rear stop of the product feed unit from the front stop of the product feed unit determined on the basis of the previously received inventory sensor data, in order to detect a removal of one or more inventory items from the product feed unit during operation of the service robot on the basis of the determined reduction in the distance of the rear stop of the product feed unit from the front stop of the product feed unit and to remove the corresponding inventory item or items from the detected inventory. This has the advantage of enabling reliable determination of the decrease in the number of inventory items received in the product feed unit. Advantageously, in order to determine a number of inventory items removed in the product feed unit, the inventory transmission module is adapted to divide the determined decrease in the distance of the rear stop of the product feed unit from the front stop of the product feed unit by a stored inventory item thickness corresponding to a thickness of the inventory item allocated to the product feed unit. In this case, the inventory transmission module is adapted to round the result to a whole number. This has the advantage that a decrease in the number of inventory items received in the product feed unit can be reliably determined.

In the operation of the service robot as well as when providing services at the local vicinity of people with the service robot according to the invention, the inventory transmission module is thus preferably used to determine the number of inventory items removed in the product feed unit by dividing the determined reduction of the distance of the rear stop of the product feed unit from the front stop of the product feed unit by a stored inventory item thickness, which corresponds to a thickness of the inventory item intended for the product feed unit. Advantageously, the result is rounded to a whole number, which gives the number of inventory items removed. This has the advantage that a decrease in the number of inventory items received in the product feed unit can be reliably determined.

Preferably, the inventory transmission module is configured to determine, based on the inventory sensor data received from the inventory image sensor, whether an inventory item previously recorded in the inventory monitoring unit has been removed from the inventory monitoring unit, and, if the inventory transmission module has determined the removal of the inventory item previously recorded in the inventory monitoring unit from the inventory monitoring unit, to remove the inventory item previously recorded in the inventory monitoring unit from the recorded inventory. This has the advantage that a removal of an inventory item from the inventory monitoring unit can be monitored in a simple manner. Thus, during operation of the service robot as well as during the provision of services at the local vicinity of people with the service robot according to the invention, the inventory transmission module is preferably used to determine, based on the inventory sensor data received from the inventory image sensor, whether an inventory item previously recorded in the inventory monitoring unit has been removed from the inventory monitoring unit and, if the inventory transmission module has determined that the inventory item previously recorded in the inventory monitoring unit has been removed from the inventory monitoring unit, the inventory item previously recorded in the inventory monitoring unit is removed from the recorded inventory. This has the advantage that a removal of an inventory item from the inventory monitoring unit can be monitored in a simple manner.

Preferably, the inventory data output by the inventory transmission module contains information on which inventory items are present in which inventory stowage unit and/or in which drawer unit. This means that it is known where the inventory items can be found.

In a preferred embodiment, the operating module has an inventory management module for creating inventory items and/or inventory item templates with inventory properties, the inventory management module being designed to output inventory property data with information on the inventory properties of the inventory items and/or the inventory item templates. The inventory item templates can be so-called digital twins of the inventory items. This allows properties of the real inventory items that can be changed quickly and easily to be changed by adapting the digital twins. For example, a particularly fast price change of inventory items is possible. This can be done during a happy hour, for example.

Preferably, the inventory property data includes at least one of sales price data, weight data, and inventory item thickness data of the inventory item, more preferably at least sales price data and one of weight data and inventory item thickness data of the inventory item. Preferably, the operating module has an inventory configuration module for configuring a target inventory of the service robot and for outputting target inventory data with information on the target inventory, it being possible, when configuring the target inventory, to specify which inventory items are to be stored in which inventory stowage units and/or in which drawer units, and there in particular in which receptacles for holding inventory items. This has the advantage that the inventory of the service robot can be configured, for example, by means of a service person or operator. Thus, a target inventory can be set and/or changed. In other words, the target inventory of the service robot or service unit can be configured by means of the inventory configuration module. Further, the inventory configuration module outputs the target inventory data with information about the target inventory, wherein when configuring the target inventory, it is determined which inventory items are to be stocked in which receptacles for holding inventory items. The receptacles are preferably separated areas within an inventory stowage unit or a drawer unit.

In a preferred embodiment, the order data contains inventory data with information about the inventory items to be delivered according to an order. This has the advantage that an empty run of the service robot, in which an ordered inventory item is not in stock in the service robot, can be prevented.

However, the order data does not have to contain information on the inventory items to be delivered according to an order. The selection of inventory items can also be done by the user on site.

According to a preferred embodiment, the operating module has an inventory availability module for checking the availability of inventory items in the service unit and for outputting availability data based on a result of an availability check performed by means of the inventory availability module. This has the advantage of checking whether the commissioned inventory item is in stock in the service robot. In other words, the inventory availability module checks the availability of inventory items in the service unit and outputs the availability data based on the result of the availability check performed.

Preferably, the inventory availability module is connected or connectable to the inventory configuration module for receiving target inventory data output from the inventory configuration module, wherein the inventory availability module is connected or connectable to the inventory determination module for receiving inventory data output from the inventory transmission module, wherein the inventory availability module is adapted to check the availability of inventory items based on a comparison of the target inventory data received from the inventory configuration module and the inventory data received from the inventory transmission module. This has the advantage that the inventory availability module can be used to check whether the target inventory is available. In case of deviations, appropriate action can be taken. In other words, the inventory availability module receives the target inventory data output by the inventory configuration module. Further, the inventory availability module receives the inventory data output from the inventory transmission module. Then, the inventory availability module checks the availability of inventory items based on the comparison of the target inventory data received from the inventory configuration module and the inventory data received from the inventory transmission module.

In a preferred embodiment, the inventory availability module is connected or connectable to the order module for receiving item data output from the order module, wherein the inventory availability module is connected or connectable to the inventory transmission module for receiving inventory data output from the inventory transmission module, wherein the inventory availability module is configured to check the availability of inventory items based on a comparison of the item data received from the order module and the inventory data received from the inventory transmission module. This has the advantage of verifying that ordered items are available as inventory items. In other words, the inventory availability module receives the item data output from the order module. Further, the inventory availability module receives the inventory data output from the inventory transmission module. Then, the inventory availability module checks the availability of inventory items based on a comparison of the item data received from the order module and the inventory data received from the inventory transmission module.

According to a preferred embodiment, the operating module comprises an inventory replenishment module for replenishing the inventory based on availability data output from the inventory availability module, wherein the inventory replenishment module is connected or connectable to the inventory availability module for receiving availability data output from the inventory availability module. This has the advantage that the inventory can be restocked. In other words, the inventory replenishment module replenishes the inventory based on the availability data output from the inventory availability module. In doing so, the inventory replenishment module receives the availability data output from the inventory availability module.

Preferably, the inventory replenishment module is configured to issue an inventory replenishment command for replenishing the inventory. This has the advantage that a restocking of the inventory can be initiated by means of the command. In other words, the inventory replenishment module issues an inventory replenishment command for replenishing the inventory.

In a preferred embodiment, the navigation module is connected or connectable to the inventory replenishment module for receiving the inventory replenishment command issued by the inventory replenishment module, wherein the navigation module is adapted, in response to receiving the inventory replenishment command, to determine a travel path from the current position of the service robot to a replenishment location at which the inventory of the service robot is replenishable and is adapted to output navigation data based on the determined travel path. This has the advantage that the service robot can be navigated to the restocking location. In other words, the navigation module receives the inventory replenishment command issued by the inventory replenishment module. Further, in response to receiving the inventory replenishment command, the navigation module determines a travel path from the current position of the service robot to the replenishment location. Further, the navigation module outputs navigation data based on the determined travel path.

According to a preferred embodiment, the service unit comprises the display unit for displaying display information, the payment unit for paying for services provided by means of the service robot, and the input unit for inputting input data, wherein the arrangement comprises a display module which is connected or connectable to the inventory transmission module for receiving the inventory data output by the inventory transmission module and connected or connectable to the display unit for transmitting display information through the display unit, wherein the display module is adapted to output display information at least on the inventory of the service unit according to the inventory data received from the inventory transmission module and to transmit it to the display unit for display by the display unit. This has the advantage that the display unit can display the inventory of the service unit or the service robot. In other words, the display module receives the inventory data output from the inventory transmission module. Further, the display module transmits the display information to the display unit. Further, the display module outputs display information of at least the inventory of the service unit according to the inventory data received from the inventory transmission module and transmits the display information to the display unit for display by the display unit.

In a preferred embodiment, the display module is connected or connectable to the inventory transmission module for receiving the inventory data output from the inventory transmission module, wherein the display module is adapted to output information regarding at least the inventory of the service unit in accordance with the inventory data received from the inventory transmission module and to transmit the information to the display unit as display information for display by the display unit.

According to a preferred embodiment, the display module is connected or connectable to the inventory management module for receiving inventory property data output from the inventory management module, wherein the display module is adapted to output information at least on the inventory properties according to the inventory property data received from the inventory management module and to transmit the information to the display unit as display information for display by the display unit.

Preferably, the operating module comprises a user withdrawal notification module for determining inventory items withdrawn from a user upon withdrawal of a user order and for outputting inventory withdrawal data including information about the inventory items determined to have been withdrawn, the user withdrawal notification module being connected or connectable to receive the inventory data determined by the inventory determination module wherein the user withdrawal notification module is adapted to determine the inventory items withdrawn upon withdrawal of a user order based on the inventory data received from the inventory transmission module prior to a withdrawal of inventory items from the inventory and the inventory data received from the inventory transmission module after a withdrawal of inventory items from the inventory. This has the advantage of being able to determine when inventory items are taken from inventory. In other words, the user withdrawal notification module determines the inventory items withdrawn from a user when a user order is exported and outputs inventory withdrawal data with information about the inventory items determined to have been withdrawn. Further, the user withdrawal notification module receives the inventory data determined by the inventory transmission module, wherein the user withdrawal notification module determines the inventory items withdrawn when a user order is exported based on the inventory data received from the inventory transmission module prior to a withdrawal of inventory items from the inventory and the inventory data received from the inventory transmission module after a withdrawal of inventory items from the inventory.

In a preferred embodiment, the service unit comprises the display unit for displaying display information, the payment unit for paying for services provided by means of the service robot, and the input unit for inputting input data, wherein the display module is connected or connectable to the user withdrawal notification module for receiving the inventory withdrawal data outputted from the user withdrawal notification module wherein the display module is adapted to output display information on at least the withdrawn inventory items in accordance with the inventory withdrawal notification data received from the user withdrawal notification module and to transmit such information to the display unit for display by the display unit. This has the advantage of being able to display which inventory items have been taken by a user. This can be used, for example, to display to the user their selection and preferably an associated price for the data taken. In other words, the display module receives the inventory withdrawal data output by the user withdrawal notification module. Further, the display module outputs and transmits to the display unit for display by the display unit display information regarding at least the withdrawn inventory items in accordance with the inventory withdrawal data received from the user withdrawal notification module.

In a preferred embodiment, the display information includes the number of inventory items taken.

According to a preferred embodiment, the display information contains the sales price of the removed inventory items. The user does not have to enter the number or type of inventory items removed. Rather, this information is provided by the user withdrawal notification module. Thus, the withdrawal of inventory items is done according to the principle of an open counter. It is not necessary to determine in advance which inventory items are to be withdrawn and in what quantities, nor is it necessary to pay for the inventory items in advance.

Preferably, the service unit comprises the display unit, the payment unit and the input unit, wherein the operating module comprises a pre-authorization module for authorizing a user, in particular a hotel guest, to use the service unit. Hereby, the operating module is better protected against irregularities, in particular thefts.

In a preferred embodiment, the payment unit is configured to generate a pre-authorization request, wherein the payment unit is connected or connectable to the pre-authorization module for receiving a pre-authorization request issuable by the pre-authorization module.

Alternatively or cumulatively, the pre-authorization can also take place as authorization for use by an input at the input unit, by reading in an authorization document, for example an ID card, by means of optical authorization via the built-in camera, or by means of a biometric scanner.

According to a preferred embodiment, the pre-authorization request contains payment means information of a payment means that can be arranged and/or entered by the user at the payment unit in the course of a pre-authorization.

Preferably, the pre-authorization module is configured to verify the payment means against the payment means information and, based on the verification, determine whether or not the user is authorized to use the service unit.

In a preferred embodiment, the pre-authorization module is configured to authorize the user to use the service unit within a predefinable availability range of use of the service unit when the verification determines that the user is authorized to use the service unit.

According to a preferred embodiment, the availability frame corresponds to an amount of money blocked on the payment means. The availability frame may also correspond to a general quantity restriction. For example, this quantity limit may correspond to a maximum number of inventory items that may be withdrawn.

Preferably, the operating module is designed to output an overrun message if the price of the inventory items withdrawn exceeds the availability limit. For this purpose, a comparison is made between the total price of the inventory items withdrawn according to the inventory withdrawal determination module and the availability frame. In a preferred embodiment, the input unit is configured to input a selection of an inventory item or a selection of a group of inventory items, preferably based on display information displayed by the display unit. Here, a group of inventory items may include inventory items that are similar to each other. For example, the inventory items may be grouped according to their type, for example inventory items of the type beverage.

According to a preferred embodiment, the pre-authorization module is adapted to output pre-authorization information indicating whether or not the user is authorized to use the service unit, wherein the input unit is connected or connectable to the pre-authorization module to receive the pre-authorization information, and wherein the input unit enables selection of an inventory item or selection of a group of inventory items when the pre-authorization information received by the pre-authorization module indicates that the user is authorized to use the service unit.

Preferably, the input unit is configured to issue a configuration change command based on the selection entered by the user, and wherein the configuration change actuator is connected or connectable to the input unit for receiving the configuration change command, wherein upon receiving the configuration change command, the configuration change actuator is configured to transfer the inventory stowage unit from the locked configuration to the opened configuration.

In a preferred embodiment, the input unit is designed to transmit the configuration change command to the configuration change drive that is assigned to the respective inventory stowage unit in which the inventory item or group of inventory items selected by means of the user's selection is stowed according to the target inventory data output by the inventory configuration module or according to the inventory data output by the inventory transmission module. Preferably, this allows exactly the inventory stowage unit to be transferred to its open configuration, in which the selected inventory item is also located.

Advantageously, the service robot according to the invention is combined together with the aforementioned charging station. Therefore, a further aspect for solving the problem of the invention is preferably a combination of a service robot according to the invention and a charging station for charging the at least one battery of the service robot, wherein the charging station comprises two charging station charging contacts for being contacted by the two service robot charging contacts.

Further advantageous embodiments and combinations of features of the invention result from the following detailed description and the totality of the patent claims.

BRIEF DESCRIPTION OF THE SEVERAL VIEWS OF THE DRAWINGS

Further advantageous features and details of the various embodiments of this disclosure will become apparent from the ensuing description of preferred exemplary embodiment or embodiments and further with the aid of the drawings. The features and combinations of features recited below in the description, as well as the features and feature combinations shown after that in the drawing description or in the drawings alone, may be used not only in the particular combination recited by also in other combinations on their own without departing from the scope of the disclosure.

The following is an advantageous embodiment of the invention with reference to the accompanying drawings wherein.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including not only one of A, only one of B, only one of C, or any combination of A, B, and C.

Figure 1A:
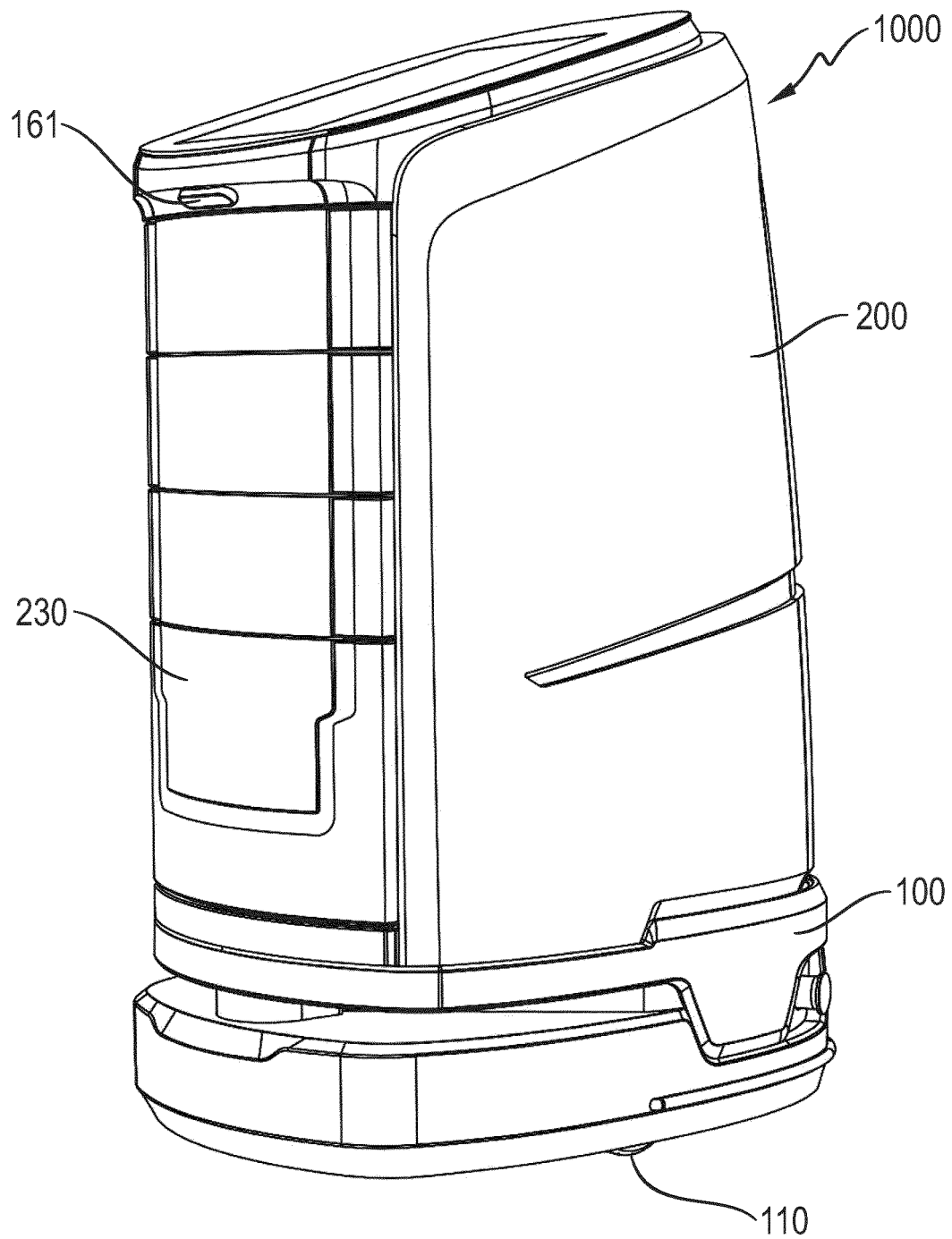
FIG. 1 a, b each depict an oblique view of a service robot according to the invention, once with closed drawer units and once with an open drawer unit, FIG. 2a, b depict Oblique views of further service robots according to the invention, in which the service unit is designed differently from the service robot shown in FIGS. 1a and 1b, FIGS. 3a, 3b depict an oblique view and a bottom view of the autonomously driving base platform.

FIGS. 1a and 1 b each show an oblique view of a service robot 1000 according to the invention for providing services at the local vicinity of people. This service robot 1000 has an autonomously driving base platform 100 and a service unit 200 mounted on the autonomously driving base platform 100.

The autonomously driving base platform 100 includes a drive 125 (see, inter alia, FIG. 5) for driving the autonomously driving base platform 100 and thus the service robot 1000. Further, the autonomously driving base platform 100 comprises a trolley 110 having a plurality of wheels for moving the autonomously driving base platform 100 and thus the service robot 1000 on the wheels, wherein at least one of the plurality of wheels is a drive wheel drivable by the drive 125.

Further, the service robot 1000 comprises a control module 162 (see FIG. 5) for controlling the autonomously driving base platform 100, wherein the control module 162 is connected or connectable to the drive 125 for transmitting control commands to the drive 125, and the drive is controllable by the control commands transmitted by the control module 162. In addition, the service robot 1000 includes at least one power source in the form of a battery 130 for supplying power to the drive 125 and the control module 162.

The service unit 200 has four drawer units 230 arranged one above the other. In FIG. 1 a, all drawer units are shown pushed into the service unit 200. In FIG. 1 b, on the other hand, the lowest drawer unit is shown open, so that the plug-in unit with the weight detection sensors, which is shown separately in FIGS. 12a and 12b, can be seen in the lowest drawer unit.

Figure 1B:
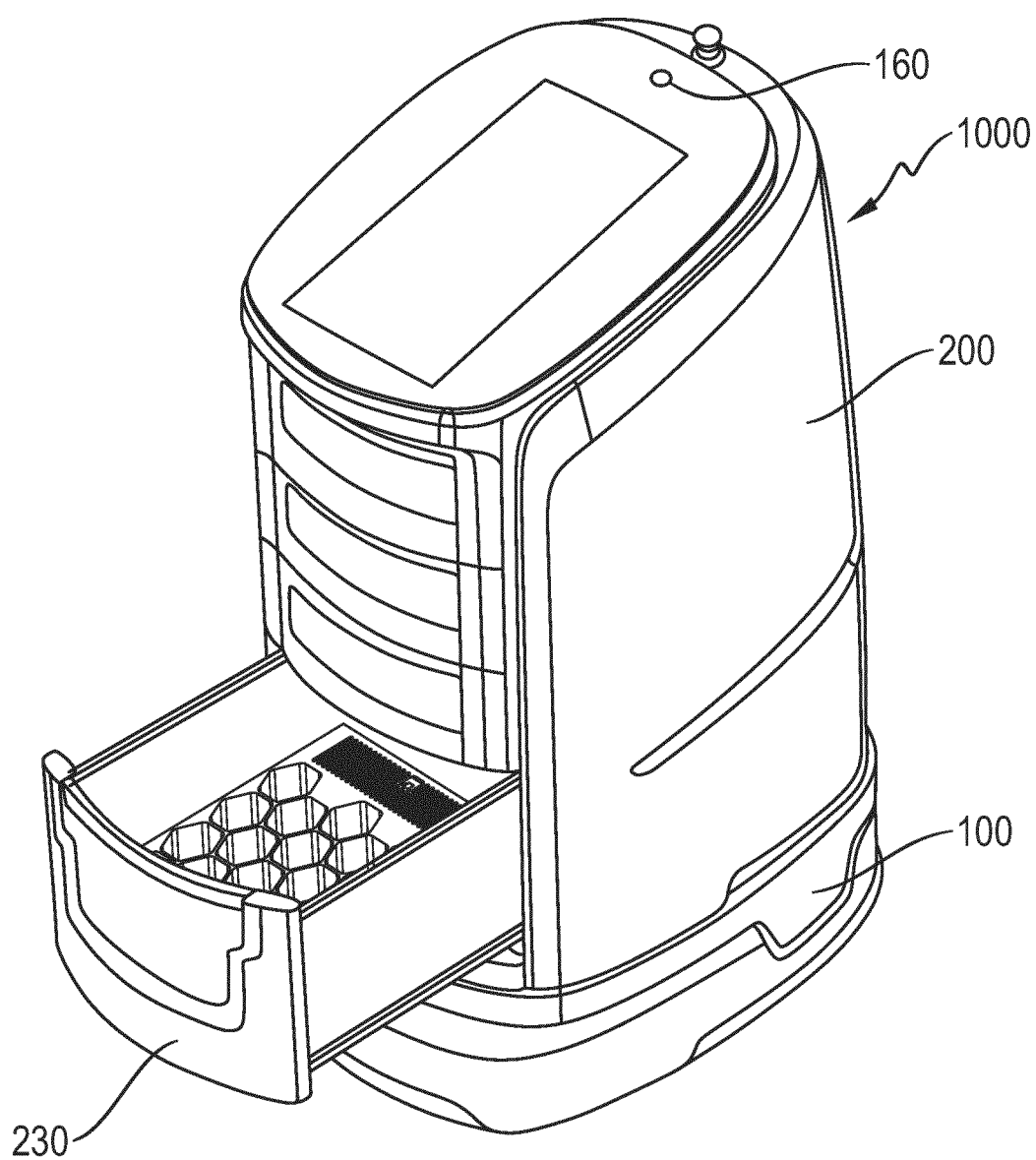
Figure 2A:
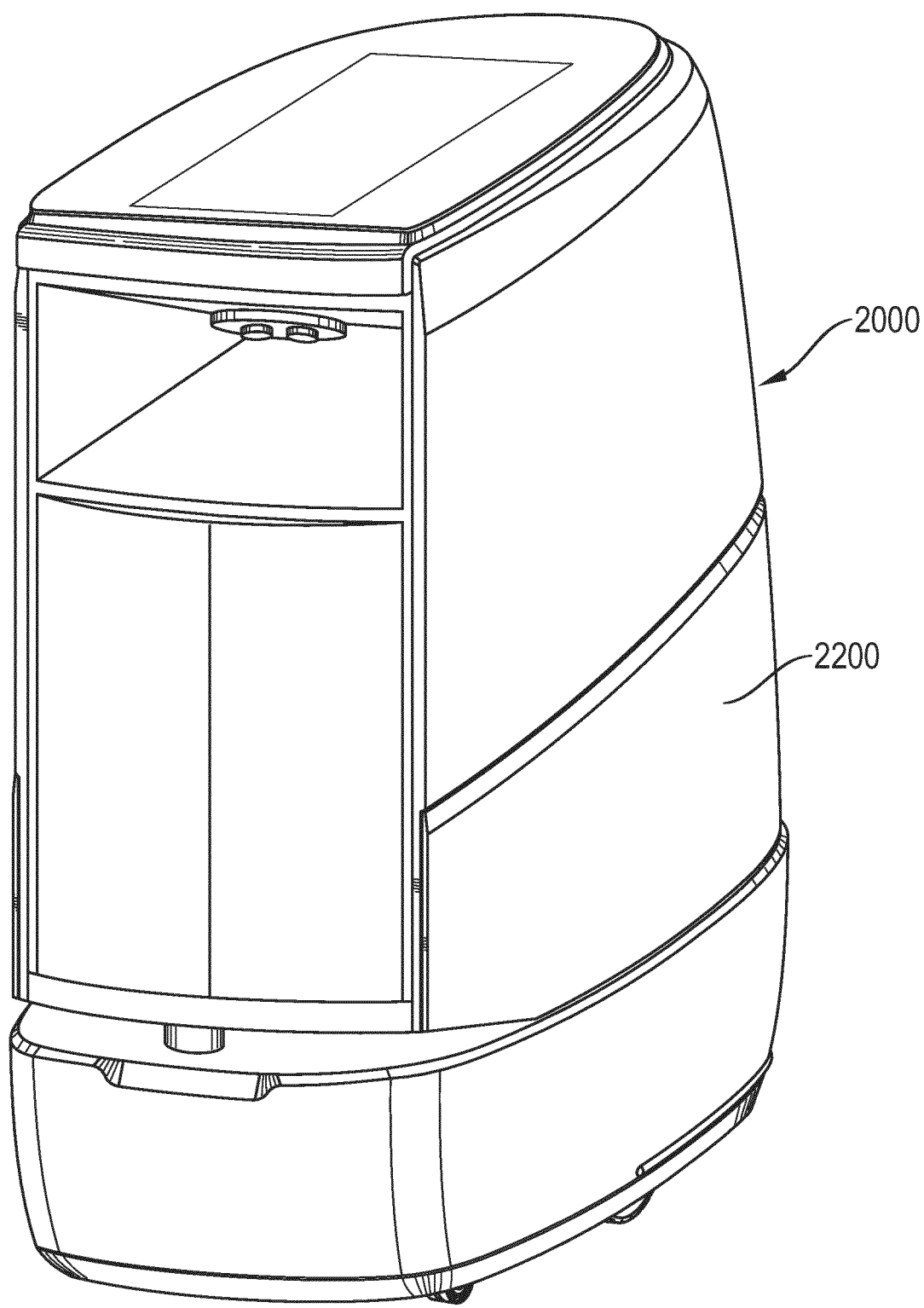
Figure 2B:
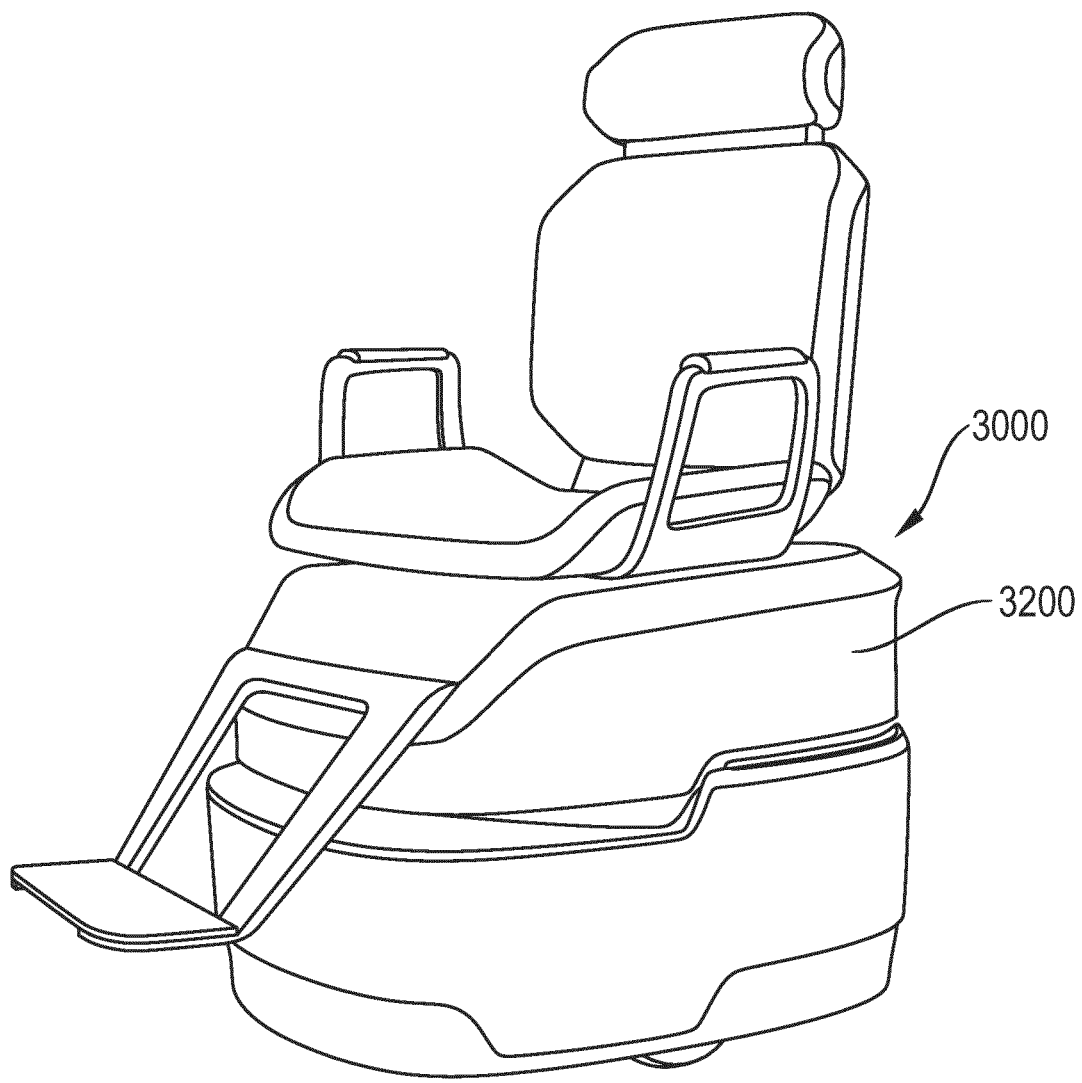

FIGS. 2a and 2b each show an oblique view of further service robots 2000, 3000 according to the invention, in which the service unit 2200, 3200 is designed differently from the service robot 1000 shown in FIGS. 1a and 1 b. For example, the service unit 2200 of the service robot 2000 shown in FIG. 2a has no drawer units, but a cabinet unit which has a door. The service unit 3200 of the service robot 3000 shown in FIG. 2b, on the other hand, has neither a cabinet unit nor a drawer unit, but has a chair for transporting people.

Figure 3A:
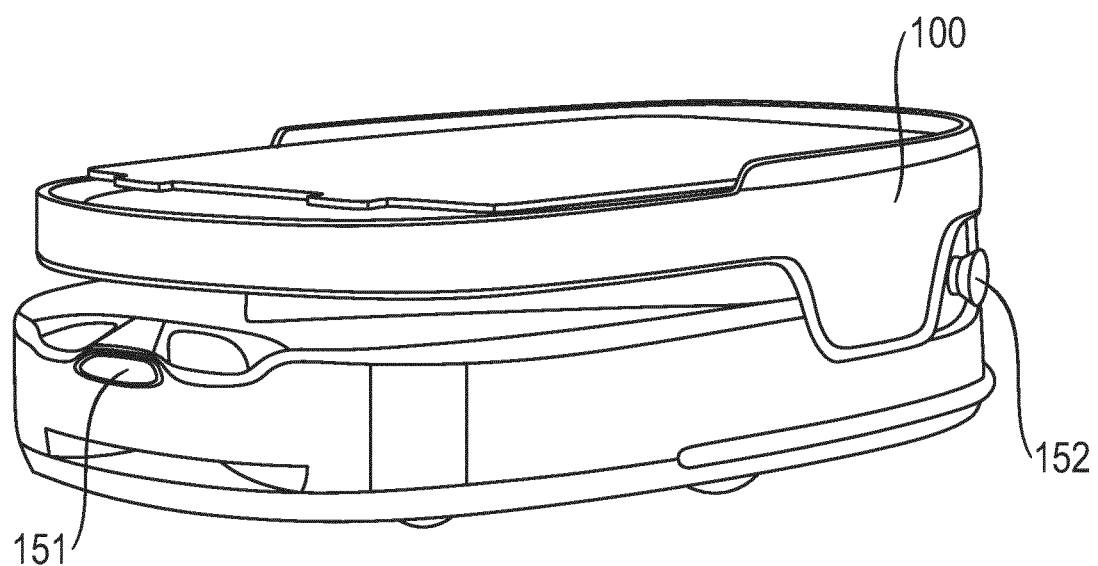

FIG. 3a shows an oblique view of the autonomously driving base platform 100 of the service robot 1000 shown in FIGS. 1a and 1 b. Therein, it can be seen that the autonomously driving base platform 100, and thus the service robot 1000 for detecting obstacles within a working area of the service robot 1000, has various working area detection sensors for detecting the working area of the service robot 1000 and outputting working area detection sensor data with information on the detected working area. For example, one of these work area detection sensors is a stereoscopic camera 151 arranged on the front side of the autonomously driving base platform 100. Further, it can be seen in the oblique view that the autonomously driving base platform 100 has an emergency stop button 152 on the side for stopping the service robot 1000.

Figure 3B:
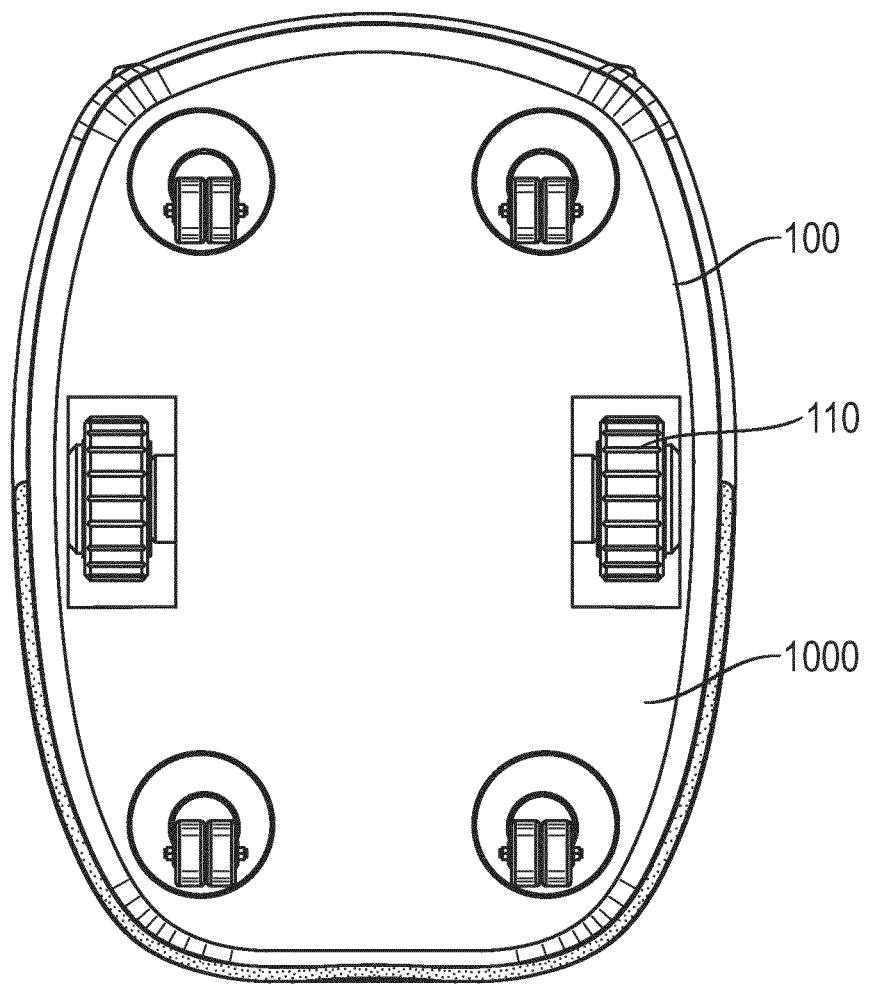

FIG. 3b shows a bottom view of the service robot 1000 or the autonomously driving base platform 100, showing that the trolley 110 of the autonomously driving base platform 100 has a total of six wheels 111, 112, two of which are drive wheels 112.

Figure 4A:
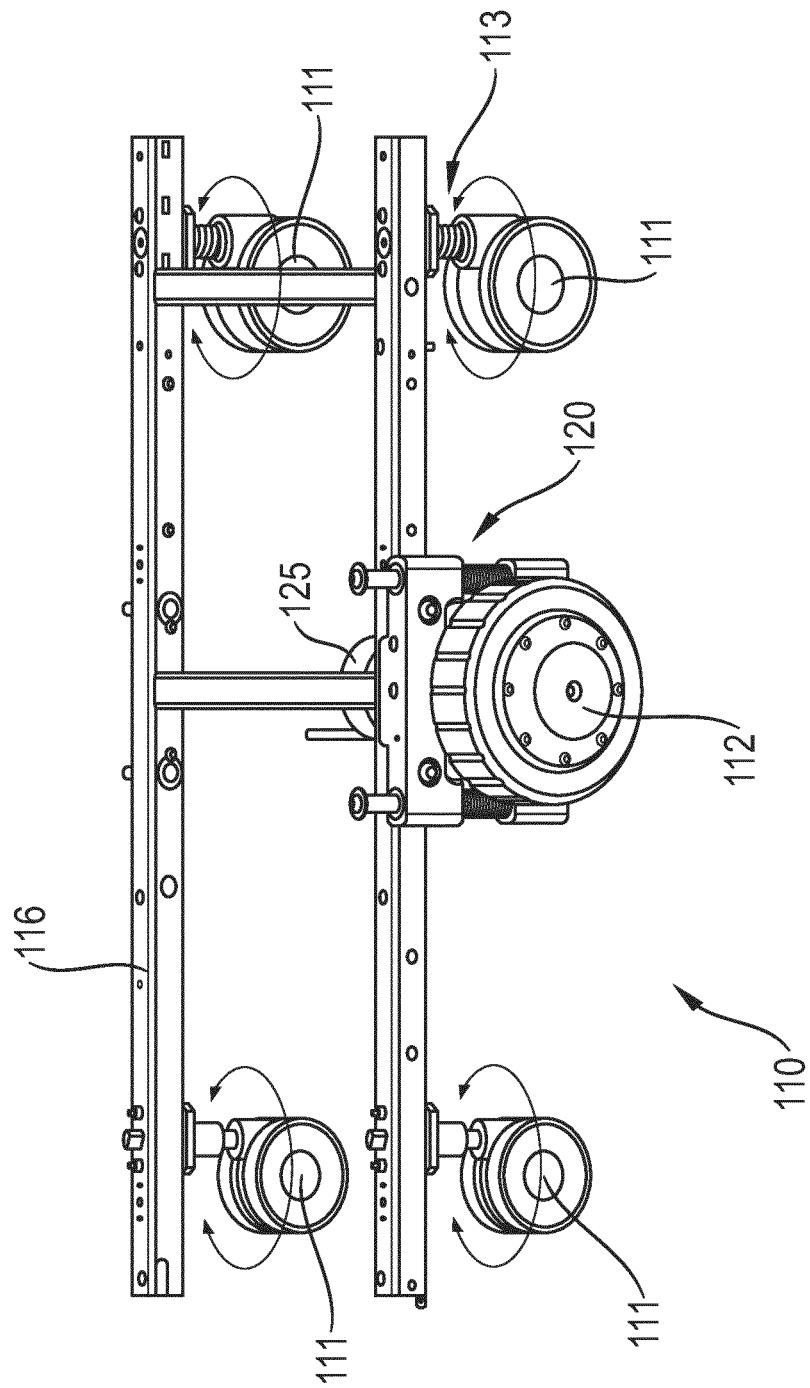
FIGS. 4a, 4b, 4c depict a schematic view of a trolley of the autonomously driving base platform, a magnified view of a drive wheel suspension, and a magnified view of a support wheel suspension.

FIG. 4a shows a schematic view of a trolley 110 of the autonomously driving base platform 100 of the service robot 1000 according to the invention. The trolley 110 comprises a chassis 116. Further, the trolley 110 has two drive wheels 112, although only one drive wheel 112 is shown in FIG. 4a for simplicity. In addition, the trolley 110 has four support wheels 111 for stabilizing the service robot 1000. Two of the support wheels 111 are formed at the front and two of the support wheels 111 are formed at the rear of the autonomously driving base platform 100. As shown in FIG. 4a, the front support wheels 111 are formed larger than the rear support wheels 111.

The trolley 110 has support wheel suspensions 113 and drive wheel suspensions 112. Each support wheel 111 is assigned exactly one of the support wheel suspensions 113 and each drive wheel 112 is assigned exactly one of the drive wheel suspensions 120. The suspensions 112, 113 are thus each designed as independent wheel suspensions and serve to arrange the respective wheel 111, 112 on the chassis 116. In this case, the chassis 116 is preferably formed with a plurality of rod elements. In addition to the drive wheel 111, the drive wheel suspension 112 can also arrange the drive 125 itself or at least parts thereof on the chassis 116.

Figure 4B:
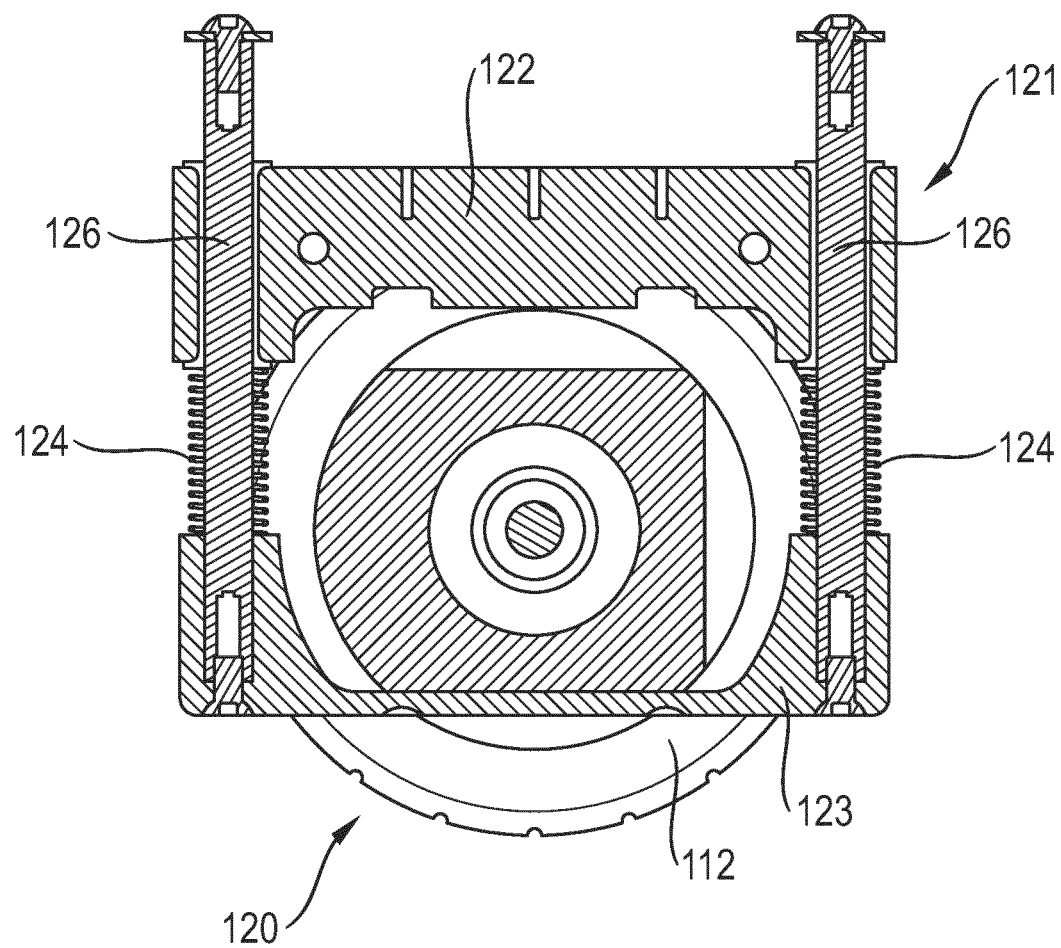

FIG. 4b shows an enlarged view of the drive wheel suspension 120. The drive wheel suspension 120 has a retaining frame 121 for retaining the drive wheel 112 to the chassis 116. The retaining frame 121 has an upper frame member 122 and a lower frame member 123. In this regard, the drive wheel 112 is arranged between the upper frame member 122 and the lower frame member 123. The drive wheel suspension 120 has two further elastic elements 124 arranged between the upper frame element 122 and the lower frame element 123. In particular, the drive wheel 112 is arranged between the two further elastic elements 124.

The drive wheel 112 is arranged fixedly on the lower frame element 123 in a spring travel direction of the two further elastic elements 124, wherein the lower frame element 123 and thus the drive wheel 112 is arranged movably on the upper frame element 122 between two maximum suspension positions along a drive spring travel. A rest position of the drive wheel 112 when the service robot 1000 is at rest is here located between the two maximum suspension positions. The drive wheel spring travel is oriented perpendicular to the main extension plane of the autonomously driving base platform 100, i.e., perpendicular downwardly toward the ground or substrate.

The lower frame element 123 and the upper frame element 122 are connected by means of two pins 126. The other elastic elements 124 are arranged around the pins 126. Here, the further elastic elements 124 are designed as coil springs. The pins 126 also serve to position and hold the further elastic elements 124.

Figure 4C:
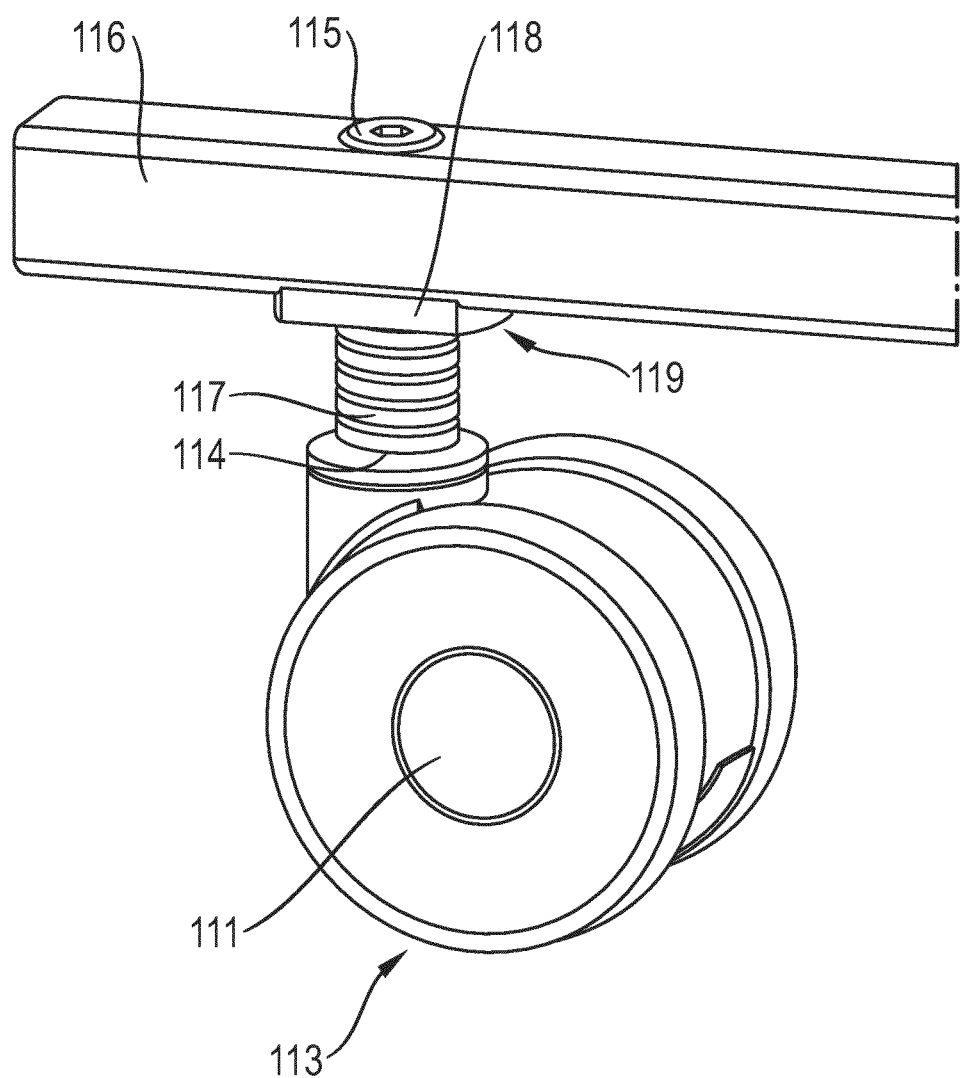

FIG. 4c shows an enlarged view of one of the support wheel suspensions 113. The support wheel suspension 113 has a shaft 114 for connecting the support wheel 111 to the chassis 116. Further, the support wheel suspension 113 comprises and elastic element 117 arranged between the chassis 116 and the support wheel 111. The elastic element 117 is preferably arranged around the shaft 114.

Furthermore, the support wheel suspension 113 has a low-friction guide 118, which is arranged for low-friction guiding of the shaft 114 on the chassis 116. Here, the low-friction guide 118 is designed as a sleeve-shaped guide, in particular a ball cage guide. The low-friction guide 118 preferably extends into the chassis 116. In FIG. 4c, only a lower region of the low-friction guide 118 can be seen. A sleeve-shaped portion of the low friction guide 118, which is not shown, extends into the chassis 116. Preferably, this sleeve-shaped region or low-friction guide 118 extends into the chassis 116 at least halfway along the height of the chassis 116, more preferably at least substantially along the entire height of the chassis 116.

As shown in FIG. 4c, the elastic element 117 is formed as a coil spring. The shaft 114 is fixedly arranged on the support wheel 111 in a spring travel direction of the elastic element 117. In this case, the shaft 114 and thus the support wheel 111 are arranged on the chassis 116 so as to be movable along a support wheel spring path between a rest position when the service robot 1000 is at rest and a maximum spring position in the spring path direction. The support wheel spring travel is oriented at least substantially perpendicular to the main extension plane of the autonomously driving base platform 1000, i.e., perpendicular downwardly toward the ground.

The shaft 114 has a head 115 that is designed to limit the support wheel spring travel or define the rest position. For this purpose, the head 115 comes into contact with the chassis 116 or another element for defining the rest position. Particularly preferably, the support wheel suspension 113 has an adjusting device 119, only indicated here, by means of which a spring travel of the elastic element 117 can be adjusted.

Figure 5:
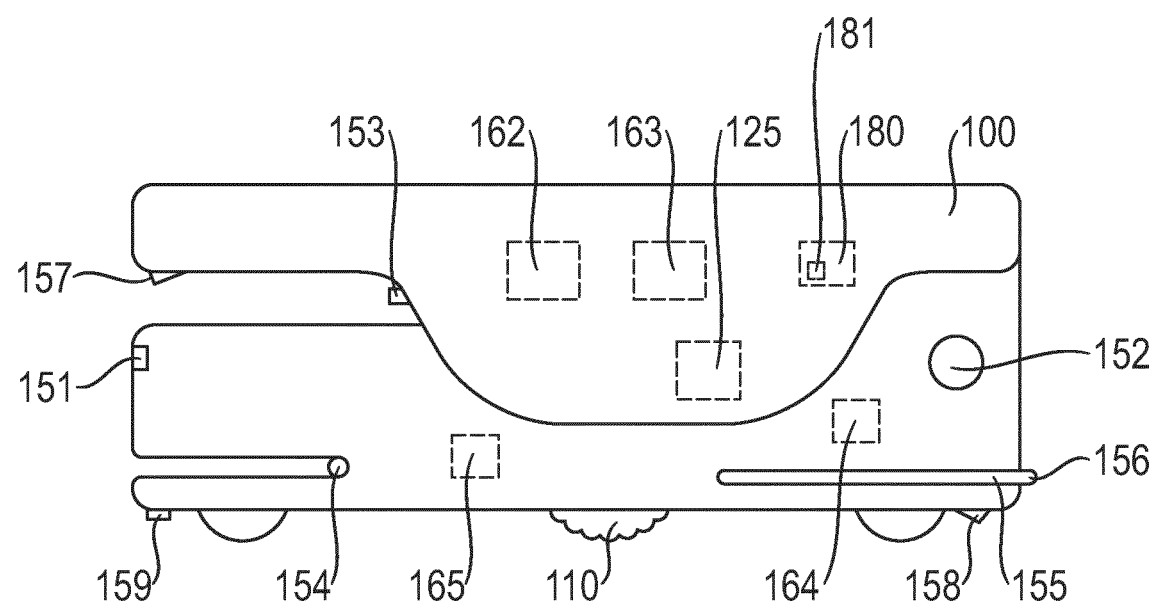
FIG. 5 depicts a schematic side view of the autonomously driving base platform.

FIG. 5 shows a schematic side view of the autonomously driving base platform 100, which is already shown in an oblique view in FIG. 3a. The front of the autonomously driving base platform 100 is on the left in FIG. 5, while the rear of the autonomously driving base platform 100 is on the right in FIG. 5. The trolley 110 of the autonomously driving base platform 100 can also be seen at the bottom of FIG. 5.

FIG. 5 schematically shows the control module 162 of the autonomously driving base platform 100 by means of a square shown in dashed lines. The control module 162 is software that runs on a computer unit of the autonomously driving base platform 100. Furthermore, a safety module 163 of the autonomously driving base platform 100 is schematically shown in FIG. 5 by means of a square shown in dashed lines. This safety module 163 is also software that runs on a computer unit of the autonomously driving base platform 100. Here, the software of the control module 162 is formed separately from the software of the safety module 163, with the control module 162 and the safety module 163 each running on a different computing unit of the autonomously driving base platform 100.

The control module 162 is connected to a plurality of the various work area sensing sensors for sensing the work area of the service robot 1000 and outputting work area sensing sensor data including information on the sensed work area that the autonomously driving base platform 100 has, whereby the respective work area sensing sensor is a control sensor and the service robot 1000 has a corresponding plurality of control sensors. In this regard, the control module 162 is configured to control the autonomously driving base platform 100 based on the work area sensing sensor data received from the control sensors and to transmit control commands to the drive 125 to control the autonomously driving base platform 100.

The safety module 163 is for preventing accidents with the service robot 1000 due to collisions of the service robot 1000 with obstacles. In this regard, the safety module 162 is connected to a plurality of the work area detection sensors for receiving work area detection sensor data output from the respective work area detection sensor, whereby the respective work area detection sensor is a safety sensor and the service robot 1000 correspondingly has a plurality of safety sensors. In this case, the safety module is designed to determine positions of the obstacles in the working area of the service robot 1000 relative to the service robot 1000 based on the working area detection sensor data received from the at least one safety sensor in order to prevent accidents with the service robot 1000 caused by the service robot 1000 colliding with the obstacles. Such obstacles may include, for example, walls, objects in the way, people, animals, and steps or ramps leading up or down.

The safety module 163 is connected to the drive 125 for transmitting safety control commands to the drive 125, and the drive 125 is controllable by safety control commands transmitted by the safety module 163. In this regard, the control module 162 is overridable by the safety module 163 in that the drive 125 is controllable by the safety control commands transmitted by the safety module 163, even if control commands to the contrary are issued to the drive 125 by the control module 162. That is, when the drive 125 is overridden, the safety control commands are executed, but not the control commands.

As shown schematically in FIG. 5 by a square shown with dashed lines, the autonomously driving base platform 100 includes a braking device 164 for braking and stopping the driving movement of the autonomously driving base platform 100, wherein the safety module 163 is connected to the braking device 164 for transmitting braking commands for braking and stopping the driving movement of the autonomously driving base platform 100 to the braking device 164, and the braking device 164 is controllable by the braking commands transmitted from the safety module 163 to brake and stop the driving movement of the autonomously driving base platform 100 and thus the service robot 1000 based on transmitted braking commands and/or to reduce the driving speed of the autonomously driving base platform 100 based on transmitted braking commands. Said breaking device 164 comprises an electromagnetic brake. That the braking device 164 is controllable by the braking commands transmitted from the safety module 163, that the braking device 164 is adapted to brake and/or stop the driving movement of the autonomously driving base platform 100 based on the braking commands transmitted from the safety module 163, wherein braking the driving movement of the autonomously driving base platform 100 means reducing the driving speed in the driving direction of the autonomously driving base platform 100 and thus of the service robot 1000.

The safety module 163 is configured to issue a stop command to stop the autonomously driving base platform 100. In this context, the safety module 163 is configured to transmit the stop command as a breaking command to the braking device 164 in order to stop the driving movement of the autonomously driving base platform 100. At the same time, the safety module 163 is also adapted to transmit the stop command as a safety control command to the drive 125 to stop the driving movement of the autonomously driving base platform 100. As shown schematically in FIG. 5 by a square shown with dashed lines, the autonomously driving base platform 100 includes a speed determination device 165 for detecting a current driving speed of the autonomously driving base platform 100 and outputting speed data including information on the detected driving speed, wherein the safety module 163 is connected to the speed determination device 165 for receiving speed data outputted from the speed determination device 165. This speed determining device 165 is an encoder arranged on the drive 125, which outputs speed data on the detected travel speed based on the rotational speed of the drive 125.

FIG. 5 also shows the various work area sensing sensors for sensing the work area of the service robot 1000 and outputting work area sensing sensor data with information on the sensed work area, which the autonomously driving base platform 100 and the service unit 200 have. Thus, on the front side of the autonomously driving base platform 100, the stereoscopic camera 151 already mentioned in connection with FIG. 3b can be seen, which is used for image acquisition of image data, wherein the work area acquisition sensor data that can be output from the stereoscopic camera 151 includes image information. Above this stereoscopic camera 151, the autonomously driving base platform 100 has a horizontal incision pointing slightly rearward into the autonomously driving base platform 100. At the rear of this indentation, a first lidar 153 (i.e., a "light detection and ranging" sensor), and thus a first laser scanner, is arranged for detecting obstacles within a first scanning area in the working area of the service robot 1000. This first lidar 153 is a work area detection sensor and is also a control sensor and a safety sensor. The first lidar 153 is based on an infrared laser and is arranged on the autonomously driving base platform 100 such that the first scanning area is located in front of the front side of the autonomously driving base platform 100, wherein the working area detection sensor data outputted from the first lidar 153 includes information on the obstacles detected by the first lidar 153. In this regard, the first lidar 153 is arranged and oriented on the autonomously driving base platform 100 such that the first sensing area lies in a horizontally oriented, first sensing area plane during operation of the service robot 1000. In this regard, the first lidar 153 and the first scanning area are arranged 158 mm above the ground in operation of the autonomously driving base platform 100 and in operation of the service robot 1000, respectively. The first scanning range thereby covers an angular range of 270° in the first scanning range plane, starting from the first lidar 153. Thus, the first scanning range is a partial range of the working range.

Below the stereoscopic camera 151, the autonomously driving base platform 100 also has a horizontal notch pointing slightly rearward into the autonomously driving base platform 100. At the rear of this indentation, a second lidar 154 (i.e., a "light detection and ranging" sensor), and thus a second laser scanner, is arranged for detecting obstacles within a second scanning area in the working area of the service robot 1000. This second lidar 154 is also a work area detection sensor and, at the same time, a control sensor and a safety sensor. In this regard, the second lidar 154 is arranged a on the autonomously driving base platform 100 such that the second sensing area is located in front of the front of the autonomously driving base platform 100, wherein the work area sensing sensor data that can be output from the second lidar 154 includes information about the obstacles detected by the second lidar 154. The second lidar 154 is arranged and oriented on the autonomously driving base platform 100 such that the second sensing area lies in a horizontally oriented, second sensing area plane during operation of the service robot 1000. In this regard, the second lidar 154 and the second scanning region are arranged 52 mm above the ground, and thus at a lower height above the ground than the first lidar 153 and the first scanning region, in operation of the autonomously driving base platform 100 and in operation of the service robot 1000, respectively. The second scanning range thereby covers an angular range of 150° in the second scanning range plane, starting from the second lidar 154. Thus, the first scanning range is a partial range of the working range.

As shown in FIG. 5, the autonomously driving base platform 100 further includes a contact sensor 155 for detecting contacts of a contact element 156 of the service robot 1000 with an obstacle. In this regard, the contact element 156 is a contact strip and extends across an entire width of a rear side of the autonomously driving base platform 100 and from a rear side of the autonomously driving base platform 100 forward to a center portion of the sides disposed between the front side and the rear side of the autonomously driving base platform 100. This contact sensor 155 is also a work area detection sensor and also a safety sensor. The work area detection sensor data that can be output from the contact sensor 155 includes information on the contacts of the contact element 156 with an obstacle detected by the contact sensor 155.

Further, it can be seen in FIG. 5 that the autonomously driving base platform 100 has two floor step detection sensors 157, 158 at the front and rear, respectively, for detecting a distance of objects or ground measured in a distance measuring direction from the respective floor step detection sensor 157, 158, which are working area detection sensors and safety sensors at the same time. In operation of the service robot 1000, the floor step detection sensors 157, 158 are inclined downward at an inclination angle with respect to the horizontal so that the respective distance measurement direction is inclined downward with the respective inclination angle, wherein the work area detection sensor data outputted from the floor step detection sensors 157, 158 is information on the distance detected by the floor step detection sensors 157 158.

The two front floor step detection sensors 157 are arranged next to each other in the front area of the incision above the stereoscopic camera 151. In this regard, they are directed at least substantially forward with respect to the service robot 1000. The two front floor step detection sensors 157 are laser distance sensors each having an infrared laser of a wavelength of 827 nm for detecting distance along a single distance measurement direction, with their distance measurement directions facing forwardly apart.

The two rear floor step detection sensors 158 are arranged side by side underneath the autonomously driving base platform 100 behind the trolley 110. In this regard, they are directed at least substantially rearwardly with respect to the service robot 1000. The two rear floor step detection sensors 158 are laser distance sensors each having a visible range laser with a wavelength of 650 nm for detecting distance along a single distance measurement direction, with their distance measurement directions facing rearwardly apart. The floor step detection sensors 157, 158 are oriented such that, during operation of the service robot 1000 when the service robot 1000 is standing on a flat, level surface, the distance measurement direction originating from the respective floor step detection sensor 157, 158 strikes the flat, level surface at a distance from the service robot 1000 that is greater than a distance within which the driving movement of the autonomously driving base platform 100 and thus of the service robot 100 can be stopped at a maximum driving speed of the service robot 1000 in a driving direction at least substantially corresponding to the distance measuring direction by a stop command issued by the safety module 163 for stopping the autonomously driving base platform 100 and transmitted as a safety control command to the drive 125 and as a braking command to the breaking device 164 in order to stop the driving movement of the autonomously driving base platform 100.

In addition, the safety module 163 is adapted to check whether the distances detected by the floor step detection sensors 157, 158 are greater by a distance threshold value than a distance detected by the respective floor step detection sensor 157, 157 directed at the flat, level ground during operation of the service robot 1000 when the service robot 1000 is standing on a flat, level ground, and, if the distance detected by the respective floor step detection sensor 157, 158 is greater by the distance limit value than the distance detected by the respective floor step detection sensor 157, 158 directed at the flat, level ground during operation of the service robot 1000 when the service robot 1000 is standing on a flat, level ground, to issue the stop command for stopping the autonomously driving base platform WO. In this case, the distance limit value depends on the respective floor step detection sensor 157, 157 and is in each case at most equal to a step height limit value divided by the sine of the angle of inclination of the respective floor step detection sensor 157, 158, wherein the step height limit value is a maximum step height that can be passed safely and without danger by the service robot 1000. In the present case, this step height that can be passed safely and without danger by the service robot 1000 is 40 mm.

In the case of the two front floor step detection sensors 157, which have their distance measurement direction directed at least substantially forward with respect to the service robot 1000, the maximum travel speed is the maximum possible forward travel speed of the service robot 1000. In contrast, in the case of the two rear floor step detection sensors 158, which have their distance measurement direction directed at least substantially backward with respect to the service robot 1000, the maximum travel speed is the maximum possible backward travel speed of the service robot 1000.

As shown in FIG. 5, the autonomously driving base platform 100 further includes a magnetic sensor 159 for detecting magnetic markings on or in the ground on its underside in an area of the front side of the autonomously driving base platform 100, which magnetic sensor 159 is also a work area detection sensor and is also a control sensor and a safety sensor. The work area detection sensor data that can be output from the magnetic sensor 159 includes information about a magnetic field detected by the magnetic sensor and thus magnetic fields generated by the magnetic markers.

Apart from the work area detection sensors explained above in connection with FIG. 5, the service unit 200 and thus the service robot 1000 also have two further work area detection sensors. Thus, as can be seen in FIG. 1*a*, a second stereoscopic camera 161 is arranged below the upper side of the service unit 200 on the front side of the service unit 200 for image acquisition of image data, wherein the work area acquisition sensor data that can be output from the second stereoscopic camera 161 contains image information. Further, as can be seen in FIG. 1*a*, a ceiling image sensor 160 is arranged on the upper side of the service unit 200 for image detection of image data, wherein the work area detection sensor data that can be output from the ceiling image sensor 160 includes image information, wherein the ceiling image sensor 160 is arranged facing upward on the service unit 200 in such a way that, during operation of the service robot 1000, image data of an area above the service robot can be recorded with the ceiling image sensor 160. Both the second stereoscopic camera 161 and the ceiling image sensor 160 are also control sensors.

In FIG. 5, in addition to the workspace detection sensors described above, it can be seen that the autonomously driving base platform 100 and thus the service robot 1000 has an accelerometer arrangement 180 with at least one accelerometer 181 for detecting an acceleration along three accelerometer axes and thus at least one accelerometer axis with a fixed orientation relative to the service robot 1000 in both directions of the respective accelerometer axis, in order to detect the acceleration to which the service robot 1000 is subjected and to output accelerometer data with information on the detected acceleration. In this regard, the accelerometer arrangement 180 may include one or more gyroscopes for detecting a rotational motion of the service robot 1000 and may be configured to output gyroscope data including information on the detected rotational motion.

Regardless of the presence of a gyroscope, the acceleration sensor arrangement 180 is configured to detect an acceleration of the service robot 1000 in the forward direction and the backward direction of the service robot 1000 during operation of the service robot 1000, and to output acceleration sensor data including information on this detected acceleration. That is, a first one of the three accelerometer axes relative to the service robot 1000 extends along the forward direction and the backward direction of the service robot 1000. Further, the accelerometer arrangement 180 is adapted to detect an acceleration of the service robot 1000 in the sideward direction of the service robot 1000 during operation of the service robot 1000, and to output accelerometer data including information on this detected acceleration. That is, a second of the three acceleration sensing axes relative to the service robot 1000 extends in the sideways direction of the service robot 1000, and is thus oriented horizontally and crosswise to the forward direction and the backward direction of the service robot 1000. Thus, the accelerometer arrangement 180 is configured to detect an acceleration of the service robot 1000 at least two-dimensionally in a horizontally aligned plane during operation of the service robot 1000 and to output accelerometer data including information on this detected acceleration. Further, the accelerometer arrangement 180 is adapted to detect an acceleration of the service robot 1000 upward and downward during operation of the service robot 1000, and to output accelerometer data including information on this detected acceleration. That is, a third of the three acceleration sensing axes relative to the service robot 1000 vertically aligned with the service robot 1000. Thus, the accelerometer arrangement 180 is adapted to detect an acceleration of the service robot 1000 in all three spatial dimensions during operation of the service robot 1000, and to output accelerometer data having information about this detected acceleration. That is, the accelerometer arrangement 180 is configured to detect an acceleration of the service robot 1000 along the three acceleration measurement axes, each of which three acceleration measurement axes is oriented differently relative to the service robot 1000, during operation of the service robot 1000, and to output accelerometer data with information on this detected acceleration.

Figure 6:
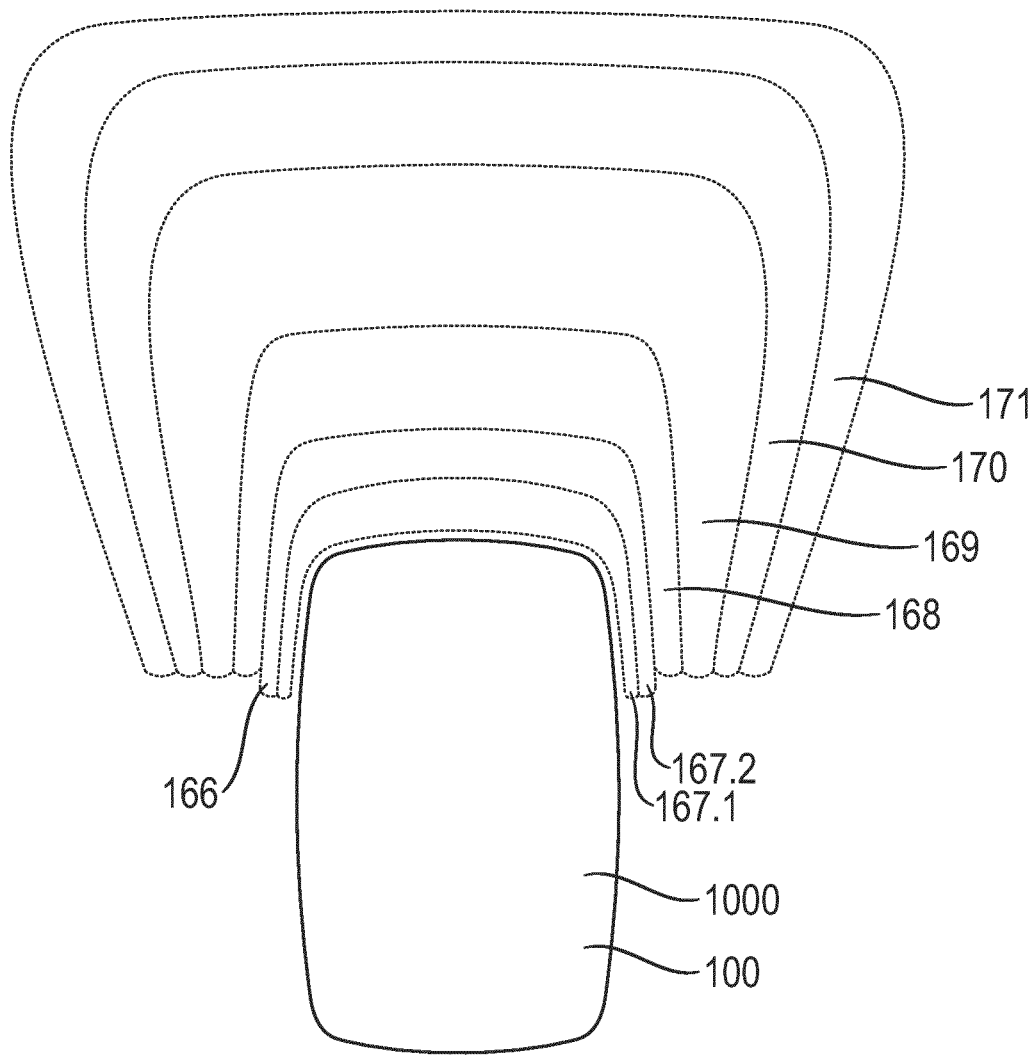
FIG. 6 depicts a highly simplified schematic top view of the service robot and the autonomously driving base platform with safety areas arranged in front of the service robot or in front of the autonomously driving base platform.

FIG. 6 shows a highly simplified schematic view of the service robot 1000 and the autonomously driving base platform 100. The bottom of FIG. 6 corresponds to the back of the service robot 1000 or the autonomously driving base platform 100, while the top of FIG. 6 corresponds to the front of the service robot 1000 or the autonomously driving base platform 100. It can be seen that a plurality of safety areas 166, 168, 169, 170, 171 are arranged in front of the front side of the service robot 1000 or the autonomously driving base platform 100, of which the first safety area 166 is divided into two safety subareas 167.1, 167.2.

The safety module 163 is configured to check whether one of the positions relative to the service robot 1000 of the obstacles in the working area of the service robot 1000 detected by means of the safety sensors and determined by the safety module 163 is within the first safety area 166 defined around the service robot 1000 and, if one of the positions relative to the service robot 1000 of the obstacles in the working area of the service robot 1000 is within the first safety area 166 defined around the service robot 1000, to output the stop command described above for stopping the autonomously driving base platform 1000. In this regard, the first safety area 166 is divided into two or more first safety subareas 167.1, 167.2 and the safety module 163 is adapted to check whether one of the positions relative to the service robot 1000 of the obstacles in the working area of the service robot 1000 is within one of the first safety subareas 167.1, 167.2 and, if so, within which of the first safety subareas 167.1, 167.2 this position lies, wherein the safety module 163 is also designed to output, if appropriate, a stop command corresponding to that of the first safety subareas 167.1, 167.2 within which, according to the check by the safety module 163, the one of the positions of the obstacles in the working area of the service robot 1000 lies relative to the service robot 1000, for stopping the autonomously driving base platform 100 with an intensity of braking during stopping assigned to the respective first safety subarea 167.1, 167.2. In this case, if according to the check by the safety module 163, positions of obstacles are located in different ones of the first safety subareas 167.1, 167.2, the safety module 163 is adapted to issue the one of the stop commands corresponding to these different ones of the first safety subareas 167.1, 167.2 that signifies the greatest amount of deceleration upon stopping.

In a variation thereon, the first safety area 166 is also divided into two first safety subareas 167.1, 167.2, and the safety module 163 is configured to monitor whether one of the positions relative to the service robot 1000 of the obstacles in the working area of the service robot 1000 is within one of the first safety subareas 167.1, 167.2. However, in this embodiment, the safety module 163 is configured to monitor whether any of the positions of the obstacles in the working area of the service robot 1000 are within a first one of the first safety subareas 167.1, and if necessary, to issue a stop command for stopping the autonomously driving base platform 100, and at a speed during driving movement of the autonomously driving base platform 100 above the predetermined first speed limit value, to monitor whether one of the positions of the obstacles in the working area of the service robot 1000 is within a second one of the first safety subareas 167.2, which is outside the first one of the first safety subareas 167.1 as viewed from the service robot 1000, and if necessary, to issue a stop command for stopping the autonomously driving base platform. Thereby, the stop commands for the respective safety subareas 167.1, 167.2 do not include information about strength of deceleration upon stopping, and the autonomously driving base platform 100 is decelerated with an equal strength upon stop commands for both safety subareas 167.1, 167.2. Further, the safety module 163 is adapted to check whether any of the positions of the obstacles in the working area of the service robot 1000 relative to the service robot 1000 is within the second safety area 168 around the service robot 1000 and, based on the received speed data, to check whether the detected travel speed is or exceeds a maximum speed associated with the second safety area 168, and, if both one of the positions of the obstacles in the working area of the service robot 1000 relative to the service robot 1000 is within the second safety area 168 around the service robot 1000 and the detected travel speed is or exceeds the maximum speed associated with the second safety area 168, to issue a speed reduction command for reducing the travel speed of the autonomously driving base platform 100. In this case, the second safety area 168 is outside the first safety area 166 as viewed from the service robot 1000.

Further, the safety module 163 is adapted to check whether one of the positions of the obstacles in the working area of the service robot 1000 relative to the service robot 1000 is within the third safety area 169 around the service robot 1000 and, based on the received speed data, to check whether the detected travel speed exceeds a maximum speed assigned to the third safety area 169 and, if both one of the positions of the obstacles in the working area of the service robot 100 relative to the service robot is within the third safety area 169 around the service robot 1000 and the detected traveling speed exceeds the maximum speed associated with the third safety area 169, outputting a speed reduction command for reducing the traveling speed of the autonomously driving base platform 100. In this case, the third safety area 169 is outside the second safety area 168 as viewed from the service robot 1000.

Further, the safety module 163 is adapted to check whether one of the positions of the obstacles in the working area of the service robot 1000 relative to the service robot 1000 is within the fourth safety area 170 around the service robot 1000 and, based on the received speed data, to check whether the detected travel speed exceeds a maximum speed assigned to the fourth safety area 170 and, when both one of the positions of the obstacles in the working area of the service robot 1000 relative to the service robot 1000 is within the fourth safety area 170 around the service robot 1000 and the detected traveling speed exceeds the maximum speed associated with the fourth safety area 170, outputting a speed reduction command for reducing the traveling speed of the autonomously driving base platform 1000. In this case, the fourth safety area 170 is outside the third safety area 169 as viewed from the service robot 1000.

Further, the safety module 163 is adapted to check whether one of the positions of the obstacles in the working area of the service robot 1000 relative to the service robot 1000 is within a fifth safety area 171 around the service robot 1000 and, based on the received speed data, to check whether the detected travel speed exceeds a maximum speed assigned to the fifth safety area 171 and, if both one of the positions of the obstacles in the working area of the service robot 1000 relative to the service robot 1000 is within the fifth safety area 171 around the service robot 1000 and the detected traveling speed exceeds the maximum speed associated with the fifth safety area 171, outputting a speed reduction command for reducing the traveling speed of the autonomously driving base platform 100. In this case, the fifth safety area 171 is outside the fourth safety area 170 as viewed from the service robot 1000.

The maximum speed assigned to the respective second safety area 168, third safety area 169, fourth safety area 170 or fifth safety area 171, respectively, is selected such that the driving movement of the autonomously driving base platform 100 and thus of the service robot 1000 can be stopped by a stop command issued by the safety module 163 for stopping the autonomously driving base platform 100 and transmitted as a safety control command to the drive and as a braking command to the braking device 164, to stop the driving movement of the autonomously driving base platform 100 before the service robot 1000 can reach a stationary obstacle positioned in the respective safety area at the time of issuing the stop command, regardless of its path traveled during the stopping by the driving movement. Thus, the maximum speed associated with the second safety area 168, third safety area 169, fourth safety area 170, or fifth safety area 171 is selected as a function of the geometry and arrangement of the respective safety area around the service robot 1000, the trolley 110 of the autonomously driving base platform 100, and the drive 125 and breaking device 164.

In this regard, the safety module 163 is configured to transmit the speed reduction command as a safety control command to the drive 125 and also as a braking command to the braking device 164 to reduce the travel speed of the autonomously driving base platform 100.

Figure 7A:
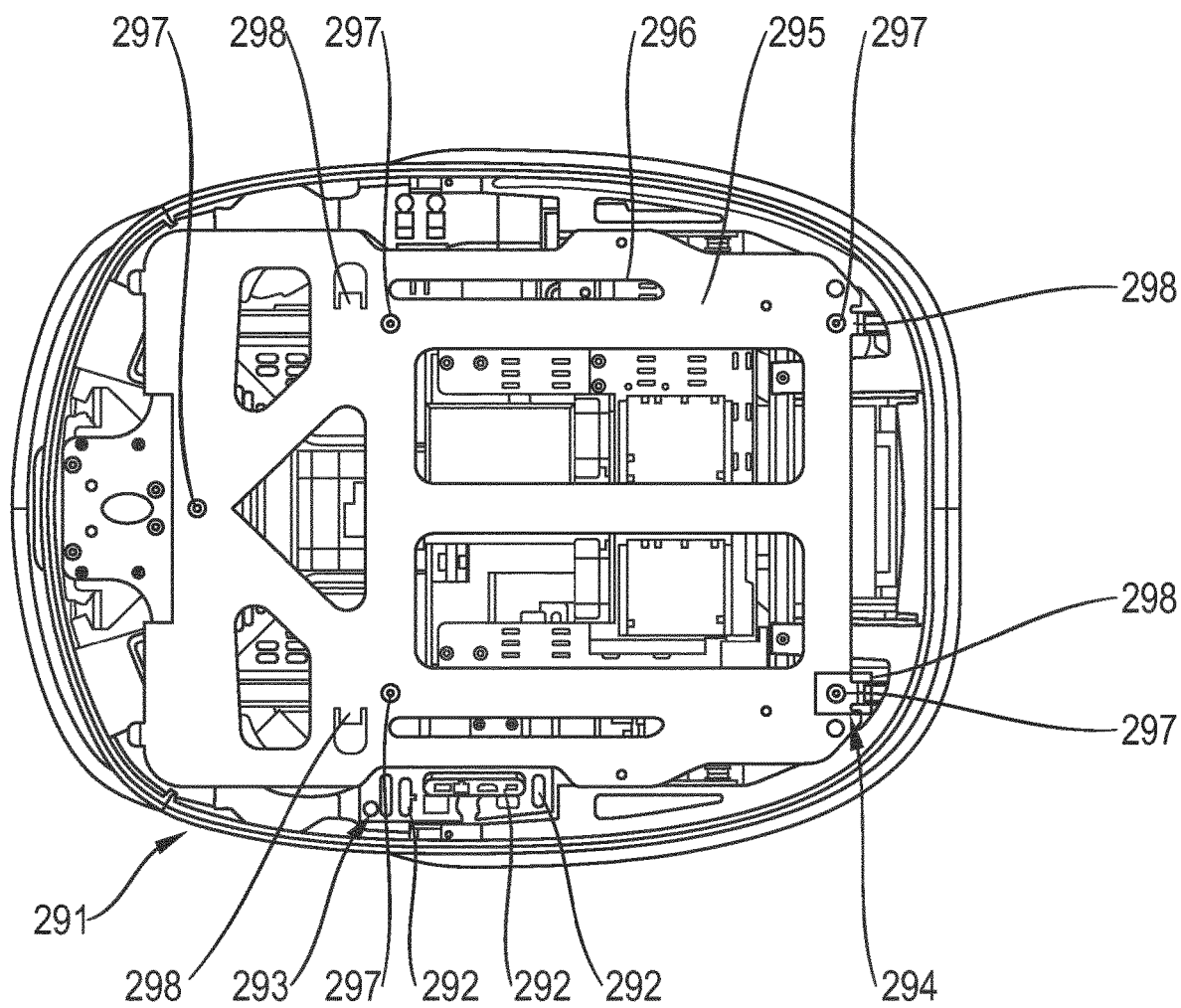
FIGS. 7a, 7b, 7c depict a view of a coupling area of the service unit with a load bearing surface, a view of a counter coupling area of the autonomously driving base structure with a load bearing surface of the service unit, and a magnified view of a mechanical coupling device.
Figure 7B:
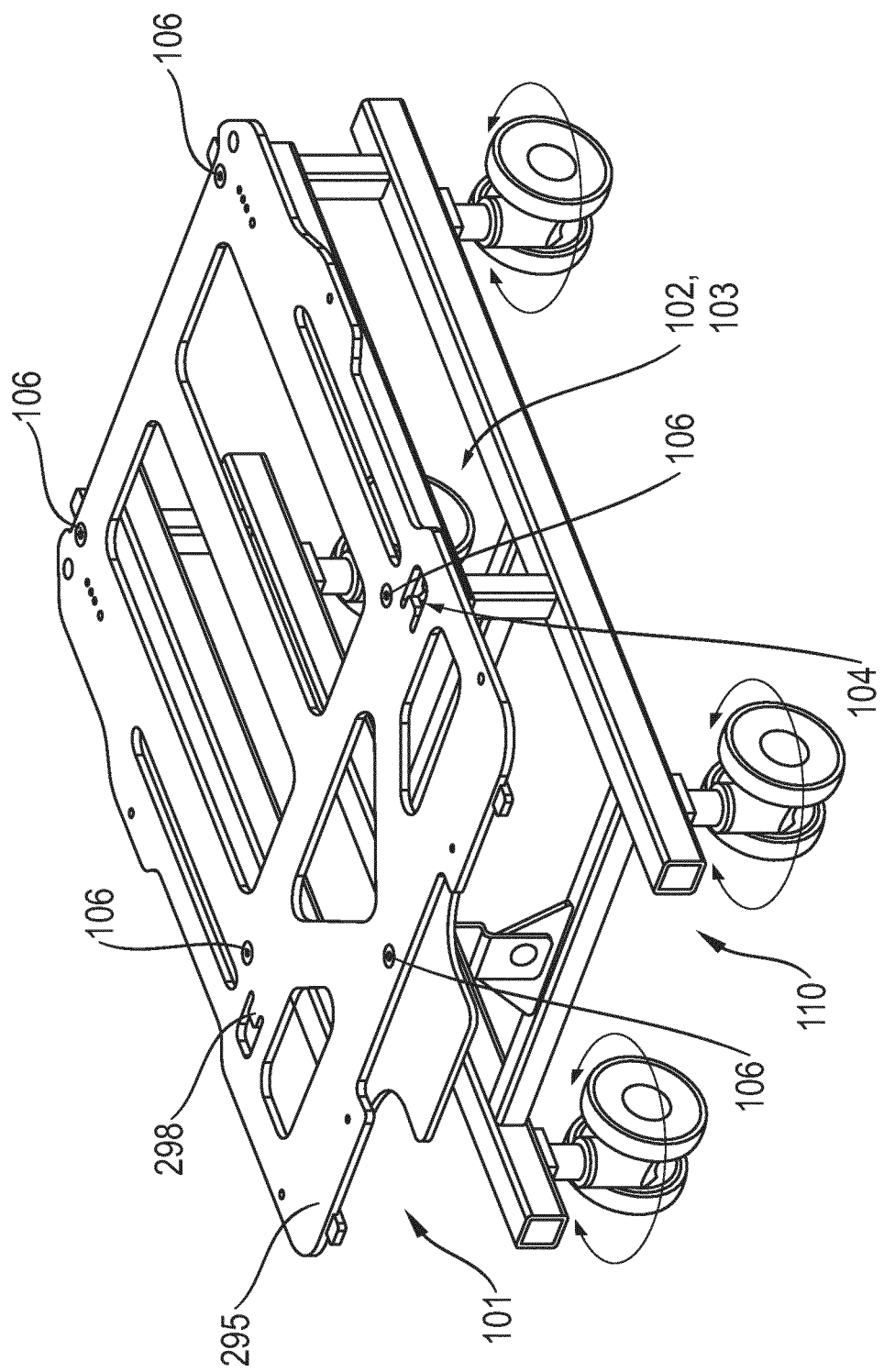

FIG. 7a shows a view of a coupling area 291 of a service unit 200 of the service robot 1000 according to the invention. The coupling area 291 comprises electrical coupling devices 292 for electrically coupling the service unit 200 to electrical counter coupling devices of the autonomously driving base platform 100 not shown in FIG. 7a. The electrical counter coupling devices are indicated in FIG. 7b. The coupling area 291 further comprises mechanical coupling devices 294 for mechanically coupling the service unit 200 to mechanical counter coupling devices of the autonomously driving base platform 100 not shown. The mechanical counter coupling devices are shown in FIG. 7b and in particular FIG. 7c.

As can be seen in FIG. 7a, all electrical coupling devices 292 are arranged grouped in a common electrical coupling area 293. Alternatively, it would be conceivable if the electrical coupling devices 292 were arranged in two common electrical coupling areas 293. The common electrical coupling area 293 is arranged at a decentralized area of the coupling area 291. In FIG. 7a, only three of the electrical coupling devices 292 are provided with reference numerals. However, more than three electrical coupling devices 292 are preferably present. In particular, the common electrical coupling area 293 has a data interface, a safety interface, and a power interface.

The coupling area 291 has a load bearing surface 295. In particular, the load bearing surface 295 is designed as a coupling surface. The load bearing surface 295 thus serves to couple the service unit 200 to the autonomously driving base platform 100. As shown herein, the load bearing surface 295 may be formed as part of the service unit 200. In particular, the load bearing surface 295 may be formed as a floor structure of the support structure 220 shown in FIG. 10c. The load bearing surface 295 includes recesses 296.

The mechanical coupling devices 294 include centering devices 297 for centering the position of the service unit 200 and the autonomously driving base platform 100, and fastening devices 298 for fastening the service unit 200 and the base platform 100 together. Here, the centering devices 297 are formed as centering holes in the load bearing surface 295. The fastening devices 298 are formed as clamp connectors. In particular, fastening devices 298 are formed as first parts of the clamping connector engageable with second parts of the clamping connector arranged on the autonomously driving base platform 100. In particular, the second parts are a quick release mechanism. The mechanical coupling devices 294 are shown more clearly in FIG. 7c.

FIG. 7b shows a view of a counter coupling area 101 of the autonomously driving base platform 100 of the service robot 1000 according to the invention. The counter coupling area 101 comprises electrical counter coupling devices 102 for electrically coupling the autonomously driving base platform 100 to the electrical coupling devices 292 of the service unit 200. Further, the counter coupling area 101 comprises mechanical counter coupling devices 104 for mechanically coupling the autonomously driving base platform 100 to the mechanical coupling devices 294 of the service unit 200.

In FIG. 7b, the electrical counter coupling devices 102 are only indicated by means of reference signs. Likewise, a common electrical counter coupling area 103 is only indicated, in which all electrical counter coupling devices 103 are grouped in an arrangement.

The mechanical counter coupling devices 104 in turn have centering devices 106 for centering the position of the autonomously driving base platform 100 and the service unit 200 and fastening devices 107 for fastening the autonomously driving base platform 100 and the service unit 200 to one another. In this regard, the centering devices 106 are formed as centering pins and the fastening devices 107 are formed as quick release clamps of clamping connectors. As shown, there are preferably four fastening devices 107 arranged.

Figure 7C:
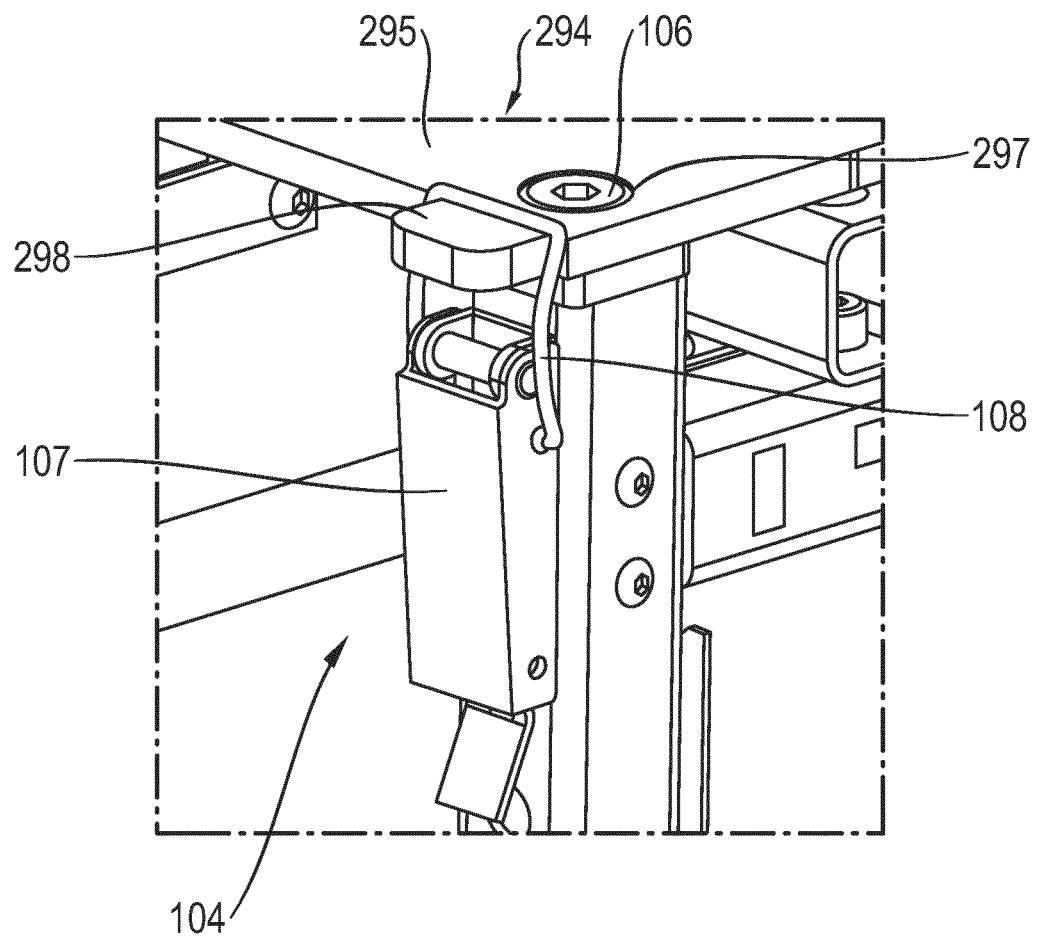

The fastening devices 107 can be seen more clearly in FIG. 7c, which shows a magnified view of a mechanical coupling device 294 or a mechanical counter coupling device 104. Thus, a centering hole is formed in the load bearing surface 295 as one of the centering devices 297 of the service unit 200. Accordingly, the autonomous driving base 100 has a centering pin formed as a centering device 106 of the autonomous driving base 100. The centering pin can preferably also be a screw head.

These two centering devices 106 and 207 cooperate to determine the position of the autonomous driving base 100 and the service unit 200. In particular, the load bearing surface 295 is centered by the centering pins when placed on a frame of the autonomously driving base 100. The frame may be an upper portion of the chassis 116. Alternatively, it may be, for example, elements, such as rods, connected to the chassis 116.

Supporting devices, for example plastic caps, can be arranged between the frame of the autonomous driving base 100 and the load bearing surface 295, on which the load bearing surface 295 rests. Transverse forces, for example due to inertia of the service unit 200 during braking, are absorbed by the centering pins.

Quick connectors are arranged on the autonomous driving base 100, for example on the frame thereof, as fastening devices 107. The quick connectors each have a bracket 108 that is engageable with a corresponding projection on the load bearing surface 295. By means of the quick connectors and the projections, the load bearing surface 295 can be firmly clamped to the autonomously moving base 100 or the frame.

Figure 8:
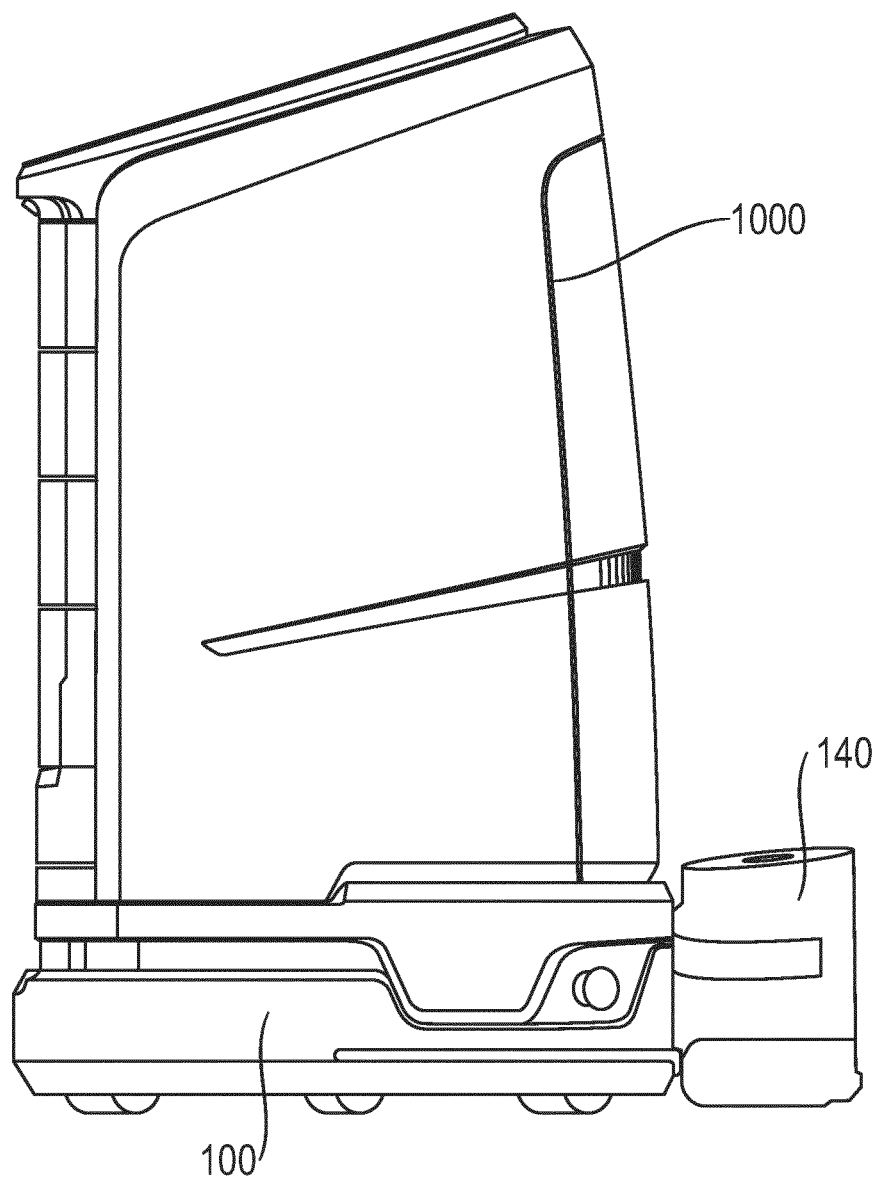
FIG. 8 depicts a side view of a combination of the service robot shown in FIGS. 1 a and 1 b together with a charging station for charging the battery of the service robot.

FIG. 8 shows a side view of a combination of the service robot 1000 shown in FIGS. 1*a* and 1*b* together with a charging station 140 for charging the battery 130 of the service robot 1000.

Figure 9:
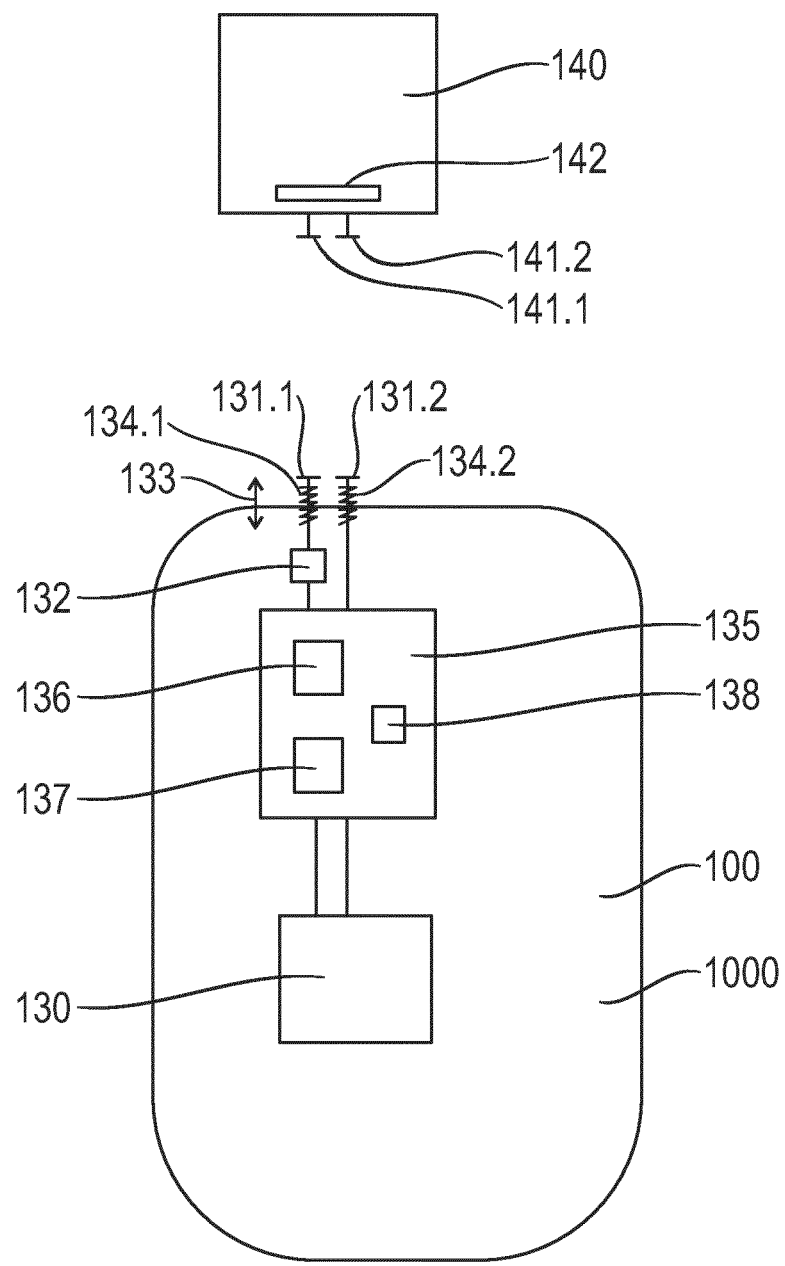
FIG. 9 depicts a highly simplified schematic diagram of a cross-section horizontally through the autonomously driving base platform of the service robot and the charging station.

FIG. 9 shows a highly simplified schematic view of a cross-section horizontally through the autonomously driving base platform 100 of the service robot 1000 and the charging station 140, showing that the autonomously driving base platform 100 has two service robot charging contacts 131.1, 131.2 for contacting two Charging station charging contacts 141.1, 141.2 of the charging station 140 for charging the battery 130. These two service robot charging contacts 131.1, 131.2 are each movably mounted to the autonomously driving base platform 100 along an adjustment track, the adjustment track being at least substantially horizontally oriented and extending at least substantially toward a center of the autonomously driving base platform 100 and away from the center of the autonomously driving base platform 100. In this regard, the two service robot charging contacts 131.1, 131.2 are spring-mounted by a spring 134.1, 134.2 and thus by an elastic means and are biased by this at least one elastic means along the adjustment track 133 away from the center of the autonomously driving base platform 100 into a rest position and are mounted so as to be movable away from their rest position along the adjustment track 133 towards the service robot 1000 against a bias of the at least one elastic means.

For charging the battery 130, each of the two service robot charging contacts 131.1, 131.2 is connected to a different one of the two poles of the battery 130, wherein one of the two service robot charging contacts 131.1 is disconnectable in case of excessive current flow from or to the pole connected to it by means of an overcurrent fuse 132 belonging to the autonomously driving base platform 100.

The autonomously driving base platform 100 has a charging control unit 135 for controlling the charging of the battery 130. This charging control unit 135 has a short circuit testing unit 136 with which a DC voltage can be applied across the two service robot charging contacts 131.2, 131.2, with the short-circuit testing device 136, a drop in the DC voltage can be detected. In this case, the charging control unit 135 is designed to disconnect a connection between one of the service robot charging contacts 131.1 and the corresponding pole of the battery 130 when a drop in the DC voltage is detected by the short-circuit test unit 136. Further, the charging control unit 135 has a capacitance measuring unit 137 with which an AC voltage can be applied across the two service robot charging contacts 131.1, 131.2, wherein a capacitance across the two service robot charging contacts 131.1, 131.2 can be determined with the capacitance measuring unit 137. The frequency of this AC voltage is 35 kHz. The AC voltage also has a peak-to-peak amplitude of 1.5 volts. In this regard, the charging control unit 135 is adapted to check whether the capacitance determined by the capacitance measuring unit 137 is within a specific capacitance range characteristic of the charging station 140, and if the capacitance determined by the capacitance measuring unit 137 is outside the specific capacitance range, to disconnect a connection between one of the service robot charging contacts 131.1 and the corresponding pole of the Battery 130.

Furthermore, the charging control unit 135 has a voltage pulse measuring unit 138 with which individual voltage pulses can be detected at one of the two service robot charging contacts 131.1, 131.2. In this case, the charging control unit 135 is designed to disconnect a connection between one of the service robot charging contacts 131.1 and the corresponding pole of the Battery 130 if no individual voltage pulse is detected by the voltage pulse measuring unit 138 within a specific time window.

When the operating module 300 of the service robot 1000 determines that the charge of the Battery 130 falls below a certain threshold, it steers the service robot 1000 to the charging station 140. In doing so, a position of the charging station 140 is determined by the service robot 1000 based on an infrared reflector 142 attached to the charging station 140. Subsequently, the operating module 300, navigation module, and control module 162, respectively, control the service robot 1000 backward with the service robot charging contacts 131.1, 131.2 in advance to the charging station 140 so that the service robot charging contacts 131.1, 131.2 contact the charging station charging contacts 141.1, 141.2 to charge the Battery 130. In this regard, a DC voltage is applied across the two service robot charging contacts 131.1, 131.2 with the short-circuit checking device 136 and continuously monitored to determine whether a drop in the DC voltage is detected a connection between one of the service robot charging contacts 131.1, 131.2 with the short-circuit checking device 136. When a drop in DC voltage is detected, the connection between one of the service robot charging contacts 131.1, 131.2 and the corresponding terminal of the Battery 130 is disconnected to stop charging of the Battery 130 and to prevent a short circuit of a Battery 130. Further, the capacitance measuring unit 138 applies an AC voltage across the two service robot charging contacts 131.1, 13.2, and continuously monitors whether the capacitance determined by the capacitance measuring unit 138 is outside the certain capacitance range corresponding to the capacitance characteristic of the charging station 140. When the determined capacitance is within the certain capacitance range, the connection between one of the service robot charging contacts 131.1 and the corresponding terminal of the Battery 130 is disconnected to stop the charging of the Battery 130 and to prevent a short circuit of the Battery 130.

Figure 10A:
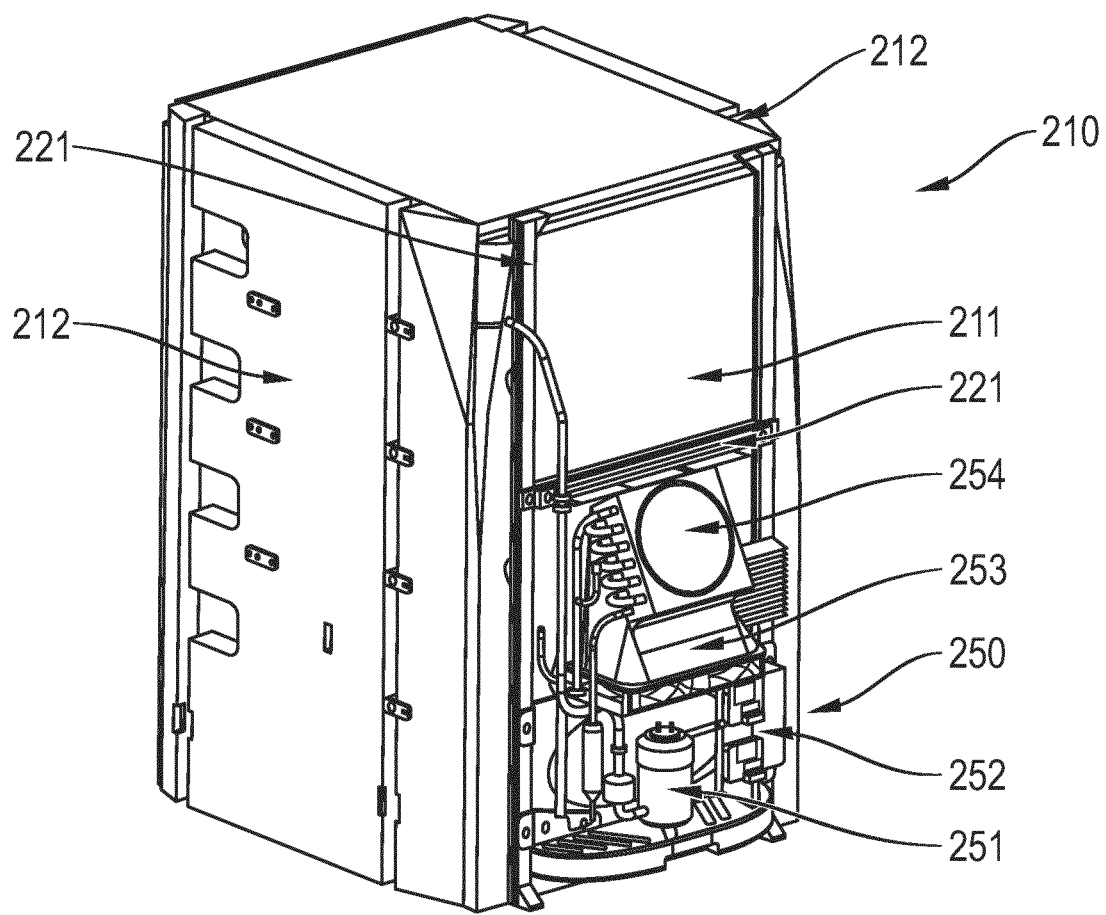
FIG. 10a depicts a perspective view of a housing with cooling device.

FIG. 10A shows a perspective view of a housing 210 with a cooling device 250. The housing 210 has a rear wall 211 and two side walls 212. The two side walls 212 are arranged opposite each other on the left and right sides of the housing 210, respectively. The side walls 212 and the rear wall 211 are made of a foam-like insulating material such as expanded polystyrene, also known as Styrofoam, or a foam insulating material such as polyurethane foam. The housing 210 defines an interior space 213 (not shown), which is used in operation as a refrigeration space for the service unit 200.

A cooling device 250 is arranged on the rear wall 211 of the housing 210. The cooling device 250 includes a compressor 251 with controls, which moves refrigerant through the cooling circuit. Additionally, the cooling device 250 includes a temperature controller 252 and a heat exchanger 254. The interior space 213 (not shown) also includes an evaporator plate, a temperature sensor, and a second fan. The compressor 251 conveys refrigerant through the refrigeration circuit, which is compressed in the flow direction after leaving the compressor 251. In the heat exchanger 254, the refrigerant is further cooled down and liquefied. A first fan 253 provides an active flow through the heat exchanger 254 from bottom to top. The liquefied refrigerant is injected into the evaporator plate in the interior space 213 and evaporated. In this process, heat is extracted from the interior space 213. The evaporator plate cools down the interior space 213 until the temperature sensor outputs the set target temperature. To ensure a uniform temperature development in the cooled interior space 213, the air is circulated by a second fan. When the service robot 1000 is in operation, the interior space 213 has a temperature of 6-8° C. in normal operation.

A rear structure 221 is located on the rear wall 211 of the housing 210, which is part of an overall support structure 220 (not shown). The cooling device 250 is substantially attached to the rear structure 221 of the support structure 220 to provide a sufficient degree of stability. The entire cooling device 250 is located substantially in the lower half of the rear wall 211 to keep the overall center of gravity of the service unit 200 (not shown), and thus the entire service robot 1000 (not shown), as low as possible.

Figure 10B:
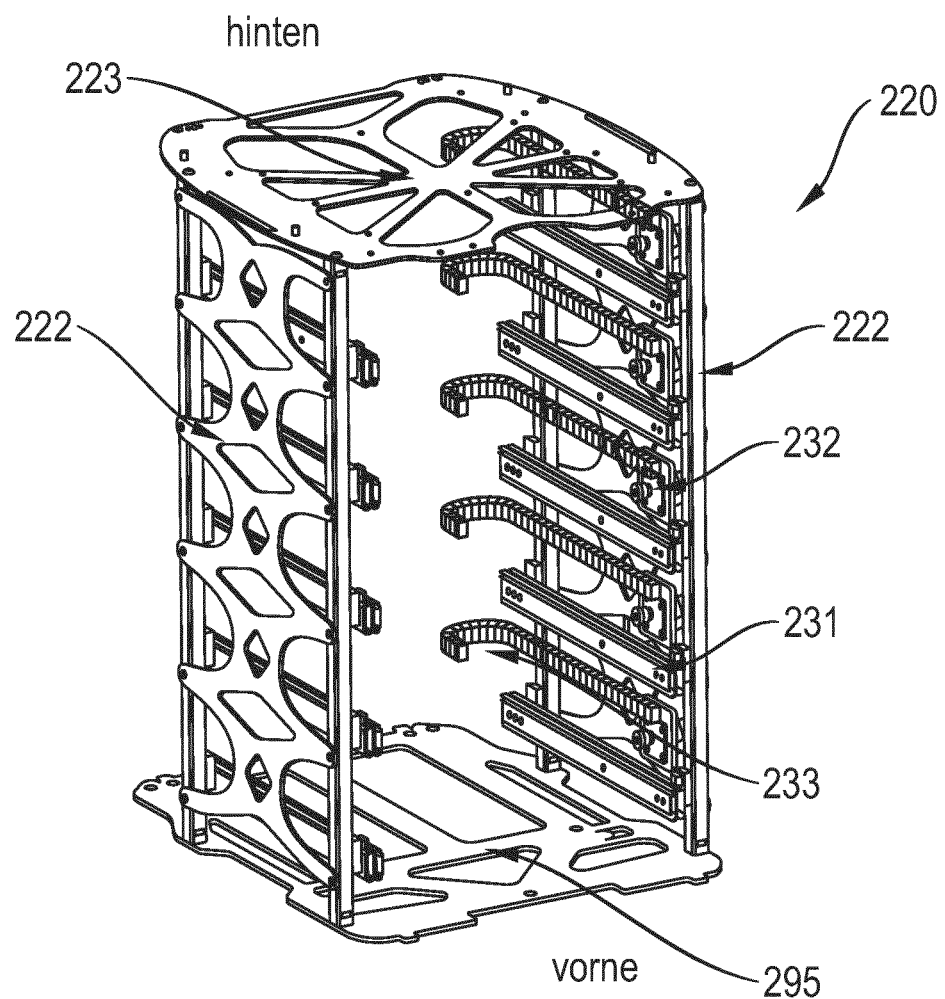
FIG. 10b depicts a perspective view of a support structure.

FIG. 10B a perspective view of a support structure 220 of the service unit 200. The support structure 220 is used to stabilize the service unit (200) and stiffen the housing 210 as a whole. The support structure 220 is arranged outside the housing 210 and includes two opposing side structures 222. The two side structures 222 are respectively associated with side walls 212 (not shown) of the housing 210 (not shown) to provide a high degree of stability to the service unit 200. On an upper surface, the support structure 220 includes a lid structure 223 connecting the two side structures 222. In addition, the two side structures 222 are connected to each other on a lower side via a load bearing surface 295. The rear structure 221 (not shown) described above additionally connects the load bearing surface 295 to the lid structure 223 at the rear. A total of five drawer rail units 231 are located on an inner side of the support structure 220. The drawer rail units 231 are each designed to guide a drawer unit 230 (not shown). Each drawer rail unit 231 includes two opposing pairs of rails, which are slidable relative to each other. Thus, the load of each drawer unit 230 together with its contents is transferred directly to the support structure 220 via the side structures 222.

Additionally, a drawer drive 232 is associated with each of the drawer rail units 231. Each of the drawer drives 232 is directly attached to the side structure 222, and thus to the support structure 220, and is used to transfer a drawer unit 230 between a first position and a second position.

Further, each drawer unit 230 is connectable to a cable chain 233. Each cable chain 233 connects a drawer unit to a control unit of the service robot 1000, and the cable chain 233 may additionally be attached to the side structure 222 of the support structure 220. The cable chains 233 move with the drawer module 230 as it is opened and closed, and can accommodate, for example, data transmission cables or power supply cables.

Figure 10C:
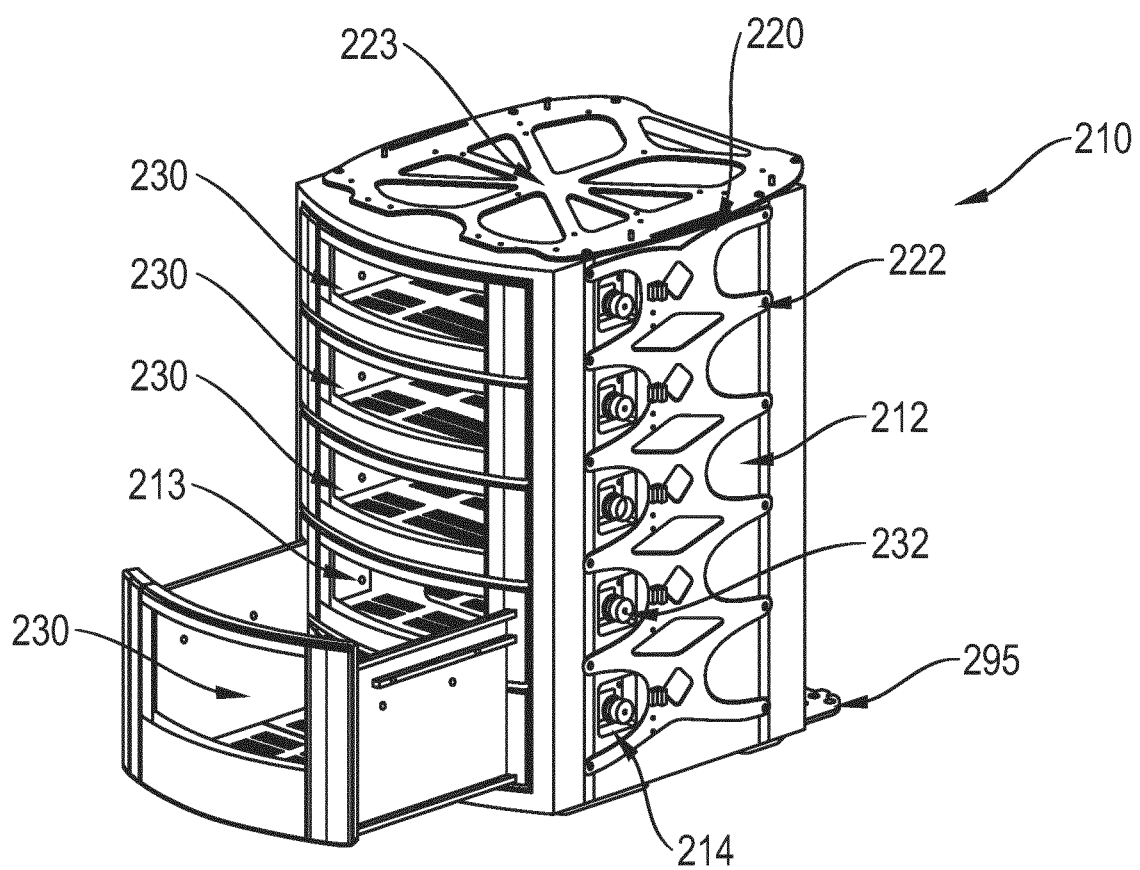
FIG. 10c depicts a perspective view of a housing with support structure.

FIG. 10C shows a perspective view of a housing 210 having a total of four drawer units 230. The housing 210 has a rear wall 211 (not shown) and two side walls 212 arranged opposite each other on the left and right sides of the housing 210, respectively. The housing 210 defines the interior space 213, which is used in operation as the refrigeration space of the service unit 200 and in which the four drawer units 230 are arranged. The support structure 220 is arranged outside the housing 210 and includes the two opposing side structures 222, which are respectively associated with the side walls 212 of the housing 210. On the upper side, there is the lid structure 223 connecting the two side structures 222. On the bottom side is the load bearing surface 295, which is also connected to the side structures 222. Through a plurality of openings 214 in the side walls 212, the drawer drives 232 are connected to the exterior support structure 220. Each of the drawer units 230 is configured to receive a plug-in unit 271 (not shown). In this regard, each drawer unit 230 includes a connector for connecting a data transmission connector 274 of the respective plug-in unit 271. The data transmission connector 273 can receive inventory sensor data output from an inventory sensor of the plug-in unit 271 and transmit the data to an inventory transmission module 302.

Here, each drawer unit 230 is connected to a cable chain 233 (not shown) that carries a data transmission cable and a power supply cable. This provides a simple connection to the operating module 300 of the service robot 1000 (not shown).

Figure 10D:
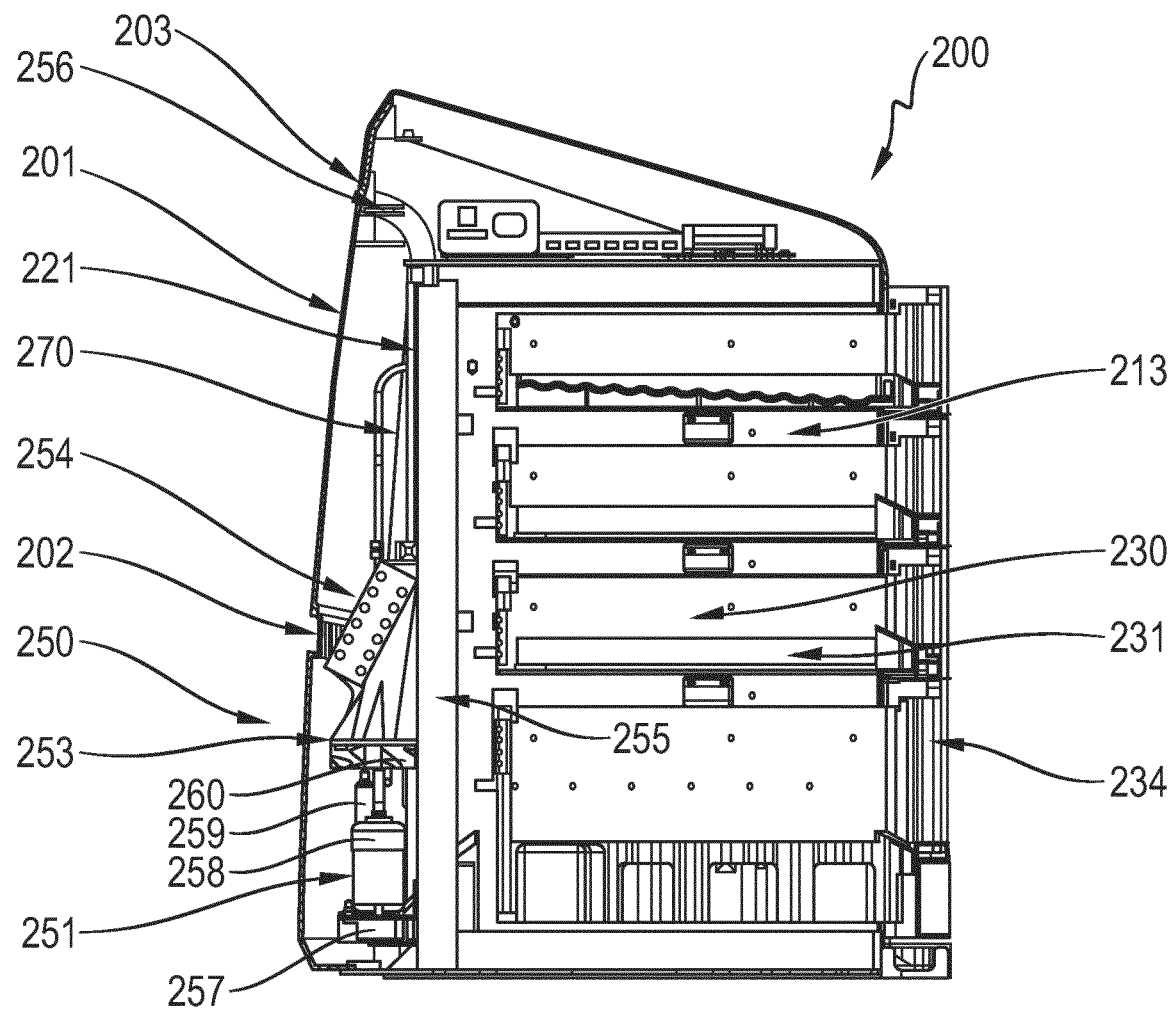
FIG. 10d depicts a sectional view of a service unit.

FIG. 10D shows a sectional view of a service unit 200. The service unit 200 surrounds an outer shell 201. The outer shell 201 may comprise a plurality of components that are arranged to be easily hooked onto and removed from the support structure 220, for example, by means of a centering pin. At about the level of the heat exchanger 254, the outer shell 201 includes ventilation slits 202 to allow cold air to flow in from the outside.

The cooling device 250 includes the compressor 251 with controls, which moves refrigerant through the cooling circuit. In addition, the cooling device 250 comprises a temperature controller 252 (not shown) and the heat exchanger 254 at the level of the ventilation slits 202 of the outer shell 201. The interior space 213 (not shown) also contains the evaporator plate 255 as well as the temperature sensor and the second fan (not shown). The first fan 253 provides an active flow through the heat exchanger 254 from bottom to top.

The cooling device 250 is attached to the rear structure 221 of the support structure 220. An inspection hatch integrated into the outer shell 201 allows quick and easy access to the cooling device 250. A heat channel 270 is located on the rear wall 211 of the housing 210. The heat channel 270 is substantially vertical in shape and, utilizing the stack effect, allows heated air to flow away from the heat exchanger 254. To enhance the effect, the first fan 253 is located below the heat exchanger 254. A second fan 256 is located above the heat exchanger 254 to draw an air flow heated by the heat exchanger 254 into the heat channel 270 extending above the heat exchanger 254. The removed heated air is discharged through an outflow opening 203 from the heat channel 270, and thus from the outer shell 201 toward the rear. A total of four drawer units 230 are arranged in the interior space 213 of the service unit 200. Each drawer unit 230 is connected to the support structure 220 via a drawer rail unit 231.

Below the compressor 251 is a water tank 257 for holding water from the interior space 213. The water tank 257 is configured to collect dew water from the interior space 213, which may also be referred to as the refrigeration space. Above the water tank 257 and the compressor 251 there is a fan 258, which is directed towards the compressor 251 in such a way that air from the fan 258, flowing over the compressor 251, is heated and flows onto the water tank 257. In this process, the collected condensation water is quickly evaporated. In addition, a fan control unit 259 is associated with the fan 258. The fan control unit 259 is for controlling the fan 258 to generate the air flow onto the water tank 257. Further, a cooling device control unit 260 is associated with the cooling device 250. The cooling device control unit 260 is for controlling the temperature of the interior space 213, for example, to cause defrosting or lowering of the temperature of the interior space 213.

Figure 10E:
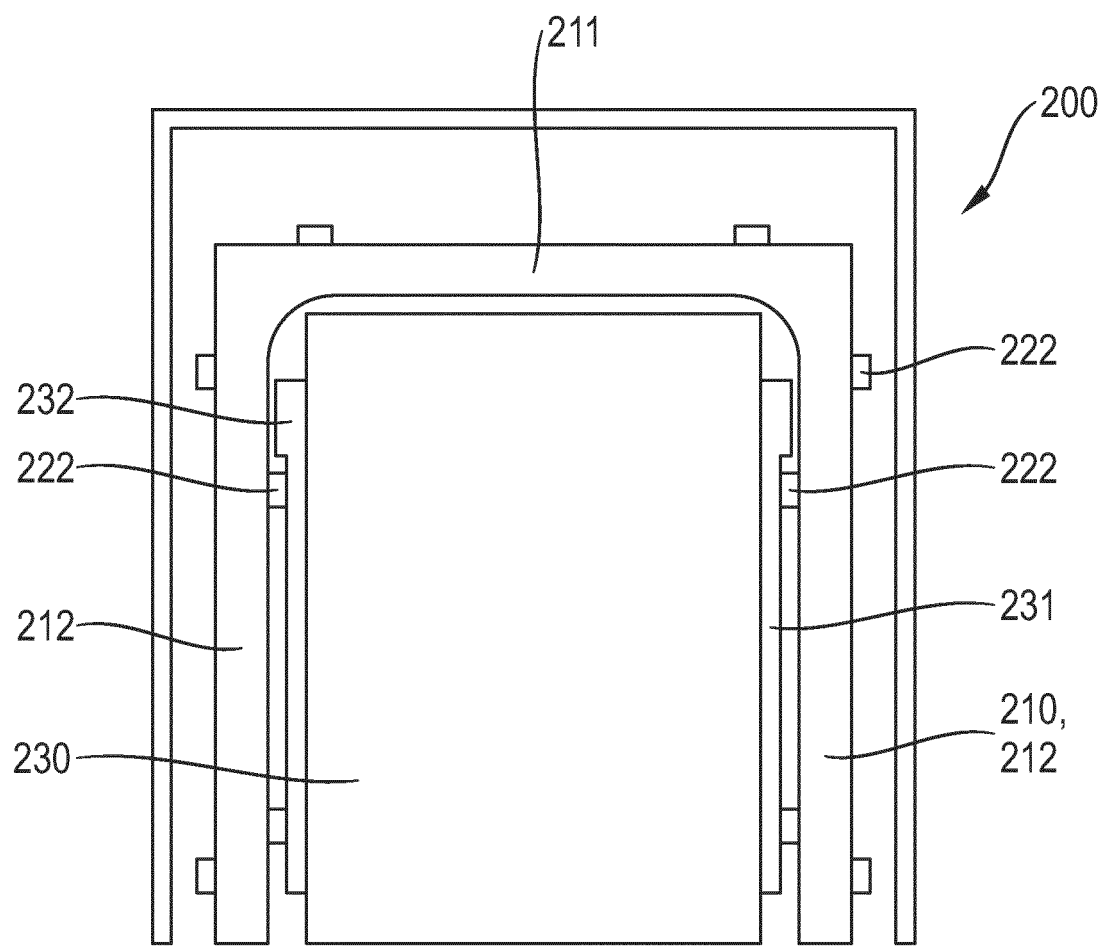
FIG. 10e depicts another sectional view of a service unit, FIG. 11 a, b depict a perspective view of a drawer front with surrounding sealing element and a front view of two drawer fronts, FIG. 12 a, b depict each a plug-in unit for insertion in a drawer unit, as can also be seen in FIG. 1 b inserted in the drawer unit shown open.

FIG. 10E shows another sectional view of a service unit 200. This sectional view shows the service unit 200 in a top view. The housing 210 includes a rear wall 211 and two opposing side walls 212. The housing 210 is made of an insulating material as a one-piece integral structure. To stabilize the housing 210, a support structure 220 is located both outside and inside the housing 210. The support structure 220 includes two side structures 222 associated with the two side walls 212, respectively, and arranged outside and inside the housing 210. With the side structures 222 arranged within the housing 210, the housing 210 can be sufficiently stabilized on its own and can be completely removed from the service unit 200 including the side structures 222. Additionally, the housing 210 includes a drawer rail unit 231 for guiding a drawer unit 230. The drawer rail unit 231 is also arranged within the housing 210 and connected to the side structures 222. Accordingly, the service unit 200 includes a drawer drive 232 for transferring a drawer unit 230 between a first position and a second position. Thus, the drawer unit 230 can be opened or closed using the drawer drive 232. The drawer unit 230 is also fully arranged within the housing 210 and connected to side structures 222 within the housing 210.

Figure 11A:
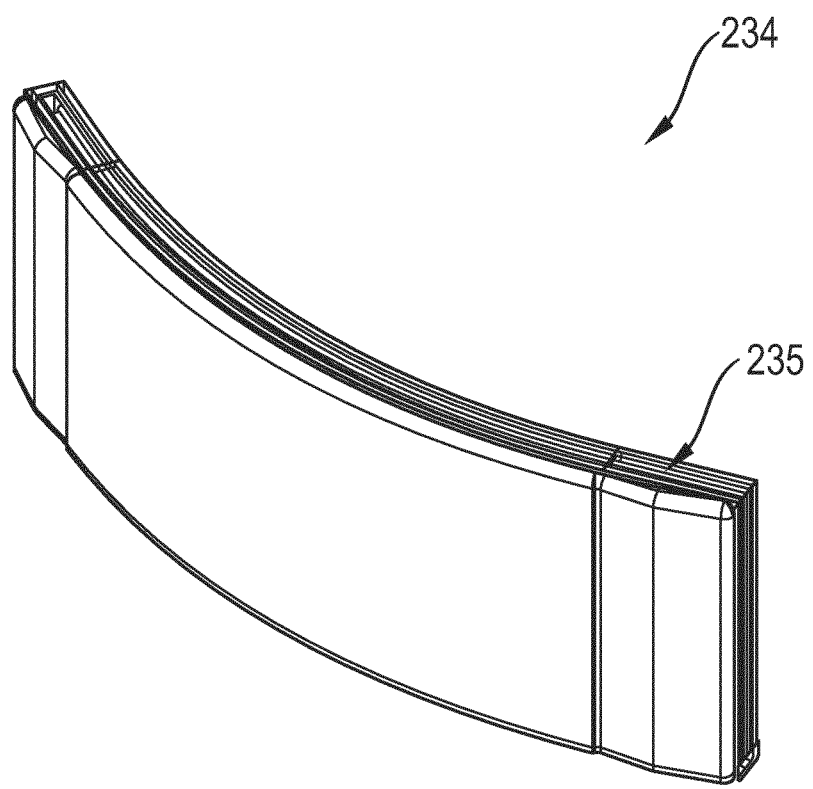

FIG. 11A shows a perspective view of a drawer front 234 with a circumferential sealing element 235. The sealing element 235 provides the drawer unit 230 with the best possible temperature insulation. At the same time, the sealing element 235 serves as a circumferential edge protector for the drawer front 234.

The sealing element 235 is designed overall as a movable rubber seal, which can have a sealing effect in the radial direction as well as in the longitudinal direction.

In the case of several drawer units 230, each of which has a circumferential sealing element 235, the seal between two drawer fronts 234 arranged directly next to one another can be realized by two sealing elements 235 resting against one another. Magnetic elements are introduced in sections within the sealing element 235. On the one hand, the magnetic elements can interact with other magnetic elements of adjacent drawer fronts 234 or magnetic elements in the frame structure of, for example, the housing 210 in order to achieve optimum sealing of the drawer units 230.

Figure 11B:
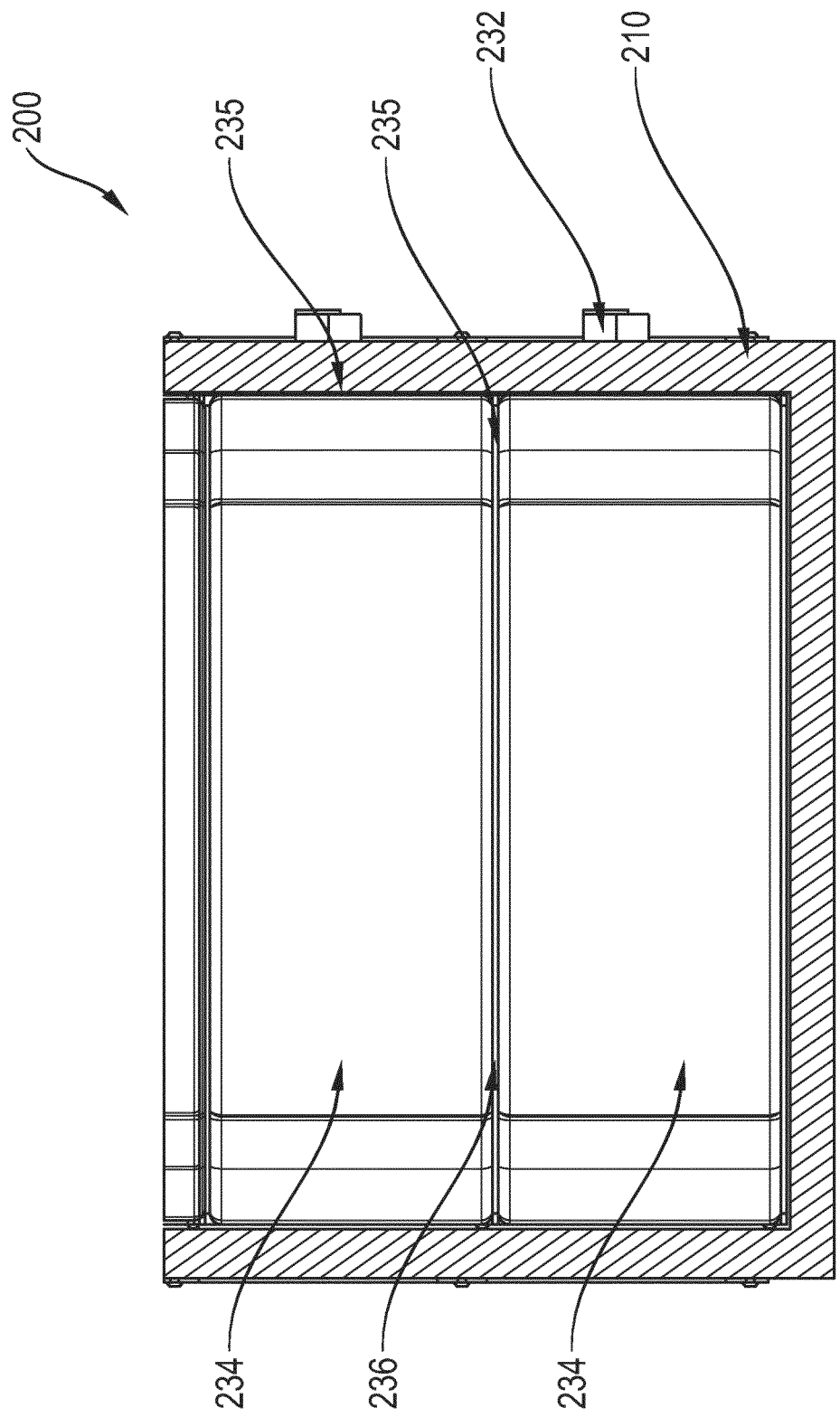

FIG. 11B shows a front view of two drawer fronts 234. Each of the two drawer fronts 234 has a circumferential sealing element 235. The two drawer units 230 associated with the drawer fronts 234 are in a closed position and are arranged immediately adjacent to each other. The air gap 236 between the upper drawer front 234 and the lower drawer front 234 is closed by means of that portion of the circumferential sealing element 235 wherein magnetic elements disposed within the sealing elements 235 interact with each other. In other words, magnetic elements of the upper drawer front 234 attract magnetic elements of the lower drawer front 234, causing the movable sealing elements 235 to close the air gap 236 between the drawer fronts 234. Thus, sealing and temperature isolation is possible without a frame element between the drawer fronts 234. The magnets automatically close the drawer units and do not require any additional holding force, such as could be realized by the associated drawer drives 232. Here, the sealing elements 235 act in a radial direction to the adjacent drawer front 234.

In the longitudinal direction, the sealing elements 235 act on the right and left sides of the drawer front 234. Here, the sealing elements 235 seal against the frame structure here the housing 210. This is possible either by means of magnetic elements recessed in the housing 210 or by means of a continuous tensile force generated by the drawer drives 232. A combination is also conceivable.

The service unit 200 includes a plurality of inventory sensors for sensing an inventory quantity and outputting inventory sensor data including information on the sensed inventory quantity. These inventory sensors are described in more detail below.

Figure 12A:
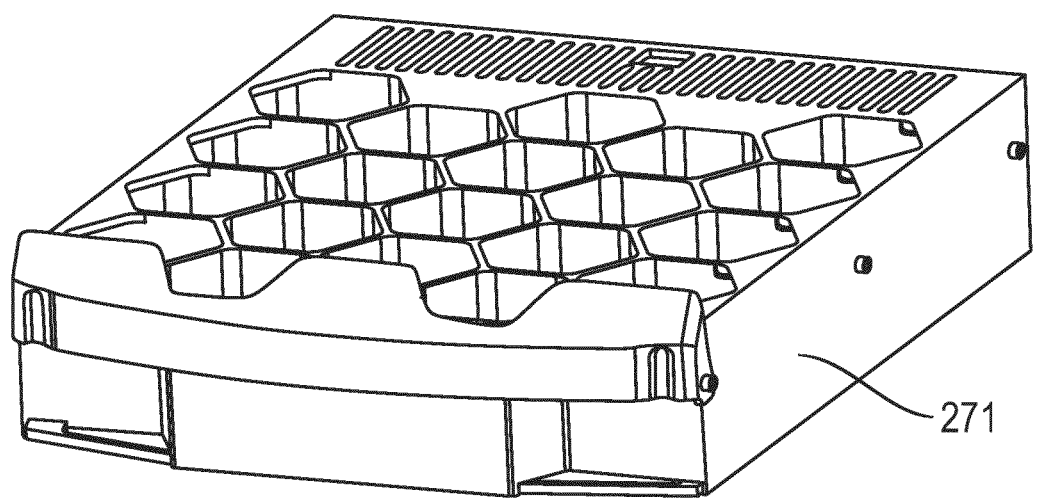
Figure 12B:
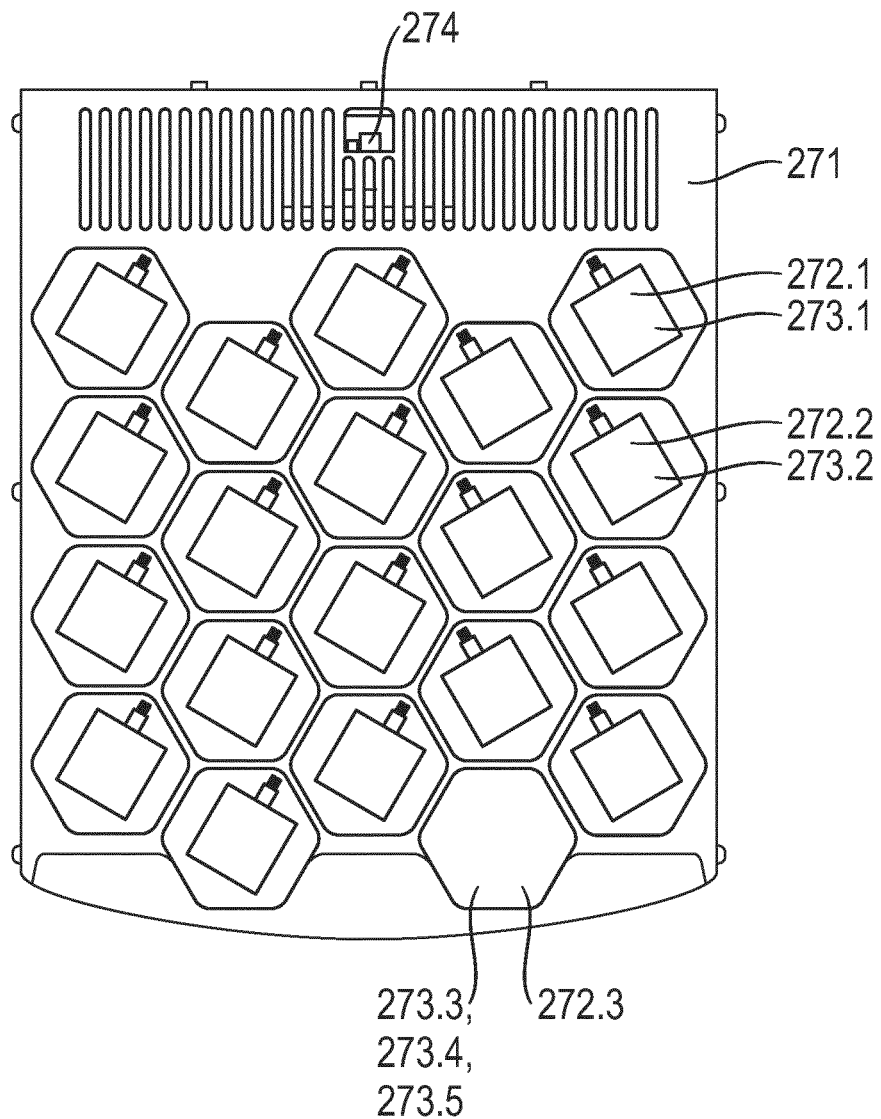

FIGS. 12*a* and 12*b* each show a plug-in unit 271 for plugging into a drawer unit 230, as can also be seen in FIG. 1 *b* plugged into the drawer unit 230 shown open.

This plug-in unit 271, which belongs to the service unit 200, has more than three weight detection pads 272.1, 272.2, 272.3 as inventory object resting surfaces and more than five weight detection sensors 273.1, 273.2, 273.3, 273.4, 273.5 for detecting a weight of at least one inventory item placed on the weight detection pads and outputting weight detection sensor data including information on the inventory item placed on the weight detection pads by the respective weight detection sensor 273.1, 273.2, 273.3, 273.4, 273.5, wherein each weight detection sensor 273.1, 273.2, 273.3, 273.4, 273.5 is one of the at least one inventory sensor, whereby the weight detectable by the weight detection sensors 273.1, 273.2, 273.3, 273.4, 273.5 is the inventory measurand detectable by the weight detection sensors 273.1, 273.2, 273.3, 273.4, 273.5, and the weight detection sensor data is the inventory sensor data output by the weight detection sensors 273.1, 273.2, 273.3, 273.4, 273.5. These weight detection sensors 273.1, 273.2, 273.3, 273.4, 273.5 are each adapted to detect a weight in a range of 0 kg to 2 kg more accurately than to 1 g.

In this regard, each of the weight detection pads 272.1, 272.2, 272.3 is coupled to at least one of the weight detection sensors 273.1, 273.2, 273.3, 273.4, 273.5 to detect the weight of the at least one inventory item when the at least one inventory item rests on the respective weight detection pad 272.1, 272.2, 272.3 during operation of the service robot 1000. Each weight detection sensor 273.1, 273.2, 273.3, 273.4, 273.5 is thereby a sensor for detecting a force acting on the weight measurement position of the at least one weight detection sensor 273.1, 273.2, 273.3, 273.4, 273.5. More specifically, more than two of the weight detection pads 272.1, 272.2 are each coupled to exactly one different one of the weight detection sensors 273.1, 273.2 to detect the weight of the at least one inventory item during operation of the service robot 1000 when the at least one inventory item is positioned on one of the weight detection pads 272.1, 272.2 coupled to exactly one different one of the weight detection sensors 273.1, 273.2. In contrast, another weight detection pad 272.3 is coupled to three of the weight detection sensors 273.3, 273.4, 273.5 to detect the weight of the at least one inventory item during operation of the service robot 1000 when the at least one inventory item is positioned on the weight detection pad 272.3 coupled to the three weight detection sensors 273.3, 273.4, 273.5.

The plug-in unit 271 for plugging into the drawer unit 230 has a connection of the weight detection sensors 273.1, 273.2, 273.3, 273.4, 273.5 of the plug-in unit 271 to a data transmission connector 274 of the plug-in unit 271 for connecting to the connector of the drawer unit 230 to receive the inventory sensor data output from the weight detection sensors 273.1, 273.2, 273.3, 273.4, 273.5 of the plug-in unit 271 and to transmit the inventory sensor data outputted from the weight sensing sensors 273. to the inventory transmission module 302. In this regard, the plug-in unit 271 has a large circuit board on which the weight detection sensors 273.1, 273.2, 273.3, 273.4, 273.5 are arranged and through which the weight detection sensors 273.1, 273.2, 273.3, 273.4, 273.5 are connected to the data transmission connector 274.

Thereby, the inventory transmission module 302 is configured to determine, based on the inventory sensor data received from the weight detection sensors 273.1, 273.2, 273.3, 273.4, 273.5, for each of the weight detection pads 272.1, 272.2, 272.3 to determine the weight resting on each of the weight detection pads 272.1, 272.2, 272.3 to detect the weight of the at least one inventory item resting on each of the weight detection pads 272.1, 272.2, 272.2 during operation of the service robot 1000. Thus, during operation of the service robot 1000 as well as during the provision of services at the local vicinity of people with the service robot 1000, the inventory detection sensors 273.1, 273.2, 273.3, 273.4, 273.5 are preferably provided with the inventory transmission module 302 to receive the inventory sensor data and are provided with the inventory transmission module 302 based on the inventory sensor data for each of the weight detection pads 272.1, 272.2, 272.3, determines the weight resting on the respective weight detection pad 272.1, 272.2, 272.3 to detect the weight of the at least one inventory item resting on the respective weight detection pad 272.1, 272.2, 272.3 during operation of the service robot 1000.

The inventory transmission module 302 is thereby configured to repeatedly receive inventory sensor data from the weight detection sensors 273.1, 273.2, 273.3, 273.4, 273.5 and, based on the inventory sensor data received from each of the weight detection sensors 273.1, 273.2, 273.3, 273.4, 273.5 for each of the weight detection pads 272.1, 272.2, 272.3 to determine the weight resting on the respective weight detection pad 272.1, 272.2, 272.3, and to determine a change in the weight resting on the respective weight detection pad 272.1, 272.2, 272.2 compared to the weight detected on the respective weight detection pad 272.1, 272.2, 272.3 based on the previously received inventory sensor data.3 to determine, in operation of the service robot 1000, a change in the at least one inventory item residing on the respective weight detection pad 272.1, 272.2, 272.3 based on the determined change in the weight residing on the respective weight detection pad 272.1, 272.2, 272.3. Thus, during operation of the service robot 1000 as well as during the provision of services at the local vicinity of people with the service robot 1000 with the inventory detection module 302, the weight detection sensors 273.1, 273.2, 273.3, 273.4, 273.5 inventory sensor data and, based respectively on the inventory sensor data received from the weight detection sensors 273.1, 273.2, 273.3, 273.4, 273.5, for each of the weight detection pads 272.1, 272.2, 272.3, the weight resting on the respective weight detection pad 272.1, 272.2, 272.3 is determined, and a change in the determined weight resting on the respective weight detection pad 272.1, 272.2, 272.3 is determined in each case in comparison to the weight resting on the respective weight detection pad 272.1, 272.2, 272.3 determined based on the previously received inventory sensor data. As a result, during operation of the service robot 1000, a change in the at least one inventory item residing on the respective weight detection pad 272.1, 272.2, 272.3 can be determined based on the determined change in the weight residing on the respective weight detection pad 272.1, 272.2, 272.3.

Further, when the inventory transmission module 302 determines a decrease in the weight on the respective weight detection pad 272.1, 272.2, 272.3 for one of the weight detection pads 272.1, 272.2, 272.3, the inventory transmission module 302 is configured to compare the determined decrease in the weight on the respective weight detection pad 272.1, 272.2, 272.3 with stored weight data of possible inventory items and, if the determined reduction of the weight on the respective weight detection pad 272.1, 272.2, 272.3 corresponds to the stored weight data of one of the possible inventory items, to determine a removal of the corresponding inventory item from the respective weight detection pad 272.1, 272.2, 272.3 and to remove the corresponding inventory item from the detected inventory. In doing so, the inventory transmission module 302 is designed to check, when comparing the determined reduction of the weight on the respective weight detection pad 272.1, 272.2, 272.3 with stored weight data of possible inventory items, whether the determined reduction of the weight on the respective weight detection pad 272.1, 272.2, 272.3 corresponds exactly to the stored weight data of one of the possible inventory items, and if the determined reduction of the weight on the respective weight detection pad corresponds exactly to the stored weight data of one of the possible inventory items to at least 2 g, to determine a removal of the corresponding inventory item from the respective weight detection pad 272.1, 272.2, 272.3 and to remove the corresponding inventory item from the detected inventory.

Accordingly, during operation of the service robot 1000 as well as during the provision of services at the local vicinity of people by the service robot 1000 with the inventory transmission module 302, if for one of the weight detection pads 272.1, 272.2, 272.3 a reduction of the weight resting on the respective weight detection pad 272.1, 272.2, 272.3 is determined, the determined reduction of the weight resting on the respective weight detection pad 272.1, 272.2, 272.3 is compared with stored weight data of possible inventory items and, if the determined reduction of the weight on the respective weight detection pad 272.1, 272.2, 272.3 corresponds to the stored weight data of one of the possible inventory items, a removal of the corresponding inventory item from the respective weight detection pad 272.1, 272.2, 272.3 is determined and the corresponding inventory item is removed from the detected inventory. Thereby, when comparing the determined reduction of the weight resting on the respective weight detection pad 272.1, 272.2, 272.3 with stored weight data of possible inventory items, it is preferably checked whether the determined reduction of the weight resting on the respective weight detection pad 272.1, 272.2, 272.3 corresponds at least 2 g exactly to the stored weight data of one of the possible inventory items, and if the determined reduction of the weight resting on the respective weight detection pad 272.1, 272.2, 272.3 corresponds exactly to the stored weight data of one of the possible inventory items, a removal of the corresponding inventory item from the respective weight detection pad 272.1, 272.2, 272.3 is detected and the corresponding inventory item is removed from the detected inventory.

Furthermore, when an increase in the weight on the respective weight detection pad 272.1, 272.2, 272.3 is determined by the inventory transmission module 302 for one of the weight detection pads 272.1, 272.2, 272.3, the inventory transmission module 302 is adapted to compare the determined increase in the weight on the respective weight detection pad 272.1, 272.2, 272.3 with stored weight data of possible inventory items and, if the determined increase in the weight on the respective weight detection pad 272.1, 272.2, 272.3 corresponds to the stored weight data of one of the possible inventory items, determining an addition of the corresponding inventory item on the respective weight detection pad 272.1, 272.2, 272.3 and adding the corresponding inventory item to the detected inventory. Thereby, the inventory transmission module 302 is adapted to check, when comparing the determined increase of the weight on the respective weight detection pad 272.1, 272.2, 272.3 with stored weight data of possible inventory items, whether the determined increase of the weight on the respective weight detection pad 272.1, 272.2, 272.3 weight on the respective weight detection pad 272.1, 272.2, 272.3 exactly matches the stored weight data of one of the possible inventory items, and if the determined increase in the weight on the respective weight detection pad 272.1, 272.2, 272.3 exactly matches the stored weight data of one of the possible inventory items, to determine an addition of the corresponding inventory item on the respective weight detection pad 272.1, 272.2, 272.3 and to add the corresponding inventory item to the detected inventory.

Thus, in operation of the service robot 1000 as well as in providing services at the local vicinity of people with the service robot 1000, when an increase of the weight resting on the respective weight detection pad 272.1, 272.2, 272.3 is determined by the inventory transmission module 302 for one of the at least one weight detection pad 272.1, 272.2, 272.3, the determined increase in the weight resting on the respective weight detection pad 272.1, 272.2, 272.3, the determined increase in the weight resting on the respective weight detection pad 272.1, 272.2, 272.3 is compared with stored weight data of possible inventory items and, if the determined increase in the weight on the respective weight detection pad 272.1, 272.2, 272.3 corresponds to the stored weight data of one of the possible inventory items, an addition of the corresponding inventory item on the respective weight detection pad 272.1, 272.2, 272.3 is determined and the corresponding inventory item is added to the detected inventory. Thereby, when comparing the determined increase of the weight on the respective weight detection pad 272.1, 272.2, 272.3 with stored weight data of possible inventory items, it is preferably checked whether the determined increase of the weight on the respective weight detection pad 272.1, 272.2, 272.3 corresponds exactly to the stored weight data of one of the possible inventory items to at least 2 g, and if the determined increase of the weight on the respective weight detection pad 272.1, 272.2, 272.3 corresponds exactly to the stored weight data of one of the possible inventory items to at least 2 g, an addition of the corresponding inventory item on the respective weight detection pad 272.1, 272.2, 272.3 is determined and the corresponding inventory item is added to the detected inventory.

Furthermore, the inventory transmission module 302 is adapted to detect when, for one of the at least one weight detection pads 272.1, 272.2, 272.3, a removal of a particular inventory item from the respective weight detection pad 272.1, 272.2, 272.3, and within a predetermined evaluation period of 30 seconds after the time of removal of the particular inventory item from the respective weight detection pad 272.1, 272.2, 272.3, the addition of the particular inventory item to the respective weight detection pad 272.1, 272.2, 272.3 is detected, an evaluation signal indicating that the particular inventory item was only temporarily removed for evaluation is output. This appraisal signal is transmitted to the order module.

Thus, in the operation of the service robot 1000 as well as in the provision of services at the local vicinity of people with the service robot 1000, if a removal of a particular inventory item from the respective weight detection pad 272.1, 272.2, 272.3 is first detected by the inventory transmission module 302 for one of the at least one weight detection pad 272.1, 272.2, 272.3, and within the predetermined evaluation period after the time of removal of the particular inventory item from the respective weight detection pad 272.1, 272.2, 272.3, the addition of the particular inventory item to the respective weight detection pad 272.1, 272.2, 272.3 is detected, an evaluation signal indicating that the particular inventory item was only temporarily removed for evaluation is output. This appraisal signal is transmitted to the order module.

Figure 13:
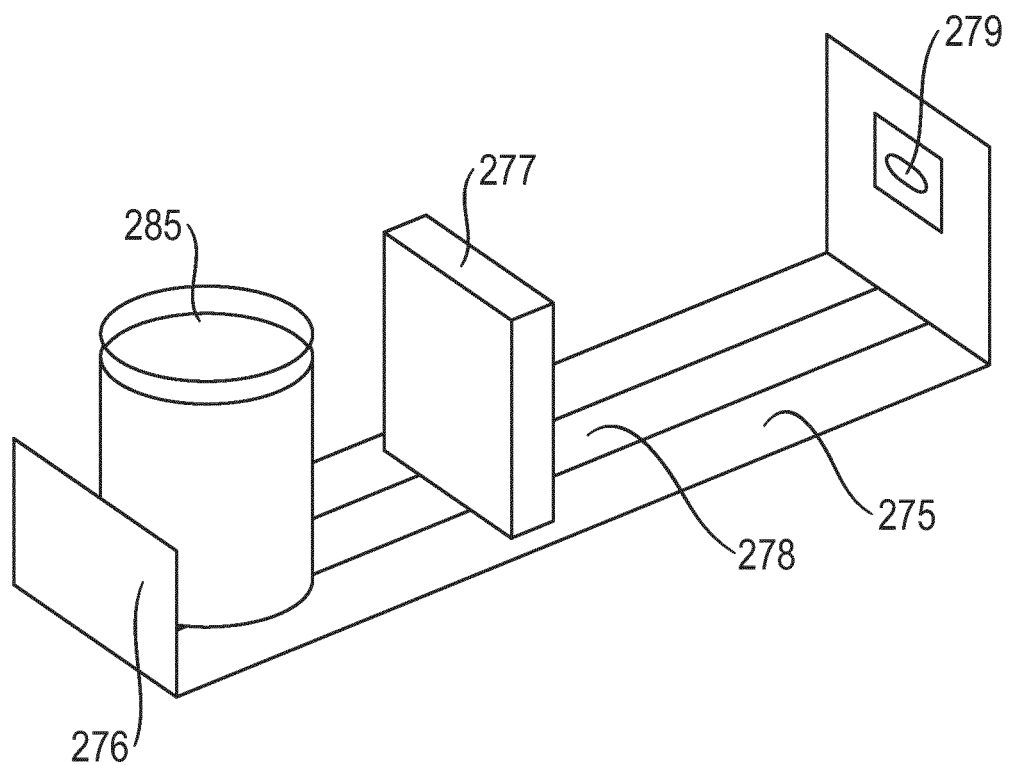
FIG. 13 depicts a simplified schematic representation of a product feed unit for holding at least one inventory item.

FIG. 13 shows a simplified schematic representation of a product feed unit 275 for receiving at least one inventory item 285. This product feed unit 275 belongs to the service unit 200 and, like the plug-in unit 271 described above, is a plug-in unit for insertion into the drawer unit 230. The product feed unit 275 includes a front stop 276 and a rear stop 277, wherein the rear stop 277 is slidably mounted to the product feed unit 275 and is slidable away from the front stop 276 to allow one or more inventory items 285 to be arranged between the front stop 276 and the rear stop 277 in the product feed unit 275 and wherein the rear stop 277 is displaceable toward the front stop 276 to move one or more inventory items 285 disposed between the front stop 276 and the rear stop 277 toward the front stop 276.

Further, the product feed unit 275 comprises a stop drive 278 for moving the rear stop 277 toward the front stop 276 and away from the front stop 276. Further, the product feed unit 275 comprises a stop position sensor 279 for detecting a position of the rear stop 277 and outputting stop position sensor data, wherein the stop position sensor 279 is one of the inventory sensors, whereby the position of the rear stop 277 determined by the stop position sensor 279 is the inventory sensor data detectable by the stop position sensor 279, and the stop position sensor data is the inventory sensor data outputtable by the stop position sensor 279. The stop position sensor 279 an optical distance meter, that is, an optical distance measurement sensor, for detecting a distance between the rear stop 277 and a reference point, the reference point being fixedly arranged relative to the front stop 276 to detect a distance between the reference point fixedly arranged relative to the front stop 276 and the rear stop 277. In this regard, the stop position sensor 279 forms the reference point and is arranged on the side of the rear stop 277 opposite the front stop 276 on the product feed unit 275. As an alternative to this stop position sensor 279 being an optical distance meter, however, the stop position sensor can also be an encoder for detecting the position of the rear stop in the product feed unit 275.

Like the plug-in unit 271 described above in connection with FIGS. 12a and 12b, the product feed unit 275 includes a connection of the stop position sensor 279 of the product feed unit 275 to the data transmission connector of the product feed unit 275, not shown here, for connection to the connector of the drawer unit 230 to receive inventory sensor data output from the stop position sensor 279 of the product feed unit 275 and transmit the data to the inventory transmission module 302.

The inventory transmission module 302 is configured to determine a distance of the rear stop 277 of the product feed unit 275 from the front stop 276 of the product feed unit 275 based on the inventory sensor data received from the stop position sensor 279. Therefore, in operation of the service robot 1000 as well as when providing services at the local vicinity of people with the service robot 1000, the distance of the rear stop 277 of the product feed unit 275 from the front stop 276 of the product feed unit 275 is determined by the inventory transmission module 302 based on the inventory sensor data received from the stop position sensor 279.

The inventory transmission module 302 is further adapted to determine a number of inventory items received in the product feed unit 275, by the inventory transmission module 302 being adapted to dividing the distance of the rear stop 277 of the product feed unit 275 from the front stop 276 of the product feed unit 275, determined based on the inventory sensor data received from the stop position sensor 279, by a stored inventory item thickness corresponding to a thickness of the inventory item allocated to the product feed unit 275, and rounding the result to an integer. Accordingly, in the operation of the service robot 1000 as well as in the provision of services at the local vicinity of people with the service robot 1000, the inventory transmission module 302 determines the number of inventory items received in the product feed unit 275, by dividing the distance of the rear stop 277 of the product feed unit 275 from the front stop 276 of the product feed unit 275, based on the inventory sensor data received from the stop position sensor 279, by a stored inventory item thickness corresponding to a thickness of the inventory item allocated to the product feed unit 275, and rounding the result to a whole number, resulting in the number of inventory items received in the product feed unit 275.

Further, the inventory transmission module 302 is configured to repeatedly receive inventory sensor data from the stop position sensor 279, and to determine the distance of the rear stop 277 of the product feed unit 275 from the front stop 276 of the product feed unit 275 based on the inventory sensor data received from the stop position sensor 279, respectively and to determine a change in the distance of the rear stop 277 of the product feed unit 275 from the front stop 276 of the product feed unit 275, respectively, in comparison to the distance of the rear stop 277 of the product feed unit 275 from the front stop 276 of the product feed unit 275 determined based on the previously received inventory sensor data in operation of the service robot 1000, to determine a change in the at least one inventory item received in the product feed unit 275 based on the determined change in the distance of the rear stop 277 of the product feed unit 275 from the front stop 276 of the product feed unit 276.

Accordingly, inventory sensor data is repeatedly received from the stop position sensor 279 during operation of the service robot 1000 and also during the provision of services at the local vicinity of people by the service robot 1000 with the inventory transmission module 302, and the distance of the rear stop 277 of the product feed unit 275 from the front stop 276 of the product feed unit 275 is determined based on the inventory sensor data received from the stop position sensor 279 in each case and a change in the distance of the rear stop 277 of the product feed unit 275 from the front stop 276 of the product feed unit 275 is determined in each case in comparison to the distance of the rear stop 277 of the product feed unit 275 from the front stop 276 of the product feed unit 275 determined based on the previously received inventory sensor data, in operation of the service robot 1000, to determine a change in the at least one inventory item received in the product feed unit 275 based on the determined change in the distance of the rear stop 277 of the product feed unit 275 from the front stop 276 of the product feed unit 275.

Furthermore, the inventory transmission module 302 is adapted to repeatedly receive inventory sensor data from the stop position sensor 279, and to determine the distance of the rear stop 277 of the product feed unit 275 from the front stop 276 of the product feed unit 276 based on the inventory sensor data received from the stop position sensor 270 in each case, and to determine a respective decrease in the distance of the rear stop 277 of the product feed unit 275 from the front stop 276 of the product feed unit 275 compared to the distance of the rear stop 277 of the product feed unit 275 from the front stop 276 of the product feed unit 275 determined based on the previously received inventory sensor data, in operation of the service robot 1000, to determine a removal of one or more inventory items from the product feed unit 275 based on the determined decrease in the distance of the rear stop 277 of the product feed unit 275 from the front stop 276 of the product feed unit 275 and to remove the corresponding inventory item or items from the sensed inventory. Accordingly, inventory sensor data is repeatedly received from the stop position sensor 279 during operation of the service robot 1000 as well as during the provision of services at the local vicinity of people by the service robot 1000 with the inventory transmission module 302, and the distance of the rear stop 277 of the product feed unit 275 from the front stop 276 of the product feed unit 275 is determined based on the inventory sensor data received from the stop position sensor 279, in each case and a reduction in the distance of the rear stop 277 of the product feed unit 275 from the front stop 276 of the product feed unit 275 is determined in each case in comparison to the distance of the rear stop 277 of the product feed unit 275 from the front stop 276 of the product feed unit 275 determined based on the previously received inventory sensor data, in operation of the service robot 1000, to determine a removal of one or more inventory items from the product feed unit 275 based on the determined decrease in the distance of the rear stop 277 of the product feed unit 275 from the front stop 276 of the product feed unit 275 and to remove the corresponding inventory item or items from the sensed inventory.

Further, the inventory transmission module 302 is adapted to determine a number of inventory items removed in the product feed unit 275, divide the determined reduction in the distance of the rear stop 277 of the product feed unit 275 from the front stop 276 of the product feed unit 275 by a stored inventory item thickness corresponding to a thickness of the inventory item allocated to the product feed unit 275, and round the result to an integer. Accordingly, operation of the service robot 1000 as well as when providing services at the local vicinity of people with the service robot 1000 with the inventory transmission module 302 to determine the number of inventory items taken out in the product feed unit 275, dividing the determined decrease in the distance of the rear stop 277 of the product feed unit 275 from the front stop 276 of the product feed unit 275 by a stored inventory item thickness, which corresponds to a thickness of the inventory item allocated to the product feed unit 275, rounded to an integer, resulting in the number of inventory items removed.

Figure 14:
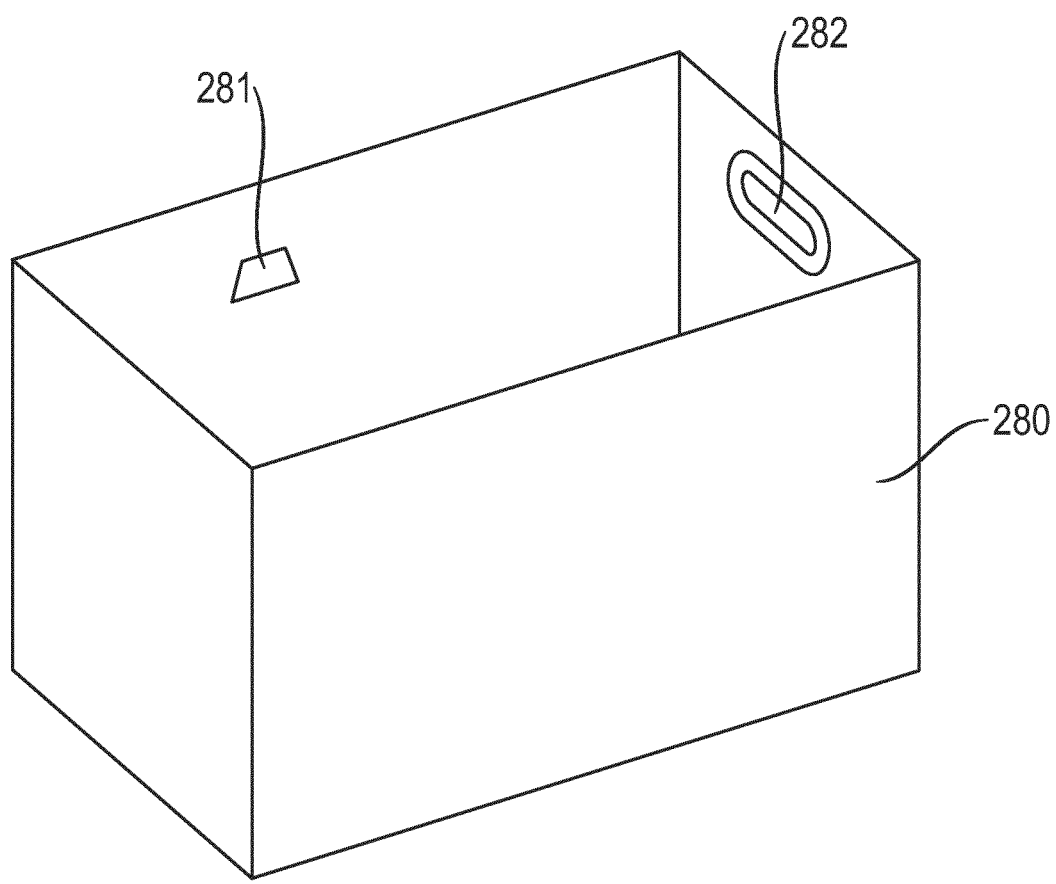
FIG. 14 depicts a simplified schematic representation of an inventory monitoring unit for recording at least one inventory item.

FIG. 14 shows a simplified schematic representation of an inventory monitoring unit 280 for receiving at least one inventory item. This inventory monitoring unit 280 is part of the service unit 200 and, like the plug-in unit 271 and the product feed unit 275 described above, is a plug-in unit for insertion into the drawer unit 230. This inventory monitoring unit 280 has an inventory image sensor 281 for capturing an image of the inventory item received in the inventory monitoring unit 280 and outputting inventory image sensor data having information on the image captured by the inventory image sensor 280, wherein the inventory image sensor 281 is one of the inventory sensors, whereby the image detectable by the at least one inventory image sensor 281 is the inventory quantity detectable by the inventory image sensor 281 and the inventory image sensor data is the inventory sensor data outputtable by the inventory image sensor 281. More specifically, the inventory image sensor 281 for capturing an image is a video camera for capturing a film and thus capturing a plurality of consecutive images. Further, the inventory monitoring unit 280 includes a light source 282 for illuminating the inventory item captured in the inventory monitoring unit 280.

Like the plug-in unit 271 described above in connection with FIGS. 12a and 12b, the inventory monitoring unit 280 includes a connection of the inventory image sensor 281 of the inventory monitoring unit 280 to the data transmission connector of the inventory monitoring unit 280, not shown here, for connection to the connector of the drawer unit 230 to receive inventory sensor data output from the inventory image sensor 281 of the inventory monitoring unit 280 and transmit the data to the inventory transmission module 302.

Figure 15:
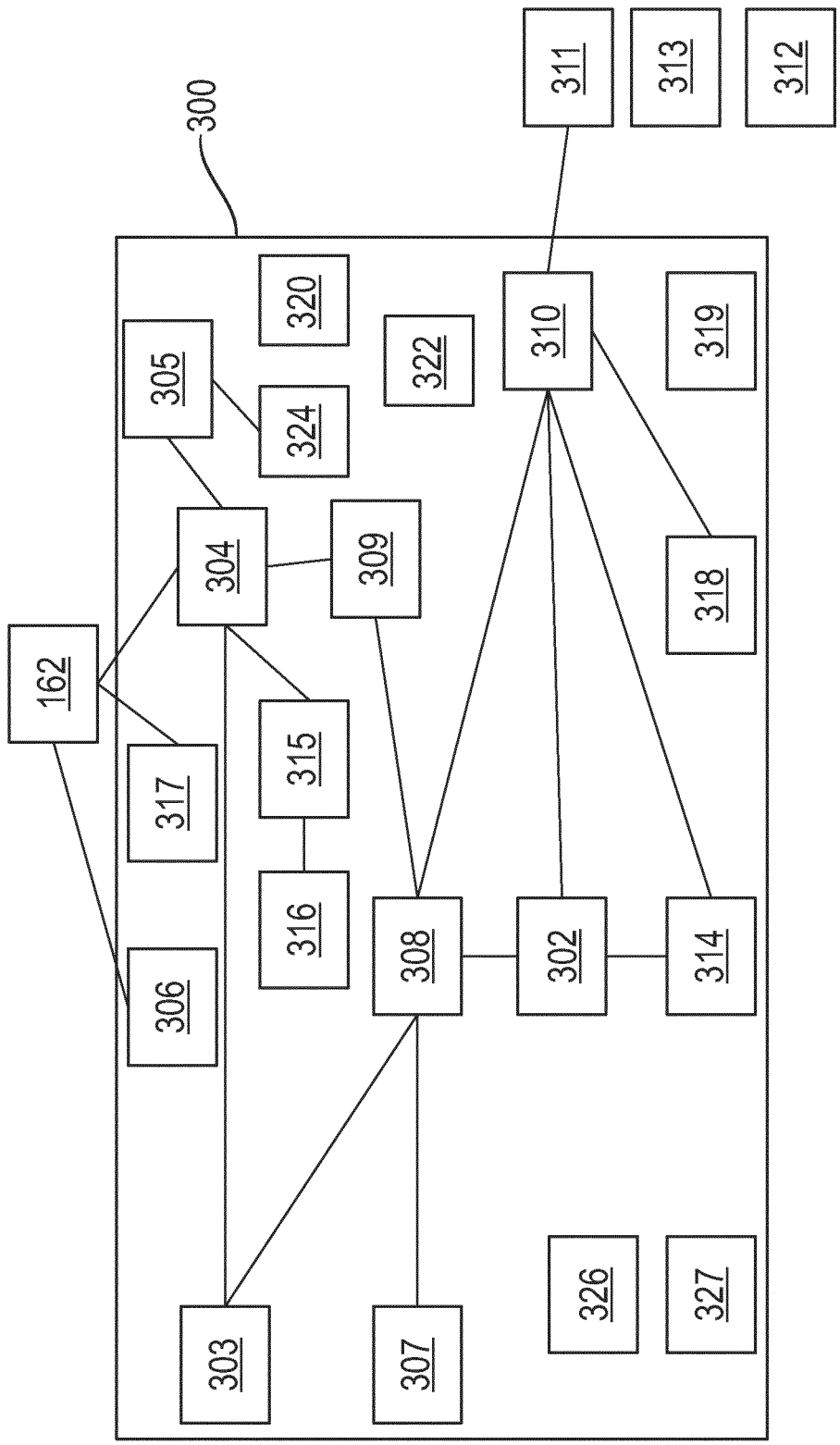
FIG. 15 depicts a schematic diagram of an operating module of an arrangement according to the invention.

The inventory transmission module 302 is configured to determine, based on inventory sensor data received from the inventory image sensor 281, whether an inventory item previously received in the inventory monitoring unit 280 has been removed from the inventory monitoring unit 280, and, if the inventory transmission module 302 has determined that the inventory item previously received in the inventory monitoring unit 280 has been removed from the inventory monitoring unit 280, removing the inventory item previously received in the inventory monitoring unit 280 from the sensed inventory. Accordingly, when the service robot 1000 is in operation and also when the service robot 1000 is providing services at the local vicinity of people, the inventory transmission module 302 determines whether an inventory item previously received in the inventory monitoring unit 280 has been removed from the inventory monitoring unit 280 based on the inventory sensor data received from the inventory image sensor 281 and, if the inventory transmission module 302 has determined that the inventory item previously received in the inventory monitoring unit 280 has been removed from the inventory monitoring unit 280, the inventory item previously received in the inventory monitoring unit 280 is removed from the sensed inventory. FIG. 15 shows a principle diagram of an operating module 300 of an arrangement according to the invention, comprising a service robot 1000 according to the invention.

The operating module 300 includes a plurality of modules. Each of the modules may be arranged within the service robot 1000, for example, on one or more internal computing units. However, each of the modules may also be arranged independently of the arrangement location of the other modules on one or more external computing units, for example, on a server and/or an external control unit. Particularly preferably, some of the modules are arranged on one or more of the internal computing units and some of the modules are arranged on one or more of the external computing units. The aforementioned modules may include, but are not limited to: an inventory determination module 302, an order module 303, a navigation module 304, a position determination module 305, a movement blocking module 306, an inventory configuration module 307, an inventory availability module 308, an inventory replenishment module 309, a display module 310, and a user withdrawal notification module 314.

The operating module 300 is generally used for operating the service robot 1000. The operating module 300 has the order module 303 for receiving user orders and for outputting order data with information about the received user orders. In this regard, the job data includes at least destination data having information about at least one destination where the corresponding user jobs are to be fulfilled by the service robot 1000. Preferably, the job data further includes inventory data with information about the inventory items to be delivered according to a job.

The operating module 300 includes the position determination module 305 for determining a current position of the service robot 1000 and outputting position data including information about the current position of the service robot 1000. Further, the operating module 300 comprises a navigation module 304 for determining a travel path from the current position of the service robot 1000 to the at least one destination and outputting navigation data based on the determined travel path. In this regard, the navigation module is connected or connectable to the order module 300 for receiving destination data output from the order module 300. Further, the navigation module 304 is connected or connectable to the position determination module 305 for receiving position data output from the position determination module 305.

The navigation data includes information about the determined travel path and/or control commands based on the determined travel path, wherein the navigation module 304 is connected or connectable to the control module 162 for outputting the navigation data to the control module 162.

Further, the operating module 300 includes a motion blocking module 306 for blocking movement of the service robot 1000 and outputting a motion blocking command for blocking movement of the service robot 1000. In this regard, the motion blocking module 306 is connected or connectable to the opening state sensor for receiving the opening state data output from the opening state sensor with information on the opening state detected by the opening state sensor. Further, the motion blocking module 306 is adapted to determine an opening state of the service unit 200 based on the opening state data received from the opening state sensor, and to output the motion blocking command when the opening state determined by the motion blocking module 306 indicates an open state of a drawer unit 230.

The control module 162 of the service robot is connected or connectable to the motion blocking module 306 for receiving the motion blocking command issued by the motion blocking module 306—In this regard, the control module 162 is adapted to issue control commands for blocking movement of the service robot 1000 in response to receiving the motion blocking command.

The operating module 300 comprises the inventory transmission module 302 for receiving inventory sensor data output from the at least one inventory sensor and for determining an inventory of the service unit 200 based on the inventory sensor data received from the at least one inventory sensor, and for outputting inventory data including information on the inventory of the service unit 200 determined by the inventory transmission module 302. In this regard, the inventory transmission module 302 is connected or connectable to the at least one inventory sensor for receiving the inventory sensor data output from the at least one inventory sensor.

The operating module 300 further comprises the inventory configuration module 307 for configuring a target inventory of the service robot 1000 and for outputting target inventory data including information about the target inventory. In this regard, when configuring the target inventory, it is possible to determine which inventory items are to be stocked in which receptacles for receiving inventory items.

Further, the operating module 300 comprises an inventory availability module 308 for checking availability of inventory items in the service unit 200 and outputting availability data based on a result of an availability check performed by the inventory availability module 308. The inventory availability module 308 is connected or connectable to the inventory configuration module 307 for receiving target inventory data output from the inventory configuration module 307. Further, the inventory availability module 308 is connected or connectable to the inventory transmission module 302 for receiving inventory data output from the inventory configuration module 302. In this regard, the inventory availability module 308 is configured to check the availability of inventory items based on a comparison of the target inventory data received from the inventory configuration module 307 and the inventory data received from the inventory transmission module 302.

Further, the inventory availability module 308 is connected or connectable to the order module 303 for receiving item data output from the order module 303. Further, the inventory availability module 308 is connected or connectable to the inventory transmission module 302 for receiving inventory data output by the inventory transmission module 302. In this regard, the inventory availability module 308 is configured to check the availability of inventory items based on a comparison of the item data received from the order transmission module 303 and the inventory data received from the inventory determination module 302. The operating module 300 includes the inventory replenishment module 309 for replenishing inventory based on availability data output from the inventory availability module 308. In this regard, the inventory replenishment module 309 is connected or connectable to the inventory availability module 308 for receiving availability data output from the inventory availability module 308. Further, the inventory replenishment module 308 is adapted to issue an inventory replenishment command for replenishing the inventory.

The navigation module 304 is connected or connectable to the inventory replenishment module 309 for receiving the inventory replenishment command issued by the inventory replenishment module 309. In this regard, in response to receiving the inventory restocking command, the navigation module 304 is configured to determine a travel path from the current position of the service robot 1000 to a restocking location at which the inventory of the service robot 1000 is restockable. Further, the navigation module 304 is configured to output navigation data based on the determined travel path.

The operating module 300 further comprises a display module 310 connected or connectable to the inventory transmission module 302 for receiving inventory data output from the inventory transmission module 302, and connected or connectable to the display unit 311 for transmitting display information through the display unit 311. In this regard, the display module 310 is further adapted to output display information regarding at least the inventory of the service unit 200 in accordance with the inventory data received from the inventory transmission module 302 and to transmit the inventory data to the display unit 311 for display by the display unit 311.

Further, the operating module 300 includes a user withdrawal notification module 314 for determining inventory items withdrawn by a user when executing a user order and for outputting inventory withdrawal data including information about the inventory items determined to have been withdrawn. In this regard, the user withdrawal notification module 314 is connected or connectable to receive the inventory data determined by the inventory transmission module 302. Further, the user withdrawal notification module 314 is configured to determine the inventory items withdrawn upon execution of a user order based on the inventory data received from the inventory transmission module 302 prior to a withdrawal of inventory items from the inventory and the inventory data received from the inventory transmission module 302 after a withdrawal of inventory items from the inventory.

Further, the display module 310 is connected or connectable to the user withdrawal notification module 314 for receiving the inventory withdrawal data output from the user withdrawal notification module 314. In this regard, the display module 310 is adapted to output display information regarding at least the withdrawn inventory items in accordance with the inventory withdrawal notification data received from the user withdrawal notification module 314 and to transmit the inventory withdrawal notification data to the display unit 311 for display by the display unit 311.

Further, the operating module 300 includes a cooling device control module 326 and a fan control module 327. The cooling device control module 326 is for controlling the cooling device control unit 260, and thus the cooling device 250. The fan control module 327 is for controlling the fan control unit 259, and thus the fan 258.

In addition, the operating module 300 includes an inventory management module 318 and a pre-authorization module 319. The inventory management module 318 is for creating inventory items and/or inventory item templates with inventory properties. The inventory management module 318 is connected and/or connectable to the display module 310. Thus, outputted inventory property information may be displayed on the display unit 311. The pre-authorization module 319 is used to authorize a user, in particular a hotel guest, to use the service unit 200, 2200, 3200. For this purpose, the pre-authorization module 319 is designed to be connected to the payment unit 312, for example.

Further, the operating module 300 includes a user notification module 315 and an alarm module 316. The user notification module 315 is for notifying a user that the service robot 1000, 2000, 3000 has arrived. For this purpose, the user notification module 315 is connected to the navigation module 304 to be able to receive a destination notification from the navigation module 304. The alarm module 316 is used to alert an administrator. In this regard, the alarm module 316 is connected to the user notification module 315 to be able to receive an out of office notification from the user notification module 315.

Further, the operating module 300 comprises a release module 317 connected to the control module 162. The release module 300 is used to release a stalled service robot 1000, 2000, 3000 and enables manual and/or remote displacement of the service robot 1000, 2000, 3000 by a limited maximum distance.

Figure 16:
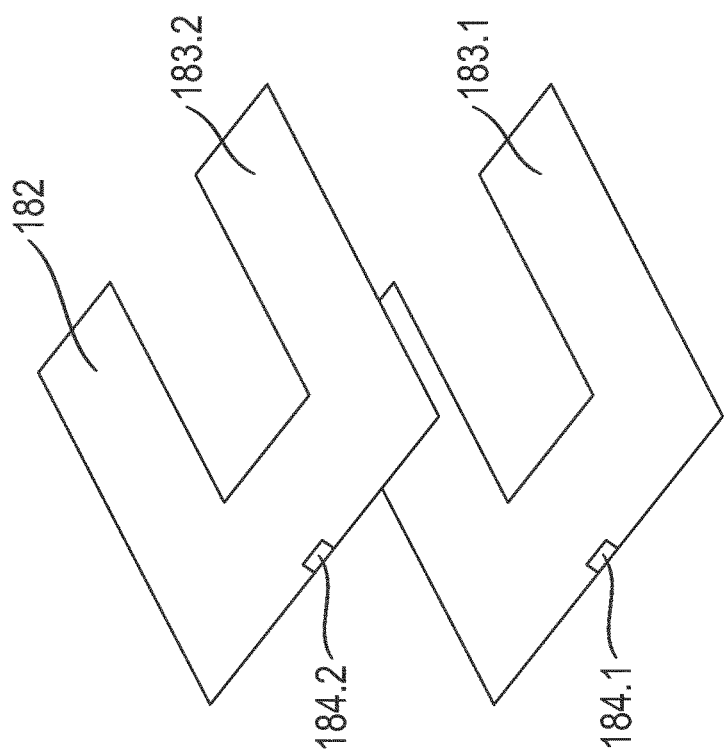
FIG. 16 depicts a simplified schematic representation of the action area in which the service robot according to the invention can move autonomously while driving, the action area being divided into two action subareas, each of which has a transition place, the service robot being able to move from the respective transition place in the respective action subarea to the transition place in the other action subarea and thus into the other action subarea.

As explained above, the service robot 1000 is configured for autonomous driving due to the autonomously driving base platform 100. In this context, autonomous driving of the service robot 1000 within the action area 182 is provided, wherein the navigation module 304 contains information on the action area 182, in particular in the form of a map of the action area 182, or is designed to receive the information on the action area 182, in particular in the form of a map of the action area 182, from a memory arranged separately from the navigation module 304 for storing the information on the action area 182. In this regard, the navigation module 304 is configured to determine the travel path from the current position of the service robot 1000 to the at least one destination based on the information regarding the action area 182. In addition, the navigation module 304 is configured to determine the shortest route from the current position of the service robot 1000 to the at least one destination, taking into account constraints such as safety distances to be maintained from predefined locations in the action area 182, partial routes to be preferably selected, partial routes to be preferably selected at predetermined times of day, partial routes to be preferably avoided, and partial routes to be preferably avoided at predetermined times of day. As illustrated in FIG. 16, the action subarea 182 has two spatially separated action subareas 183.1, 183.2, wherein at least one transition place 184.1, 184.2 is located in each of the action subareas 183.1, 183.2, at which the service robot 1000 moves from the respective transition place 184.1, 184.2 in the respective action subarea 183.1, 183.2 to a transition place 184.2, 184.1 in another action subarea 183.2, 183.1 and thus to another one of the action subareas 183.2, 1831, wherein the action area information 182 includes information on the transition places 184.1, 184.2 of the action subareas 183.1, 183.2 and on a position of each of the at least one transition place 184.1, 184.2 in the respective action subarea 183.1, 183.2 and on a type of the respective transition place 184.1, 184.2. The spatially separated action subareas 183.1, 183.2 may be located on different floors in the same building, for example, as illustrated in FIG. 16. In this case, the spatially separated action subareas 183.1, 183.2 are separated from each other at least in the vertical direction. However, they can also be separated from each other horizontally, for example. The spatial separation between the action subareas 183.1, 183.2 can be accomplished, for example, by a door or lock. However, the action subareas 183.1, 183.2 may also be spatially separated from each other, for example. However, all of the at least two spatially separated action subareas 183.1, 183.2 are accessible to the service robot 1000 due to the transition places 184.1, 184.2. It is irrelevant whether the service robot 1000 can reach the second action subarea 183.2 directly from a first action subarea 183.1 or via a third action subarea or even several further action subareas.

The position determination module 306 is configured to determine a current position of the service robot 1000 in the action area 182 and to output position data with information on the current position of the service robot 1000 in the action area 182. If the action area 182 has two action subareas 183.1, 183.2 that are spatially separated from each other, the position determination module 306 is configured accordingly for determining in which action subarea 183.1, 183.2 the service robot 1000 is currently located and for determining the current position of the service robot 1000 in the respective action subarea 183.1, 183.2 and for outputting position data with information on the action subarea 183.1, 183.2 in which the service robot 1000 is currently located and on the current position of the service robot 1000 in the respective action subarea 183.1, 183.2.

Further, the navigation module 304 is configured to determine the travel path from the current position of the service robot 1000 to the at least one destination location based on the action area 182 information and, if the current position of the service robot 1000 is in a different one of the two action subareas 183.1, 183.2 than the destination location, taking into account the transition place information 184.1, 184.2 of the action subareas 183.1, 183.2 included in the action area 182 information.

Figure 17:
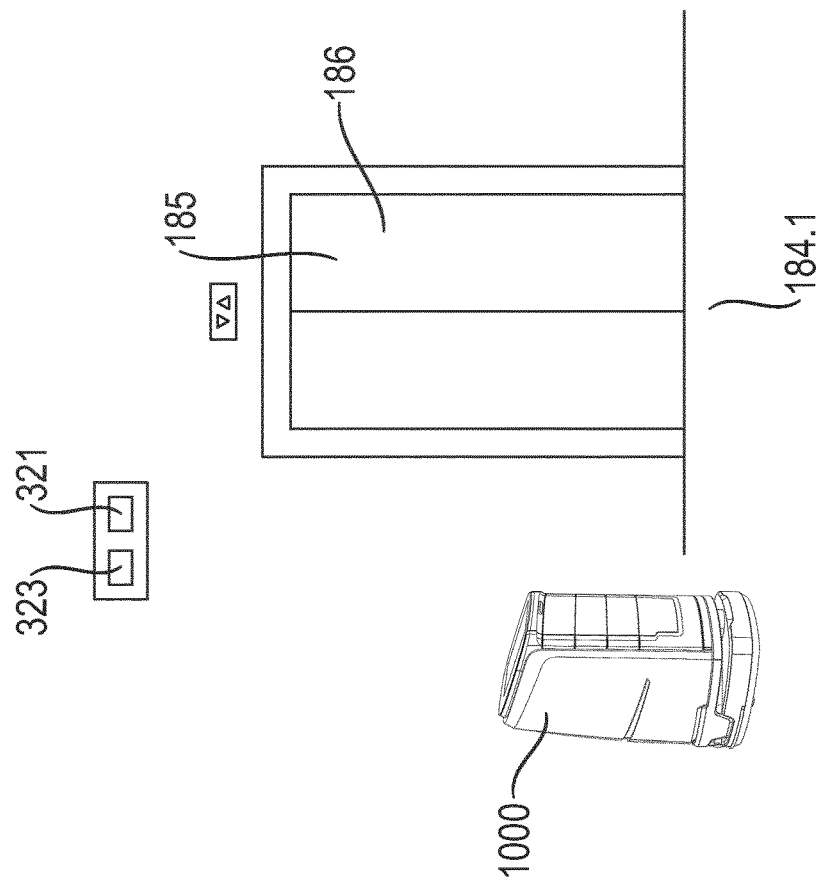
FIG. 17 depicts a simplified schematic representation of a service robot transport device in the form of an elevator for transporting the service robot from one transition place to the other transition place and thus from one action subarea to the other action subarea of the action area shown in FIG. 16.

In the present example, the transition place 184.1 in the first of the two action subareas 183.1 and the transition place 184.2 in the second of the two action subareas 183.2 are connected to each other by a service robot transporting device for transporting the service robot 1000 from the respective transition place 184.1, 184.2 in one of the two action subareas 183.1, 183.2 to the transition place 184.2, 184.2 in the other of the two action subareas 183.2, 183.2. As illustrated in FIG. 17, this service robot transport device for transporting the service robot 1000 from the respective transition place 184.1, 184.2 in one of the two action subareas 183.1, 183.2 to the transition place 184.2, 184.1 in the other of the two action subareas 183.2, 183.1 in the present example an elevator 185. In variants thereto, on the other hand, the service robot transport device is, for example, a moving belt, an escalator or a stair lift, in particular a stair lift for transporting a wheelchair over one or more stairs.

As shown in FIGS. 15 and 17, the operating module 300 comprises a service robot transport device communication module 320 for communicating with a control device 321 of the service robot transport device, the service robot transport device communication module 320 being adapted to, service robot transport device control commands to the service robot transport device control device 321 to control the service robot transport device to transport the service robot 1000 from the respective transition place 184.1, 184.2 in one of the two action subareas 183.1, 183.2 to the transition place 184.2, 184.1 in the other of the two action subareas 183.2, 183.1. This service robot transport device communication module 320 may thereby be arranged in the service robot 1000, whereby the service robot 1000 comprises the service robot transport device communication module 320. However, the service robot transport device communication module 320 may also be arranged outside of the service robot 1000, and thus separate from the service robot 1000. For example, the service robot transport direction control commands may include a command to move the service robot transport device to the transition place 184.1, 184.2 in one of the two action subareas 183.1, 183.2 where the service robot 1000 is to be received by the service robot transport device for transporting the service robot 1000 to the transition place 184.2, 184.1 in the other of the two action subareas 183.3, 183.1. In this regard, the service robot transport device control instructions may also include an instruction that states to which transition place 184.1, 184.2 the service robot 1000 is to be transported by the service robot transport device. Further, the service robot transport device control commands may include a command that states that the service robot transport device may not be used to transport people together with the service robot 1000. In addition, the service robot transport device control instructions may include a command that states the priority with which the service robot 1000 is to be transported with the service robot transport device. In this regard, the priority may include that the service robot 1000 is to be transported with priority over persons or that persons are to be transported with priority over the service robot 1000.

For example, the service robot transport device communication module 320 may be connected or connectable to the service robot transport device control device 321 via an API (application programming interface), or programming interface, over the Internet or a cloud to communicate the service robot transport device control commands to control devices of the service robot transport device. However, the service robot transport device communication module may also be connected or connectable to the control device of the service robot transport device via other wireless communication such as Bluetooth, a radio signal other than Bluetooth, an optical signal, or an acoustic signal, instead of an API, to communicate the service robot transport device control commands to the control device of the service robot transport device.

Whether or not the transition place 184.1 in the first of the two action subareas 183.1 and the transition place 184.2 in the second of the two action subareas 183.1, 183.2 are connected to each other by a service robot transport device for transporting the service robot 1000 from the respective transition place 184.1, 184.2 in one of the two action subareas 183.1, 183.2 to the transition place 184.2, 184.2 in the other of the two action subareas 183.2, 183.2, a path from the transition place 184.1, 184.2 in one of the two action subareas 183.1, 183.2 to the transition place 184.2, 184.1 in the other of the two action subareas 183.2, 183.1 is interrupted or interruptible by a Barrier 186, the Barrier 186 being openable to allow the service robot 1000 to pass from the respective transition place 184.1, 184.2 in one of the two action subareas 183.1, 183.2 to the transition place 184.3, 184.1 in the other of the two action subareas 183.2, 183.1. The barrier 186 may be, for example, a door, a lock, or a barrier. In the present example, this Barrier 186 is the elevator door of the elevator 185.

Preferably, the operating module 300 comprises a Barrier communication module 322 for communicating with a control device 323 of the barrier 186 to open the barrier 186 and allow the service robot 1000 to move from the respective transition place 184.1, 184.2 in one of the two action subareas 183.1, 183.2 to the transition place 184.2, 184.1 in the other of the two action subareas 183.2, 183.1. This barrier communication module 322 may thereby be arranged in the service robot 1000, whereby the service robot 1000 comprises the barrier communication module 322. However, the barrier communication module 322 may also be arranged outside the service robot 1000 and thus separately from the service robot 1000.

The Barrier communication module 322 is configured to communicate a Barrier open signal to the control device 323 of the Barrier 186 to open the Barrier 186 and allow the service robot 1000 to move from the respective transition place 184.1, 184.2 in one of the two action subareas 183.1, 183.2 to the transition place 184.2, 184.1 in the other of the two action subareas 183.2, 183.1. The barrier communication module 322 may be connected or connectable to the control device 323 of the Barrier 186, for example, via an API (application programming interface), or programming interface, via the Internet or a cloud, to communicate the barrier opening signal to the control device 323 of the Barrier 186.

The Barrier communication module 322 is further adapted to receive from the Barrier 186 or the control device 323 of the Barrier 186 a Barrier open signal indicating that the Barrier 186 is open to allow the service robot 1000 to move from the respective transition place 184.1, 184.2 in one of the two action subareas 183.1, 183.2 to the transition place 184.2, 184.1 in the other of the two action subareas 183.2, 183.1.

For example, the barrier communication module 322 may be connected or connectable to the control device 323 of the barrier 186 via an API (application programming interface), or programming interface, via the Internet or a cloud to receive the barrier open signal.

The navigation module 304 is adapted to determine whether the Barrier 186 is open and the service robot 1000 can thus drive through the Barrier 186 and pass through the Barrier 186, and, when it has been determined by the navigation module 304 that the Barrier 186 is open, output navigation data to the control module 162 to cause the service robot 1000 to drive through the Barrier 186. In this regard, the navigation module 162 may determine whether or not the Barrier 186 is open, and thus whether or not the service robot 1000 can travel through the Barrier 186, based on work area sensing sensor data output from one of the work area sensing sensors described above with information regarding the sensed work area.

Accordingly, when the service robot 1000 is transported by the service robot transporting device, the navigation module 304 is adapted to determine whether or not the Barrier 186 is open and thus the service robot 1000 can travel through the Barrier 186 and pass through the Barrier 186 based on the detected work area information, and, when it is determined by the navigation module 304 that the Barrier 186 is open, to output navigation data to the control module 162 to cause the service robot 1000 to travel through the Barrier 186. Further, the navigation module 304 is adapted to output this navigation data to the control module 162 to cause the service robot 1000 to travel through the barrier 186 only if, at the same time, the barrier communication module 322 has received a barrier open signal to increase safety in the operation of the service robot 10000.

Furthermore, if the operating module 300 includes the service robot transport device communication module 320 described above, the service robot transport device communication module 320 may be formed in the same module with the barrier communication module 322 as shown schematically in FIG. 17, and thus may be formed as a transition communication module that includes the functionality of the service robot transport device communication module 320 and the barrier communication module 322. Equally, however, the service robot transport device communication module 320 may be formed separately from the barrier communication module 322.

The operating module 300 further comprises a transport route determination module 324 for determining a transport route over which the service robot 1000 has been transported by the service robot transport device, the transport route determination module 324 being connected or connectable to the accelerometer arrangement 180 to receive the accelerometer data and being configured to determine the transport route based on the accelerometer data. If the accelerometer arrangement 180 further comprises one or more gyroscopes for detecting a rotational movement of the service robot and is configured to output gyroscope data including information on the detected rotational movement, the transport route determination module 324 is preferably connected or connectable to the accelerometer arrangement 180 for receiving the gyroscope data and is configured to determine the transport route based on the gyroscope data.

This transport route determination 324 may thereby be arranged in the service robot 1000, whereby the service robot 1000 comprises the transport route determination 324. However, the barrier communication module 324 may also be arranged outside the service robot 1000 and thus separately from the service robot 1000.

The transport distance can correspond to a transport path in one-dimensional, two-dimensional or three-dimensional space, along which transport path the service robot 1000 has been transported, in particular transported by the service robot transport device. Equally, however, the transport path may also be a distance over which the service robot 1000 has been transported along one of the three acceleration measurement axes. If the accelerometer arrangement 180 is configured to detect an acceleration along two or three different acceleration measurement axes, each with a different fixed orientation relative to the service robot 1000 in both directions of the respective acceleration measurement axis to which acceleration the service robot 1000 is subjected, the transport distance may be the distances over which the service robot 1000 has been transported along the two or three acceleration measurement axes.

The transport route determination module 324 including the position determination module 305, wherein the position determination module 305 is configured to determine whether the service robot 1000 has been transported by the service robot transporting device from the transition place 184.1, 184.2 in one of the two action subareas 183.1, 183.2 to the transition place 184.2, 184.1 in the other of the two action subareas 183.2, 183.2 based on the determined transport route or based on the transport route information received from the transport route determination module 324. Thus, without information received from the service transport device, it can be determined whether the service robot 1000 has been transported by the service robot transport device from the transition place 184.1, 184.2 in one of the two action subareas 183.1, 183.2 to the transition place 184.2, 184.1 in the other of the two action subareas 183.2, 183.1.

As mentioned above, navigation module 304 is adapted to output navigation data to control module 162 to allow the service robot 1000 to pass through Barrier 186 when, at the same time, Barrier communication module 322 has received a Barrier open signal. In the present embodiment, where the service robot needs to pass through the Barrier 186 on the one hand but also needs to be transported by the service robot transport device to get from the transition place 184.1, 184.2 in one of the two action subareas 183.1, 183.2 to the transition place 184.2, 184.1 in the other of the two action subareas 183.1, 183.2, the navigation module 304 is further adapted to output the navigation data to the control module 162 in order to make the service robot 1000 pass through the Barrier 186, if at the same time the position determination module 305 has determined, on the basis of the determined transport route or on the basis of the transport route information received from the transport route determination module 324, that the service robot 1000 has to pass through the service robot transport device from the transition place 184.1, 184.2 in one of the two action subareas 183.1, 183.2 to the transition place 184.2, 184.1 in the other of the two action subareas 183.1, 183.2.

Also, when the service robot 1000 is at one of the transition places 184.1, 184.2 or for being transported with one of the service robot transporting devices on or in the corresponding service robot transporting device, the navigation module 304 is adapted to control the service robot 1000 by outputting navigation data to the control module 162 such that it moves as close as the safety module 163 allows to persons in the vicinity of the service robot 1000 when persons are on or near the travel path. As a result, the service robot 1000 can be transported more complication-free along with persons service robot transport device. Further, the navigation module 304 is configured to cause the service robot 1000 to emit acoustic and/or warning signals, in particular by transmitting information to the operating module 300, when persons are located on or in the vicinity of the travel path.

In summary, a service robot belonging to the aforementioned technical field is created for providing services at the local vicinity of people, which is safer in operation and can provide a wide range of services at the local vicinity of people. Further, a method for operating a service robot according to the invention as well as a method for providing services at the local vicinity of people with a service robot according to the invention is provided.

The invention claimed is:

1. A service unit configured for a service robot comprising:
an autonomously driving base platform and a service unit configured to be mountable on or mounted on the autonomously driving base platform, and wherein the autonomously driving base platform comprises: (a) drive arranged and configured to drive the autonomously driving base platform and the service robot; and (b) a trolley comprising a plurality of wheels arranged and configured to move the autonomously driving base platform and the service robot on the wheels, wherein at least one of the plurality of wheels is a drive wheel drivable by the drive, and wherein the service robot further comprises a control module configured to control the autonomously driving base platform, wherein the control module is connected or is configured to be connectable to the drive for transmitting control commands to the drive, and the drive is configured to be controllable by the control commands transmitted from the control module, and wherein the service robot further comprises at least one power source arranged and configured to supply power to the drive and the control module and wherein the service robot is further configured to provide providing services at a local vicinity of people,
a housing having at least one rear wall and two opposing side walls, wherein the housing comprises an insulating material, and
a support structure configured to stabilize the service unit, the support structure further comprises at least two side structures, and each of the two side structures is associated with a different one of the two side walls,
wherein the housing further comprises at least one drawer rail unit configured to guide a first drawer unit, wherein the drawer rail unit is arranged connected to the two side structures which are arranged at least partially inside the housing,
wherein the first drawer unit further comprises an opening state sensor arranged and configured to detect an opening state of the first drawer unit and to output opening state data comprising information on the opening state,
wherein the first drawer unit is associated with a locking unit configured to lock the drawer unit in a first position,
wherein the first drawer unit is configured to receive a plug-in unit,
wherein the service unit comprises:
a second drawer unit comprising a second drawer front with a circumferential sealing element, wherein a first drawer front and the second drawer front are arrangeable directly adjacent to each other in a closed position of the first drawer unit and the second drawer unit; and
a magnetic element of the first drawer front and a magnetic element of the second drawer front adapted to interact with each other in a closed state of the first drawer unit and the second drawer unit, in order to close an air gap between the first drawer front and the second drawer front.

2. The service unit according to claim 1, wherein the housing comprises a one piece integral structure.

3. The service unit according to claim 1, further comprising a cooling device configured to cool an interior space defined by the housing.

4. The service unit according to claim 3, further comprising: a fan arranged proximate to the cooling device; a fan control unit configured to control the fan; and wherein the fan is configured to generate an air flow onto a water tank under the control of the fan control unit.

5. The service unit according to claim 1, further comprising at least one battery and charging contacts configured to connect the at least one battery to a charging station, wherein the charging station comprises two charging station charging contacts configured to be contacted by one or more service robot charging contacts.

* * * * *